US012776876B2

(12) United States Patent
Xiao et al.

(10) Patent No.: US 12,776,876 B2
(45) Date of Patent: Oct. 27, 2026

(54) SELECTION OF SOUNDING REFERENCE SIGNAL RESOURCES ACROSS DIFFERENT USAGES

(71) Applicant: QUALCOMM Incorporated, San Diego, CA (US)

(72) Inventors: Kexin Xiao, Shanghai (CN); Muhammad Sayed Khairy Abdelghaffar, San Jose, CA (US); Yu Zhang, San Diego, CA (US); Runxin Wang, San Diego, CA (US); Alexandros Manolakos, Escondido, CA (US); Bo Chen, Beijing (CN); Krishna Kiran Mukkavilli, San Diego, CA (US); Hwan Joon Kwon, San Diego, CA (US); Yeliz Tokgoz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 525 days.

(21) Appl. No.: 18/547,484

(22) PCT Filed: Jan. 15, 2021

(86) PCT No.: PCT/CN2021/072232

§ 371 (c)(1),
(2) Date: Aug. 22, 2023

(87) PCT Pub. No.: WO2022/151379

PCT Pub. Date: Jul. 21, 2022

(65) Prior Publication Data

US 2024/0214150 A1 Jun. 27, 2024

(51) Int. Cl.
*H04L 5/00* (2006.01)
*H04B 7/06* (2006.01)
(Continued)

(52) U.S. Cl.
CPC ....... *H04L 5/0051* (2013.01); *H04B 7/06956* (2023.05); *H04W 72/0446* (2013.01); *H04W 72/1268* (2013.01); *H04W 76/20* (2018.02)

(58) Field of Classification Search
None
See application file for complete search history.

(56) References Cited

U.S. PATENT DOCUMENTS

2011/0274063 A1* 11/2011 Li ........................ H04W 84/12 370/329
2012/0039273 A1* 2/2012 Nam .................. H04W 52/325 455/450

(Continued)

FOREIGN PATENT DOCUMENTS

CN 111130742 A 5/2020

OTHER PUBLICATIONS

International Search Report and Written Opinion—PCT/CN2021/072232—ISA/EPO—Oct. 18, 2021.

(Continued)

*Primary Examiner* — Lonnie V Sweet
(74) *Attorney, Agent, or Firm* — Loza & Loza, LLP/Qualcomm

(57) ABSTRACT

Aspects of the disclosure relate to utilizing SRS resources for various types of usages and configuring transmit power on the SRS resources. In an aspect, a user equipment (UE) may determine whether a time gap between a first sounding reference signal (SRS) resource for a first usage and a second SRS resource for a second usage in time is less than a time threshold. Further, the UE may transmit an SRS utilizing one of the first SRS resource or the second SRS resource for both the first usage and the second usage, in response to determining that the time gap is less than the time threshold.

29 Claims, 33 Drawing Sheets

Case 2:
|t1 − t2| > |t3 − t2|

(51) Int. Cl.
*H04W 72/0446* (2023.01)
*H04W 72/1268* (2023.01)
*H04W 76/20* (2018.01)

(56) References Cited

U.S. PATENT DOCUMENTS

| | | | | |
|---|---|---|---|---|
| 2012/0327876 | A1* | 12/2012 | Ouchi | H04L 5/0053<br>370/329 |
| 2013/0010723 | A1* | 1/2013 | Ouchi | H04W 52/346<br>370/329 |
| 2013/0040689 | A1* | 2/2013 | Iwai | H04L 5/0051<br>455/67.11 |
| 2013/0121279 | A1* | 5/2013 | Noh | H04W 52/16<br>370/329 |
| 2013/0208690 | A1* | 8/2013 | Nishikawa | H04L 5/0091<br>370/329 |
| 2018/0183556 | A1* | 6/2018 | Shin | H04B 7/0479 |
| 2019/0349864 | A1* | 11/2019 | Zhang | H04W 52/146 |
| 2020/0403749 | A1 | 12/2020 | Park et al. | |
| 2021/0344527 | A1* | 11/2021 | Go | H04W 72/23 |
| 2022/0217746 | A1* | 7/2022 | Kang | H04W 8/24 |
| 2022/0271815 | A1* | 8/2022 | Zhang | H04B 7/0404 |
| 2022/0330173 | A1* | 10/2022 | Matsumura | H04L 5/0051 |
| 2023/0047048 | A1* | 2/2023 | Liu | H04B 7/0417 |

OTHER PUBLICATIONS

OPPO: "Remaining Issues on Non-Codebook Based UL Transmission", 3GPP Draft, 3GPP TSG RAN WG1 Meeting #92bis, R1-1803967, Sanya, China, Apr. 16-Apr. 20, 2018, 4 Pages, Section 2.2.

OPPO: "Remaining Issues on Non-Codebook Based UL Transmission", 3GPP Draft, 3GPP TSG RAN WG1 Meeting #92bis, R1-1803968, Sanya, China, Apr. 16-Apr. 20, 2018, 5 Pages, Section 2.

Sony: "Summary of Rel15 SRS Maintenance", 3GPP Draft, 3GPP TSG RAN WG1 Meeting #96-bis, R1-1905517, Xi'an, China, Apr. 8-12, 2019, 18 Pages, Section 2.

* cited by examiner

1100

```
SRS-ResourceSet ::= SEQUENCE {
   srs-ResourceSetId            SRS-ResourceSetId,
   srs-ResourceIdList           SEQUENCE (SIZE(1..maxNrofSRS-ResourcesPerSet))
                                      OF SRS-ResourceId OPTIONAL, -- Cond Setup
   resourceType CHOICE {
      aperiodic                  SEQUENCE {
         aperiodicSRS-ResourceTrigger       INTEGER (1..maxNrofSRS-TriggerStates-1),
         csi-RS                             NZP-CSI-RS-ResourceId OPTIONAL, -- Cond NonCodebook
         slotOffset INTEGER (1..32) OPTIONAL, -- Need S
         ...,
         [[
            aperiodicSRS-ResourceTriggerList-v1530  SEQUENCE (SIZE(1..maxNrofSRS-TriggerStates-2))
                                                       OF INTEGER (1..maxNrofSRS-TriggerStates-1)      ]]
      },
      semi-persistent            SEQUENCE {
         associatedCSI-RS                   NZP-CSI-RS-ResourceId OPTIONAL,
         ...
      },
      periodic                   SEQUENCE {
         associatedCSI-RS                   NZP-CSI-RS-ResourceId OPTIONAL,
      ...
      }
   },
   associated-merged-SRS       SEQUENCE {
                                     merged-SRS-ResourceID       SRS-ResourceId
                                current-SRS-ResourceID      SRS-ResourceId
   },
   usage                    ENUMERATED {beamManagement, codebook, nonCodebook, antennaSwitching},
   ...
```

1010

1012

1014

FIG. 11A

2200

2210 2220 2230

| Bit field mapped to index | *codebookSubset = fullyAndPartialAndNonCoherent* | Bit field mapped to index | *codebookSubset = partialAndNonCoherent* | Bit field mapped to index | *codebookSubset= nonCoherent* |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | ... | ... | ... | ... | ... |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12 | 1 layer: TPMI=4 | 12-15 | reserved |
| ... | ... | ... | ... | | |
| 19 | 1 layer: TPMI=11 | 19 | 1 layer: TPMI=11 | | |
| 20 | 2 layers: TPMI=6 | 20 | 2 layers: TPMI=6 | | |
| ... | ... | ... | ... | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layers: TPMI=12 | | | | |
| ... | ... | | | | |
| 47 | 1 layers: TPMI=27 | | | | |
| 48 | 2 layers: TPMI=14 | | | | |
| ... | ... | | | | |
| 55 | 2 layers: TPMI=21 | | | | |
| 56 | 3 layers: TPMI=3 | | | | |
| ... | ... | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

FIG. 22

SELECTION OF SOUNDING REFERENCE SIGNAL RESOURCES ACROSS DIFFERENT USAGES

CROSS-REFERENCE TO RELATED APPLICATION

This application is the U.S. national stage of PCT patent application number PCT/CN2021/072232 filed on Jan. 15, 2021.

TECHNICAL FIELD

The technology discussed below relates generally to wireless communication networks, and more particularly, to approaches for utilizing sounding reference signal resources for different usages.

INTRODUCTION

In wireless communication systems, such as those specified under standards for 5G New Radio (NR), an access point (e.g., a base station) may communicate with a user equipment (UE) (e.g., a smartphone). A UE may transmit a sounding reference signal (SRS), which is a reference signal transmitted to a gNB and may be used by the gNB to estimate the uplink channel quality. The SRS resources may be grouped in an SRS resource set. The SRS resource set may be periodic, aperiodic, or semi-persistent. The SRS resource sets may be for different usages, such as an antenna switching usage, a codebook-based usage, a non-codebook-based usage, or a beam management usage.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes determining whether a time gap between a first sounding reference signal (SRS) resource for a first usage and a second SRS resource for a second usage in time is less than a time threshold, and transmitting a reference signal utilizing one of the first SRS resource or the second SRS resource for both the first usage and the second usage, in response to determining that the time gap is less than the time threshold.

In another example, a UE for wireless communication is disclosed. The UE includes at least one processor, a transceiver communicatively coupled to the at least one processor, and a memory communicatively coupled to the at least one processor. The at least one processor may be configured to: determine whether a time gap between a first sounding reference signal (SRS) resource for a first usage and a second SRS resource for a second usage in time is less than a time threshold, and transmit an SRS utilizing one of the first SRS resource or the second SRS resource for both the first usage and the second usage, in response to determining that the time gap is less than the time threshold.

In another example, a non-transitory computer-readable storage medium having instructions for a UE thereon may be disclosed. The instructions, when executed by a processing circuit, cause the processing circuit to: determine whether a time gap between a first sounding reference signal (SRS) resource for a first usage and a second SRS resource for a second usage in time is less than a time threshold, and transmit an SRS utilizing one of the first SRS resource or the second SRS resource for both the first usage and the second usage, in response to determining that the time gap is less than the time threshold.

In a further example, a UE for wireless communication may be disclosed. The UE includes means for determining whether a time gap between a first sounding reference signal (SRS) resource for a first usage and a second SRS resource for a second usage in time is less than a time threshold, and means for transmitting an SRS utilizing one of the first SRS resource or the second SRS resource for both the first usage and the second usage, in response to determining that the time gap is less than the time threshold In one example, a method of wireless communication by a base station is disclosed. The method includes assigning at least one first sounding reference signal (SRS) resource for a first usage and at least one second SRS resource for a second usage, determining whether a time gap between a first SRS resource of the at least one first SRS resource and a second SRS resource of the at least one second SRS resource is less than a time threshold, and transmitting, to a user equipment (UE) a first indication that the time gap is less than the time threshold, in response to determining that the time gap is less than the time threshold.

In another example, a base station for wireless communication is disclosed. The base station includes at least one processor, a transceiver communicatively coupled to the at least one processor, and a memory communicatively coupled to the at least one processor. The at least one processor may be configured to: assign at least one first sounding reference signal (SRS) resource for a first usage and at least one second SRS resource for a second usage, determine whether a time gap between a first SRS resource of the at least one first SRS resource and a second SRS resource of the at least one second SRS resource is less than a time threshold, and transmit, to a user equipment (UE) a first indication that the time gap is less than the time threshold, in response to determining that the time gap is less than the time threshold.

In another example, a non-transitory computer-readable storage medium having instructions for a base station thereon may be disclosed. The instructions, when executed by a processing circuit, cause the processing circuit to: assign at least one first sounding reference signal (SRS) resource for a first usage and at least one second SRS resource for a second usage, determine whether a time gap between a first SRS resource of the at least one first SRS resource and a second SRS resource of the at least one second SRS resource is less than a time threshold, and transmit, to a user equipment (UE) a first indication that the time gap is less than the time threshold, in response to determining that the time gap is less than the time threshold.

In a further example, a base station for wireless communication may be disclosed. The base station includes means for assigning at least one first sounding reference signal (SRS) resource for a first usage and at least one second SRS resource for a second usage, means for determining whether a time gap between a first SRS resource of the at least one first SRS resource and a second SRS resource of the at least one second SRS resource is less than a time threshold, and means for transmitting, to a user equipment (UE) a first indication that the time gap is less than the time threshold, in response to determining that the time gap is less than the time threshold These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 11A and 11B are example diagrams illustrating an approach to indicate a linkage of merged SRS resources, according to some aspects.

FIG. 22 illustrates an example transmit precoding matrix index (TPMI) table, according to some aspects.

DETAILED DESCRIPTION

Figure 1:
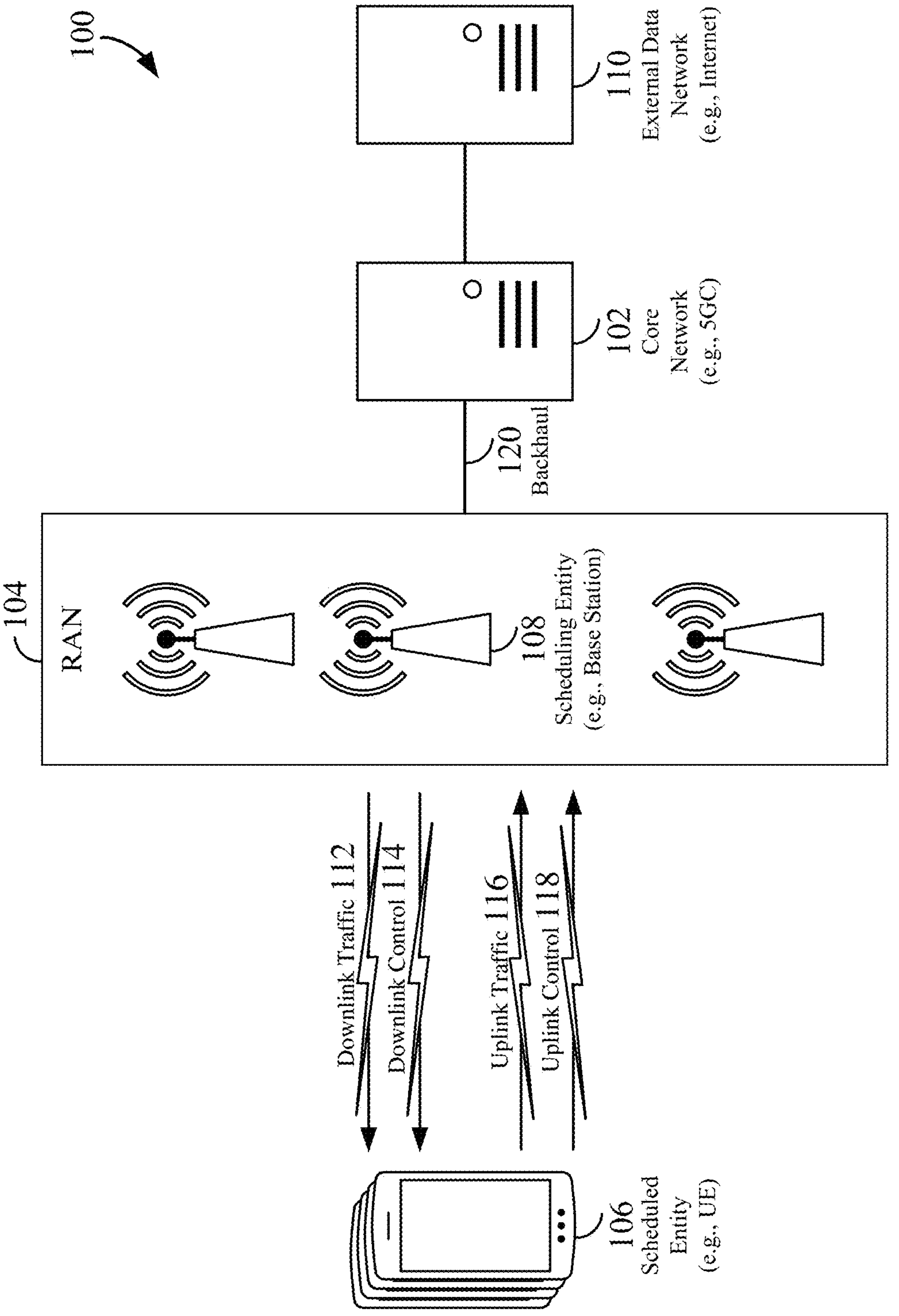
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.126 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x (52.6 GHZ-71 GHZ), FR4 (71 GHZ-114.25 GHZ), and FR5 (114.25 GHZ-275 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2x, FR4, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point, a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies.

UEs may include a number of hardware structural components sized, shaped, and arranged to help in communication; such components can include antennas, antenna array modules, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
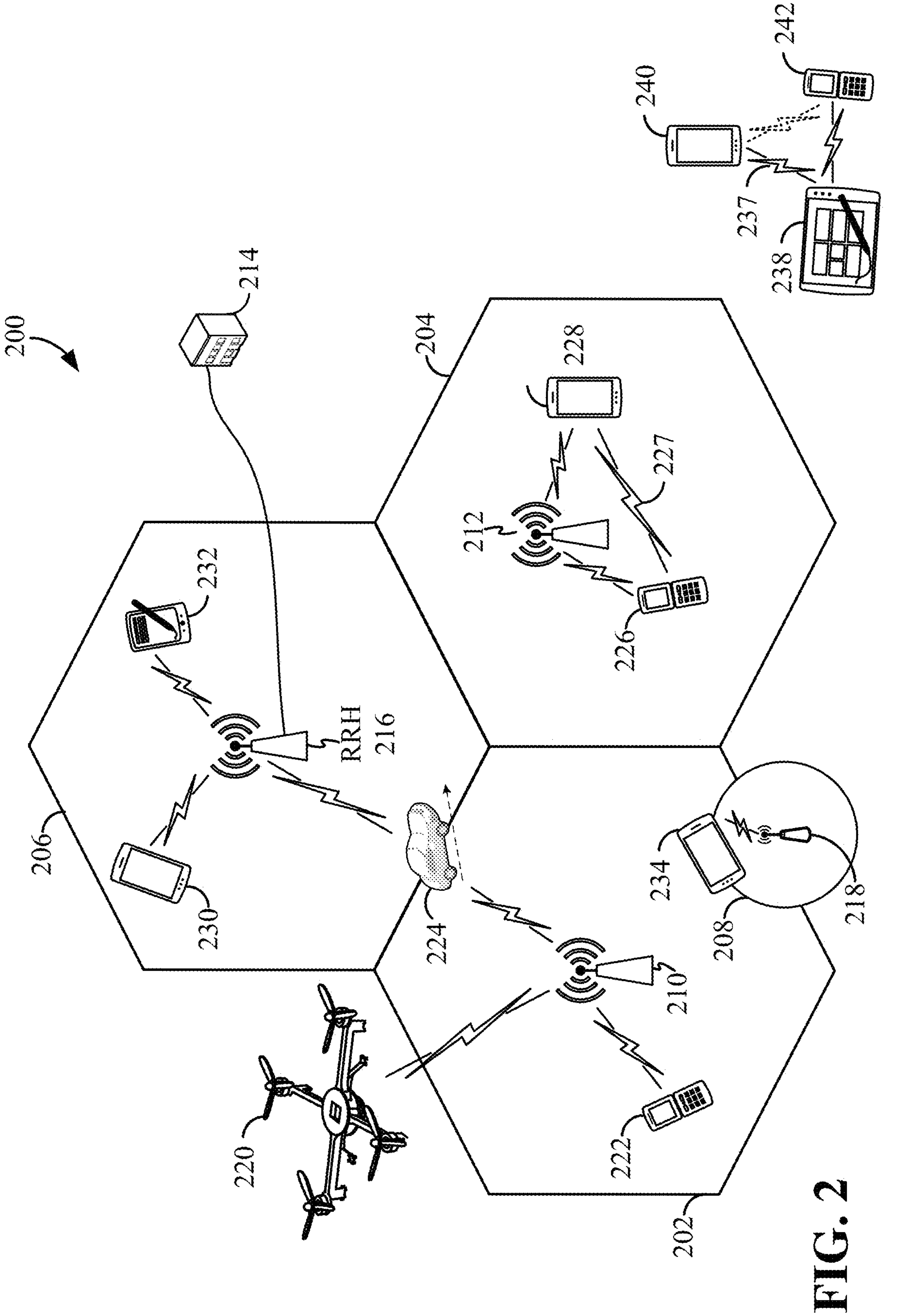
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 222) may also communicate sidelink signals 227 over a direct link (sidelink) without conveying that communication through the base station 222. In this example, the base station 222 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In order for transmissions over the RAN 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD). In FDD, transmissions in different directions may operate at different carrier frequencies (e.g., within paired spectrum). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band FDD, also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
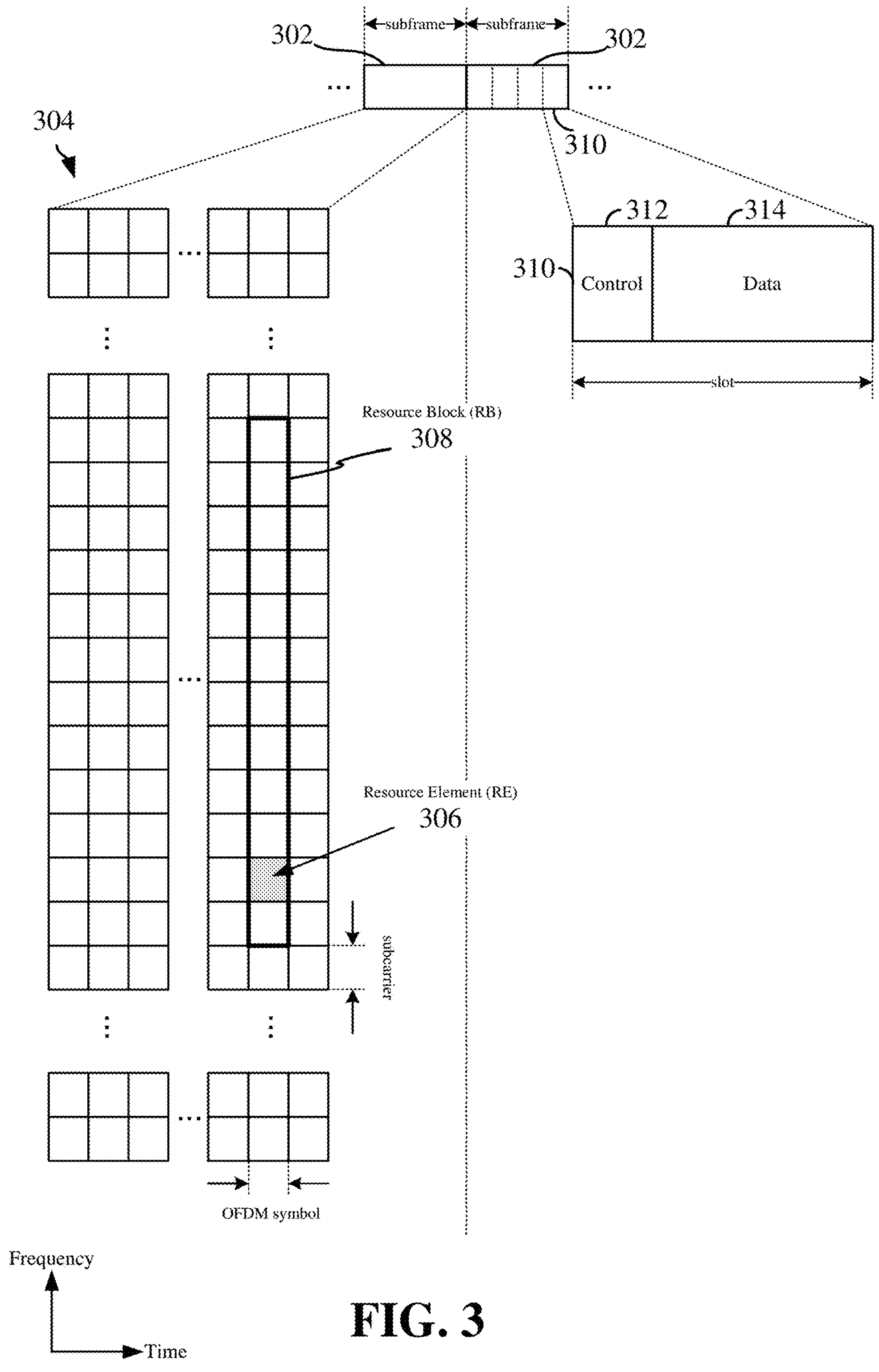
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signal. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
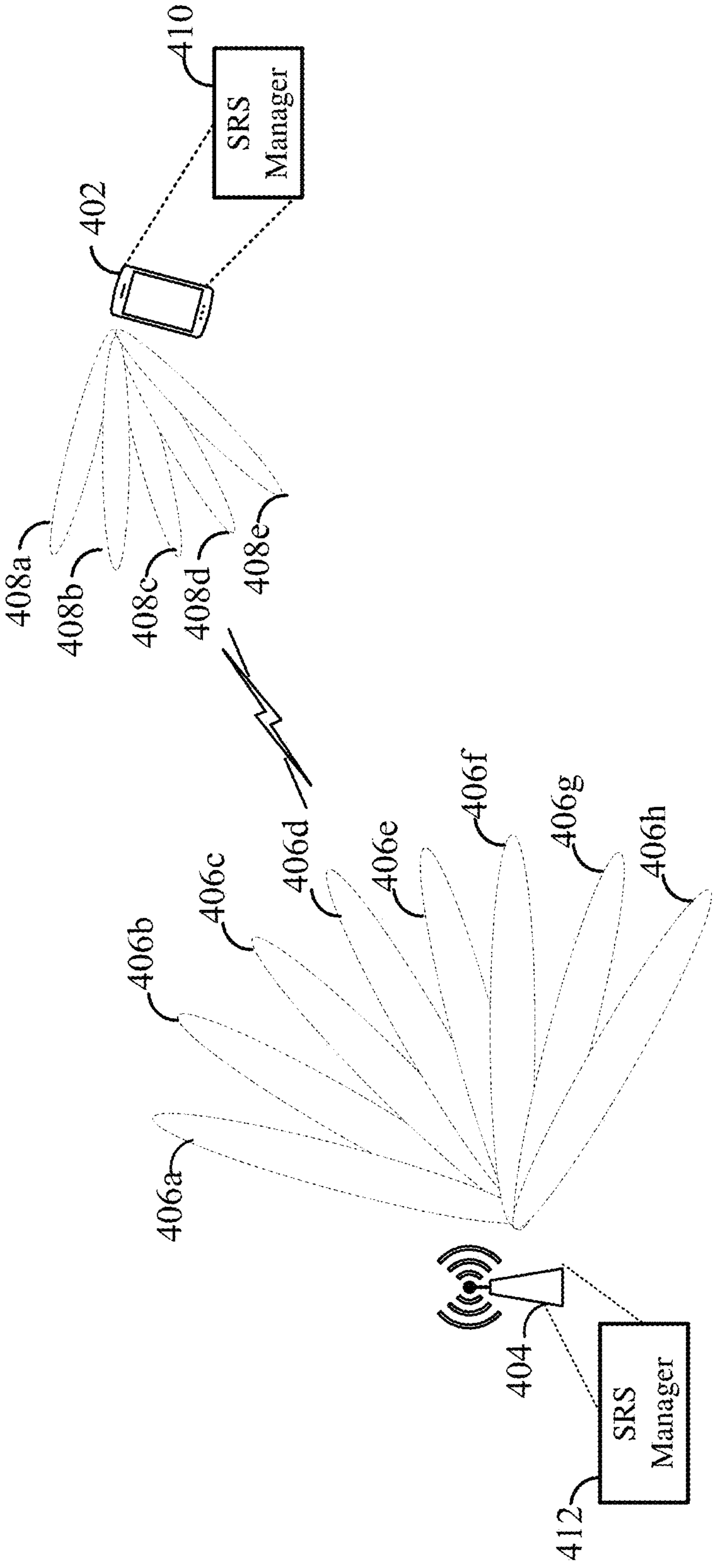
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 2, and the UE 402 may be any of the UEs or scheduled entities illustrated in FIGS. 1 and/or 2.

Beamforming is a signal processing technique that may be used at the transmitter or receiver to shape or steer an antenna beam (e.g., a transmit beam or receive beam) along a spatial path between the transmitter and the receiver. Beamforming may be achieved by combining the signals communicated via a set of antennas (e.g., antenna elements of an antenna array) such that some of the signals experience constructive interference while others experience destructive interference. To create the desired constructive/destructive interference, the transmitter or receiver may apply amplitude and/or phase offsets to signals transmitted or received from the set of antennas.

In the example shown in FIG. 4, the base station 404 is configured to generate a plurality of beams 406*a*-406*h*, each associated with a different beam direction. In addition, the UE 402 is configured to generate a plurality of beams 408*a*-408*c*, each associated with a different beam direction. The base station 404 and UE 402 may select one or more beams 406*a*-406*h* on the base station 404 and one or more beams 408*a*-408*e* on the UE 402 for communication of uplink and downlink signals therebetween using a downlink beam management scheme and/or an uplink beam management scheme.

In an example of a downlink beam management scheme for selection of downlink beams, the base station 404 may be configured to sweep or transmit on each of a plurality of downlink transmit beams 406*a*-406*h* during one or more synchronization slots. For example, the base station 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 406*a*-406*h* transmitted during a same symbol may not be adjacent to one another. In some examples, the base station 404 may transmit more or less beams distributed in all directions (e.g., 360 degrees).

In addition, the UE 402 is configured to receive the downlink beam reference signals on a plurality of downlink receive beams 408*a*-408*c*. In some examples, the UE 402 searches for and identifies each of the downlink transmit beams 406*a*-406*h* based on the beam reference signals. The UE 402 then performs beam measurements (e.g., RSRP, SINR, RSRQ, etc.) on the beam reference signals on each of the downlink receive beams 408*a*-408*e* to determine the respective beam quality of each of the downlink transmit beams 406*a*-406*h* as measured on each of the downlink receive beams 408*a*-408*c*.

The UE 402 can generate and transmit an L1 measurement report, including the respective beam index (beam identifier (ID)) and beam measurement of one or more of the downlink transmit beam 406*a*-406*h* on one or more of the downlink receive beams 408*a*-408*e* to the base station 404. The base station 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 406*d*) on the base station 404 and a single downlink receive beam (e.g., beam 408*c*) on the UE may form a single downlink BPL used for communication between the base station 404 and the UE 402. In another example, multiple downlink transmit beams (e.g., beams 406*c*, 406*d*, and 406*e*) on the base station 404 and a single downlink receive beam (e.g., beam 408*c*) on the UE 402 may form respective downlink BPLs used for communication between the base station 404 and the UE 402. In another example, multiple downlink transmit beams (e.g., beams 406*c*, 406*d*, and 406*c*) on the base station 404 and multiple downlink receive beams (e.g., beams 408*c* and 408*d*) on the UE 402 may form multiple downlink BPLs used for communication between the base station 404 and the UE 402. In this example, a first downlink BPL may include downlink transmit beam 406*c* and downlink receive beam 408*c*, a second downlink BPL may include downlink transmit beam 408*d* and downlink receive beam 408*c*, and a third downlink BPL may include downlink transmit beam 408*e* and downlink receive beam 408*d*.

When the channel is reciprocal, the above-described downlink beam management scheme may also be used to select one or more uplink BPLs for uplink communication from the UE 402 to the base station 404. For example, the downlink BPL formed of beams 406*d* and 408*e* may also serve as an uplink BPL. Here, beam 408*c* is utilized as an uplink transmit beam, while beam 406*d* is utilized as an uplink receive beam.

In an example of an uplink beam management scheme, the UE 402 may be configured to sweep or transmit on each of a plurality of uplink transmit beams 408*a*-408*c*. For example, the UE 402 may transmit an SRS on each beam in the different beam directions. In addition, the base station 404 may be configured to receive the uplink beam reference signals on a plurality of uplink receive beams 406*a*-406*h*. In some examples, the base station 404 searches for and identifies each of the uplink transmit beams 408*a*-408*e* based on the beam reference signals. The base station 404 then performs beam measurements (e.g., RSRP, SINR. RSRQ, etc.) on the beam reference signals on each of the uplink receive beams 406*a*-406*h* to determine the respective beam quality of each of the uplink transmit beams 408*a*-408*e* as measured on each of the uplink receive beams 406*a*-406*h*.

The base station 404 may then select one or more uplink transmit beams on which the UE 402 will transmit unicast downlink control information and/or user data traffic to the base station 404. In some examples, the selected uplink transmit beam(s) have the highest gain. The base station 404 may further select a corresponding uplink receive beam on the base station 404 for each selected serving uplink transmit beam to form a respective uplink beam pair link (BPL) for each selected serving uplink transmit beam. For example, the base station 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The base station 404 may then notify the UE 402 of the selected uplink transmit beams. For example, the base station 404 may provide the SRS resource identifiers (SRIs) identifying the SRSs transmitted on the selected uplink transmit beams. In some examples, the base station 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the base station 404 to the UE 402. For example, the uplink BPLs may also be utilized as downlink BPLs.

To facilitate transmission of SRSs using uplink beams from the UE 402 to the base station 404, each of the UE 402 and base station 406 may include a respective SRS manager 410 and 412, respectively, configured to utilize an SRS configuration for an SRS resource set including SRS resources. For example, the SRS manager 412 may be configured to generate the SRS configuration and provide the SRS configuration to the UE 402. In addition, the SRS manager 410 may be configured to utilize the SRS configuration to generate a plurality of SRSs for transmission towards the base station 404.

Figure 5:
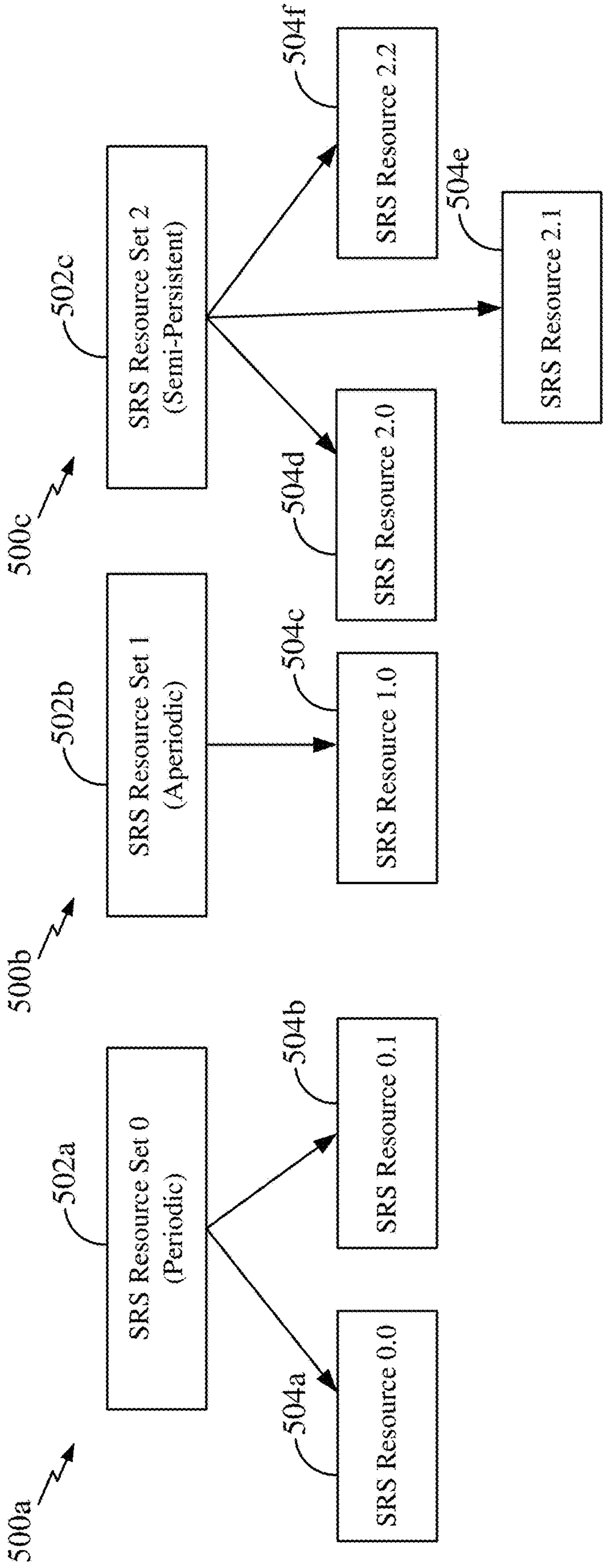
FIG. 5 is a diagram illustrating exemplary sounding reference signal (SRS) configurations for SRS resource sets, each including SRS resources according to some aspects.

FIG. 5 is a diagram illustrating exemplary SRS configurations 500*a*-500*c* for SRS resource sets 502*a*-502*c*, each including SRS resources 504*a*-504*f* according to some aspects. An SRS resource set may include one or more SRS resources. For example, SRS resource set 502*a* (SRS Resource Set 0) includes SRS resources 504*a* and 504*b* (SRS Resource 0.0 and SRS Resource 0.1), SRS resource set 502*b* (SRS Resource Set 1) includes SRS resource 504*c* (SRS Resource 1.0), and SRS resource set 502*c* (SRS Resource Set 2) includes SRS resource sets 504*d*, 504*e*, and 504*f* (SRS Resource 2.0, SRS Resource 2.1, and SRS Resource 2.2).

As indicated in FIG. 5, multiple SRS resource sets 502*a*-502*c* may be configured for a UE. In addition, each SRS resource set 502*a*-502*c* may be configured to be periodic, aperiodic, or semi-persistent, such that each of the SRS resources within the corresponding SRS resource set are periodic, aperiodic, or semi-persistent, respectively. For example, the SRS resources 504*a* and 504*b* within SRS resource set 502*a* may be periodic SRS resources, the SRS resource 504*c* within SRS resource set 502*b* may be aperiodic SRS resources, and the SRS resources 504*d*-504*f* within SRS resource set 502*c* may be semi-persistent SRS resources.

Each SRS resource 504*a*-504*f* includes a set of SRS resource parameters configuring the SRS resource. For example, the SRS resource parameters may include a set of port(s) (e.g., uplink beam), number of consecutive symbols, time domain allocation, repetition, transmission comb structure, bandwidth, and other suitable parameters. Each SRS may further be quasi co-located (QCL'ed) with another reference signal, such as an SSB, CSI-RS, or another SRS. Thus, based on the QCL association (e.g., with an SSB beam, CSI-RS beam, or SRS beam), the SRS resource may be transmitted with the same spatial domain filter utilized for reception/transmission of the indicated reference signal (e.g., SSB beam, CSI-RS beam, or SRS beam).

The respective sets of SRS resource parameters for each of the SRS resources in a particular SRS resource set collectively form the SRS resource set parameters for the SRS resource set. In addition, the SRS resource set itself may further include additional SRS resource set parameters. For example, the SRS resource set parameters for the aperiodic SRS resource set 502*b* may further include an aperiodic trigger state (e.g., codepoint) for the aperiodic SRS resource set 502*b* (e.g., up to three trigger states may be possible, each mapping to an aperiodic SRS resource set), a slot offset between the slot including the DCI triggering the aperiodic SRS resource and transmission of the SRS (e.g., SRS is transmitted k slot(s) after the slot carrying the DCI containing the trigger state), and a CSI-RS resource identifier (CRI) associated with the aperiodic SRS resource set 502*b* for precoder estimation of the aperiodic SRSs. As another example, the SRS configuration for a periodic SRS resource set 502*a* or semi-persistent SRS resource set 502*c* may indicate the periodicity of the SRS resources (e.g., the periodicity of transmission of SRSs). The respective SRS resource set parameters then collectively form the SRS configuration 500*a*-500*c* of the corresponding SRS resource set 502*a*-502*c*.

As discussed above, there may be different usages for SRS resources. SRS resources may span 1, 2, 4, 8, or 12 adjacent symbols, with up to 8 antenna ports per SRS resource. Here, an antenna port refers to a logical antenna port corresponding to one or more antenna elements of an antenna array or antenna panel on the UE. One or more antenna ports of an SRS resource may be sounded in each symbol. An SRS can be transmitted anywhere within the slot. For example, an SRS may be transmitted within a slot after a PUSCH is communicated in that slot.

Figure 6:
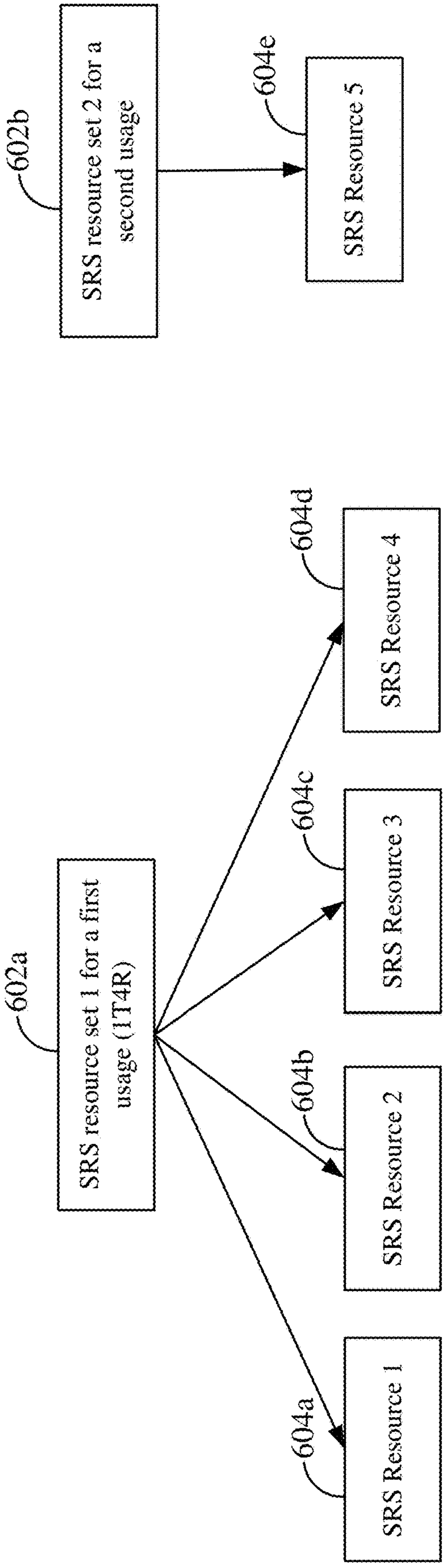
FIG. 6 is an example diagram illustrating different SRS resource sets for different usages.

As discussed above, an SRS resource set may contain one or more SRS resources transmitted by a UE. In an example, an SRS resource may be indicated based on an SRS resource indicator (SRI) from within the SRS resource set. Further, as discussed above, a transmission of SRSs utilizing SRS resources within an SRS resource set may be aperiodic (e.g., triggered by DCI), semi-persistent, or periodic. A UE may be configured with multiple SRS resources, which may be grouped into one or more SRS resource sets based on a type of a usage, where various types of usages may include an antenna switching usage, a codebook-based usage, a non-codebook-based usage, or a beam management usage. FIG. 6 is an example diagram illustrating different SRS resource sets for different usages. In FIG. 6, a first SRS resource set 602*a* may be configured for a first usage (e.g., codebook-based usage), and include four SRS resources 604*a*, 604*b*, 604*c*, and 604*d*. In addition, a second SRS resource set 602*b* may be configured for a second usage (e.g., antenna switching usage) and include a single SRS resource 604*c*. In an example, transmissions of the SRS resources 604*a*, 604*b*, 604*c*, and 604*d* in the first SRS resource set 602*a* may be periodic, while a transmission of the SRS resource 604*e* in the second SRS resource set 602*b* may be aperiodic. SRS transmissions may be wideband/subband transmissions. For example, each SRS resource may be configured for the entire band instead of the narrower uplink sub-band to further improve the channel estimation quality and beam selection. In an example, an SRS bandwidth may be in a multiple of 4 PRBs.

SRS resources sets configured for antenna switching may enable DL beamforming in TDD bands by exploiting channel reciprocity. Further, the SRS antenna switching may be used for UL sounding (e.g. for PUSCH scheduling/beamforming). For example, to facilitate antenna panel switching, the base station may receive a respective SRS on each of the antenna panels of the base station and obtain channel state information (CSI) for each panel separately. Based on the separately received SRSs, the base station may estimate the respective channel between the UE and the base station for each panel and determine a respective uplink beam for each panel. For example, up to two SRS resource sets may be configured for SRS transmissions with antenna switching. Each SRS resource in an SRS resource set may be associated with the same number of ports on the UE. A guard period, which may include one or more symbols, may exist between each SRS resource in an SRS resource set configured for antenna switching.

For codebook-based transmissions, the UE may be configured with a single SRS resource set with a usage set to "codebook." The SRS resources included in the codebook-based SRS resource may each be a multi-port SRS The UE may be configured for transmission of at least one multi-port SRS. Based on measurements on the configured multi-port SRS, the base station may sound the channel and determine a suitable rank and precoder matrix. An SRI (e.g., 1 bit or 2 bits) transmitted by the base station may indicate to the UE which SRS resource to use for transmitting an SRS.

In an aspect, SRS resources for different usages may be merged to reduce an SRS overhead. For example, the different usages may include an antenna switching usage related to DL CSI acquisition and a codebook usage related to selecting a UL codebook for a PUSCH or other uplink transmission. There may be issues related to merging SRS resources having different time domain behaviors. A time domain behavior, which indicates whether an SRS transmission is periodic, semi-persistent, or a periodic, may be configured at both SRS resource and SRS resource set levels. For example, a periodic SRS resource for a codebook usage may be merged with an aperiodic SRS resource for an antenna switching usage, such that one SRS resource may be used for both the codebook usage and the antenna switching usage. The UE may sound extra ports for an SRS resource for an antenna switching usage. However, optimal conditions for merging SRS resources in two different SRS resource sets or effective ways to associating/linking one SRS resource in one SRS resource set to another SRS resource in a different SRS resource set have not been developed.

According to some aspects of the disclosure, when a time gap between a first SRS resource for a first usage and a second SRS resource for a second usage in time is less than a time threshold, a UE may transmit a reference signal utilizing one of the first SRS resource or the second SRS resource for both the first usage and the second usage. For example, when a first SRS resource for a first usage (e.g., codebook usage) occurs at a time occasion near a second SRS resource for a different usage (e.g., antenna switching usage), then these two SRS resources may be merged for the second usage as well as for the first usage. The time threshold may be a value to determine whether the two SRS resources are near each other in time. For example, the time threshold may be set based on a number of symbols or a number of slots.

Hence, for example, if the UE determines that the time gap between the first SRS resource for the first usage (e.g., codebook usage) and the second SRS resource for the second usage (e.g., antenna switching usage) is less than the time threshold, the UE may merge the first SRS resource and the second SRS resource. In this case where the time gap is less than the time threshold, the UE may utilize one of the first SRS resource or the second SRS resource to transmit an SRS for both the first usage and the second usage, and may not utilize the other one of the first SRS resource or the second SRS resource. In an aspect, the first SRS resource and the second SRS resource may be configured with at least one same antenna port, which may allow the merging of these SRS two resources. On the other hand, if the UE determines that the time gap between the first SRS resource for the first usage and the second SRS resource for the second usage is greater than or equal to the time threshold, the UE may not merge the two SRS resources but may transmit, to the base station, a first reference signal for the first usage using the first SRS resource and a second reference signal for the second usage using the second SRS resource.

In an aspect, the one of the first SRS resource or the second SRS resource that is used for transmitting the SRS may be a periodic SRS resource. In an aspect, the other one of the first SRS resource or the second SRS resource that is not used for transmitting the reference signal may be an aperiodic SRS resource. In an aspect, the threshold may be determined based on a periodicity of the periodic SRS resources (e.g., a periodicity of the first SRS resource). For example, in this aspect, the threshold may be defined as X % of the periodicity. The value of X may be determined by the UE or may be indicated by the base station. In another aspect, the threshold may be defined as a constant value, which may be a predefined value.

In an aspect, a base station may consider the time threshold. The base station may assign SRS resources, and thus the base station may have the information necessary to determine whether the time gap between the first SRS resource for the first usage and the second SRS resource for the second usage is less than the time threshold. Subsequently, the base station may transmit an indication that indicates whether the time gap between the first SRS resource for the first usage and the second SRS resource for the second usage is less than the time threshold. In this aspect, based on this indication, the UE may determine whether the time gap between the first SRS resource for the first usage and the second SRS resource for the second usage is less than the time threshold. In another aspect, the UE may receive information about the SRS resources (e.g., via a DCI configuration), and may determine whether the time gap between the first SRS resource for the first usage and the second SRS resource for the second usage is less than the time threshold based on such information. For example, if the first SRS resource or the second SRS resource is an aperiodic SRS resource, the DCI configuration may be received when DCI for triggering the aperiodic SRS resource is received.

Figure 7:
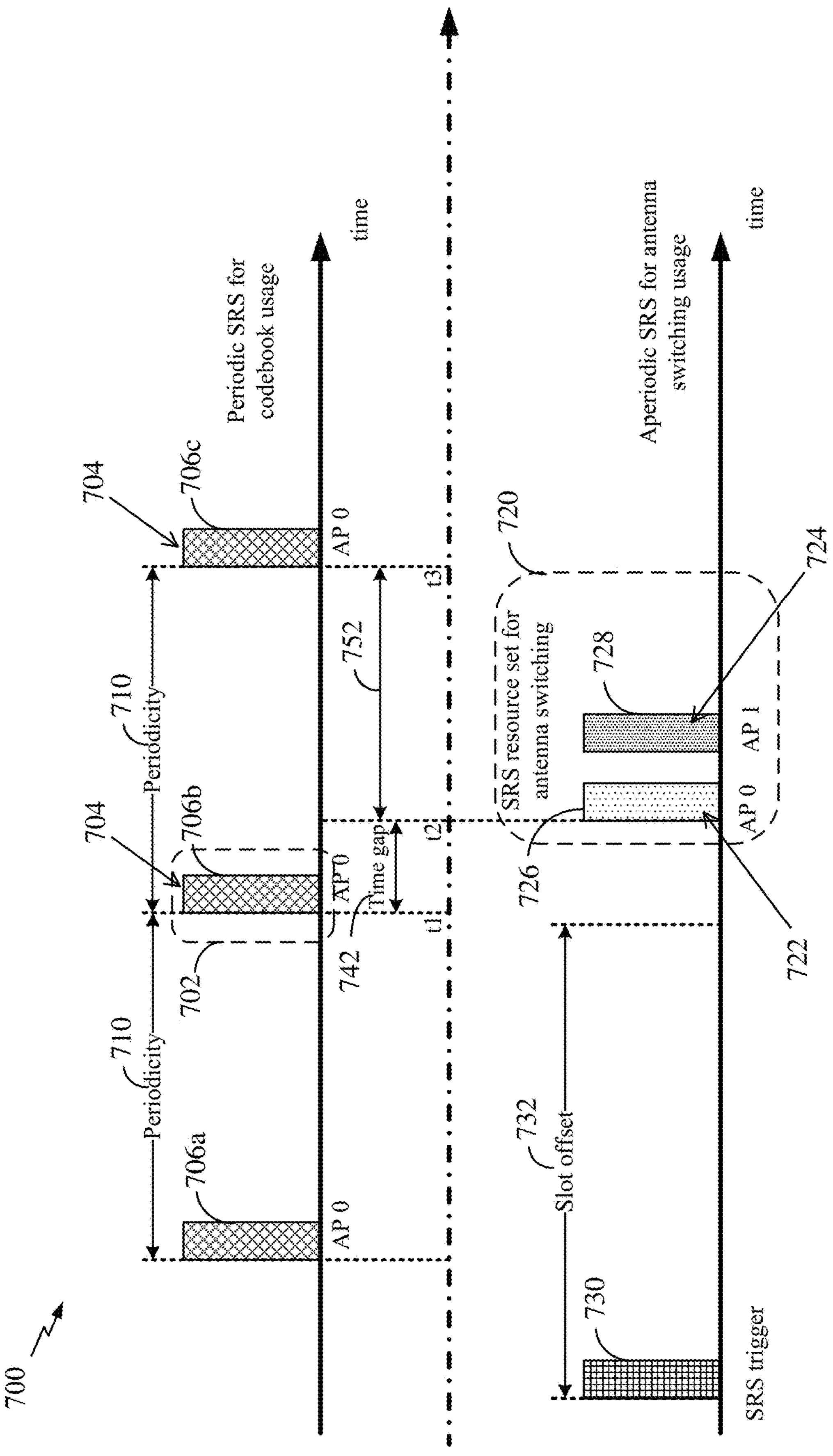
FIG. 7 is an example diagram illustrating timelines of SRS resources for two different usages, according to some aspects.

FIG. 7 is an example diagram 700 illustrating timelines of SRS resources for two different usages, according to some aspects. In FIG. 7, a first SRS resource set 702 may include a periodic SRS resource 704, which may be utilized to transmit periodic SRSs, denoted as **706*a*, 706*b*, and 706*c*, for a codebook usage, recurring with a periodicity 710. In the example shown in FIG. 7, a single antenna port (AP) 0 is associated with the periodic SRS resource 704. Further, in FIG. 7, a second SRS resource set 720 may include aperiodic SRS resources 722 and 724, each utilized in transmitting a respective SRS 726 and 728. The second SRS resource set 720 is triggered by an SRS trigger 730 and occurs after a slot offset 732 from the SRS trigger. The SRS trigger 730 may include, for example, DCI triggering the second SRS resource set 720. For example, the antenna switching usage may be in a 1T2R configuration, where the SRS resource set has two SRS resources transmitting at different symbols, and each SRS resource in in the SRS resource set includes a single, different SRS port, such that each SRS resource is associated with a different antenna port on the UE. In FIG. 7, the AP 0 is associated with the aperiodic SRS resource 722 and the AP 1 is associated with the aperiodic SRS resource 724**.

In an aspect, for a potential merge candidate, an aperiodic SRS resource associated with one or more antenna ports that are the same as one or more antenna ports associated with a periodic SRS resource may be considered for merging. In this aspect, the periodic SRS resource 704 is associated with the AP 0. Therefore, the aperiodic SRS resource 722 associated with the AP 0 may be considered for merging. In FIG. 7, the periodic SRS resource 704 is used for a transmission of a periodic SRS **706*b* at time 1 (t1) and the aperiodic SRS resource 722 is used for a transmission of an aperiodic SRS 726 at time 2 (t2). A transmission of the periodic SRS 706*c* occurs at time 3 (t3) using the periodic SRS resource 704. In FIG. 7, a time difference 742 between t1 and t2 is shorter than a time difference 752 between t2 and t3. Thus, in an aspect, the time gap utilized to determine whether to merge two different SRS resources for different usages may be the time difference 742. For example, the time gap for comparing with the time threshold may be: time gap=min {|t1−t2|, |t2−t3**|}.

The UE may determine whether the time gap 742 is less than the time threshold. In an aspect, the threshold may be predefined or configured. In an aspect, a unit of the time threshold can be a symbol and/or a slot. If the time gap 742 is less than the time threshold, then the periodic SRS resource 704 and the aperiodic SRS resource 722 may be merged, such that the UE may transmit an SRS using the periodic SRS resource 704 for both the codebook usage and the antenna switching usage, without using the aperiodic SRS resource 722. If the time gap 742 is greater than or equal to the time threshold, the periodic SRS resource 704 and the aperiodic SRS resource 722 may not be merged.

Figure 8:
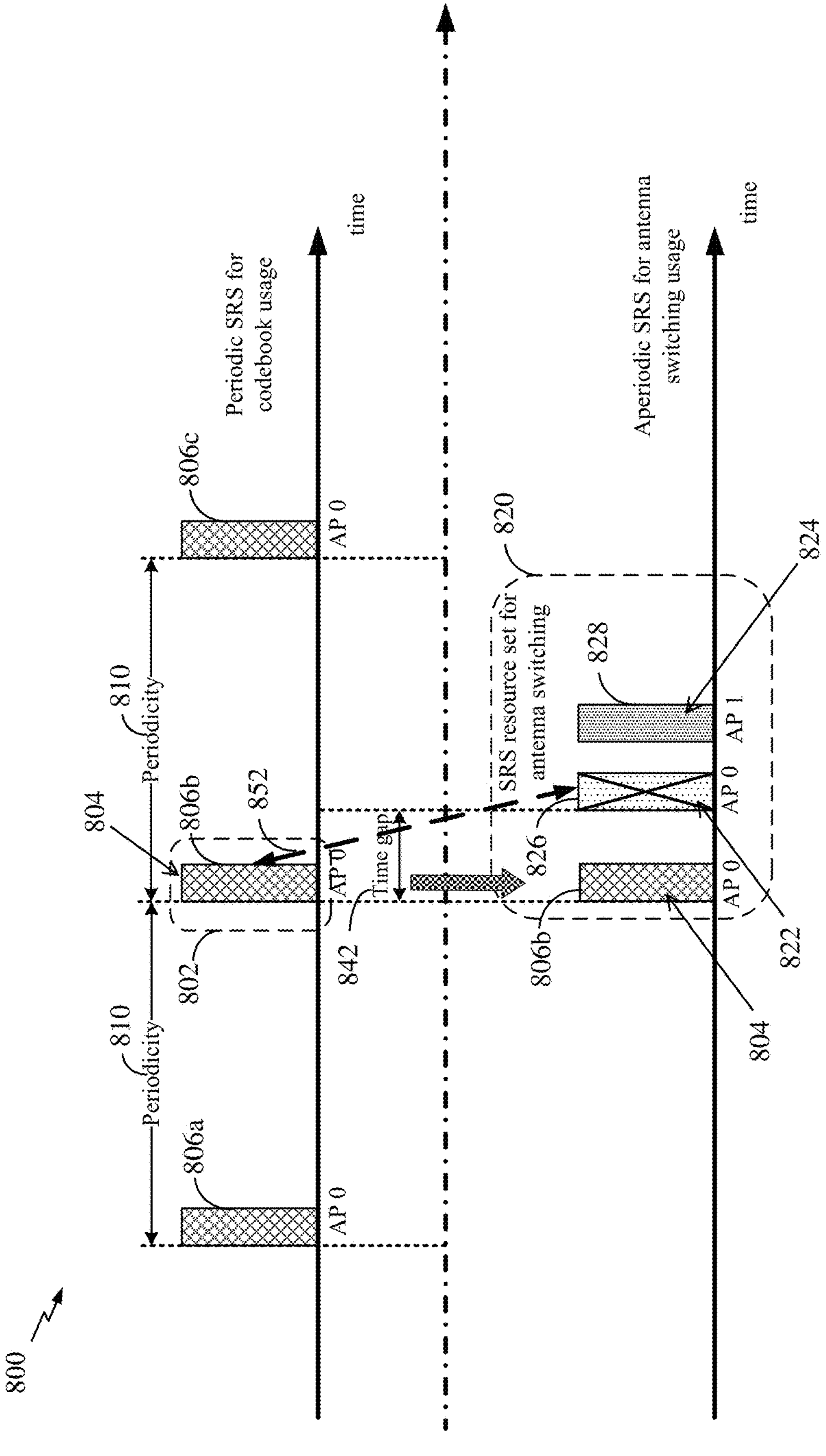
FIG. 8 is an example diagram illustrating a periodic SRS resource for a first usage merging with an aperiodic SRS resource for a second usage, according to some aspects.

Merging of an SRS resource for the first usage (e.g., codebook usage) and an SRS resource may be further illustrated in FIG. 8. FIG. 8 is an example diagram 800 illustrating a periodic SRS resource for a first usage merging with an aperiodic SRS resource for a second usage, according to some aspects.

In FIG. 8, a first SRS resource set 802 may include a periodic SRS resource 804, which may be utilized to transmit periodic SRSs, denoted as 806*a*, 806*b*, and 806*c*, for a codebook usage, recurring with a periodicity 810. An AP 0 is associated with the periodic SRS resource 804. Further, in FIG. 8, a second SRS resource set 820 may include aperiodic SRS resources 822 and 824, each utilized in transmitting a respective SRS 826 and 828. The second SRS resource set 820 may be triggered by an SRS trigger. The SRS trigger 830 may include, for example, DCI triggering the second SRS resource set 820. For example, the antenna switching usage may be in a 1T2R configuration. In FIG. 8, the AP 0 is associated with the aperiodic SRS resource 822 and the AP 1 is associated with the aperiodic SRS resource 824. In an aspect, because the periodic SRS resource and the aperiodic SRS resource 822 are associated with the same AP, the aperiodic SRS resource 822 may be a merge candidate, depending on whether a time gap between the aperiodic SRS resource 822 and a periodic SRS resource is less than the time threshold.

In FIG. 8, a time gap 842 between an instance of the periodic SRS resource 804 for the transmission of the periodic SRS 806*b* and the aperiodic SRS resource 822 for the transmission of the aperiodic SRS 826 is less than the time threshold, and thus the periodic SRS resource 804 for the periodic SRS 806*b* and the aperiodic SRS resource 822 may be merged. As a result, the periodic SRS resource 804 for the periodic SRS 806*b* may be used to transmit an SRS for both the codebook usage and the antenna switching usage, using the AP 0. Further, as a result, the aperiodic SRS resource 822 may not be used for the antenna switching usage. The aperiodic SRS resource 824 associated with the AP 1 is not merged with the periodic SRS resource 804, and thus is used to transmit an SRS for the antenna switching usage. A linkage 852 between the periodic SRS resource 804 for the periodic SRS 806*b* and the aperiodic SRS resource 822 that indicates the merge of these two SRS resources may be defined in an upper layer (e.g., in an RRC layer), and thus may be included in an RRC message.

Figure 9:
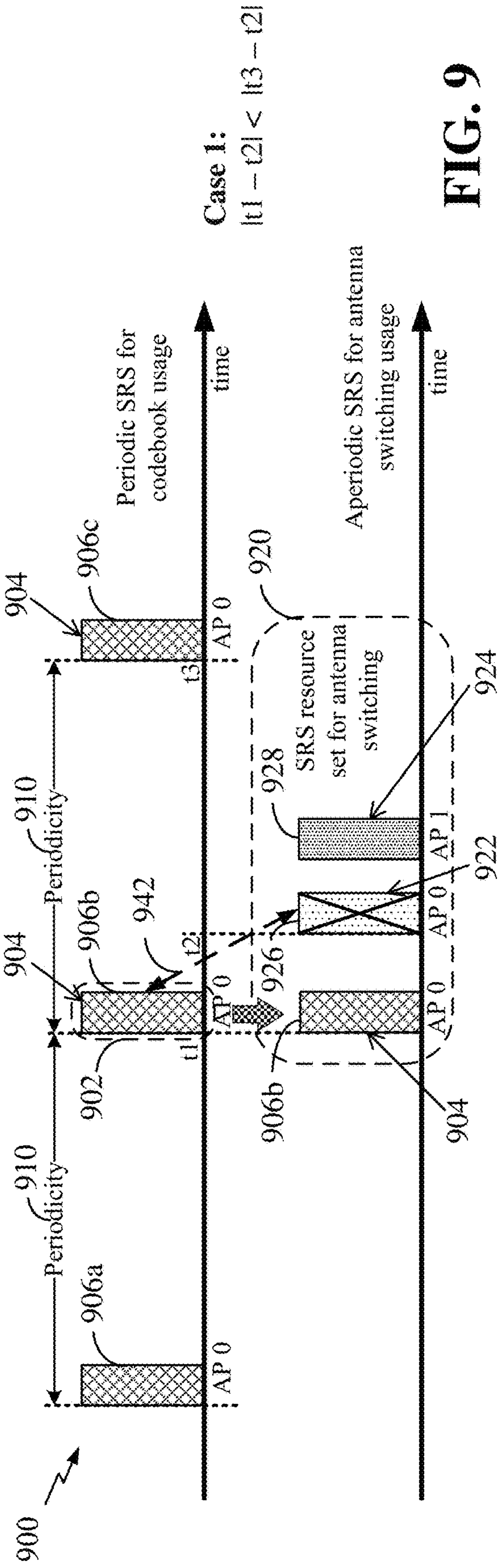
FIG. 9 is an example diagram illustrating a periodic SRS resource for one usage merging with a later aperiodic SRS resource for another usage, according to some aspects.
Figure 10:
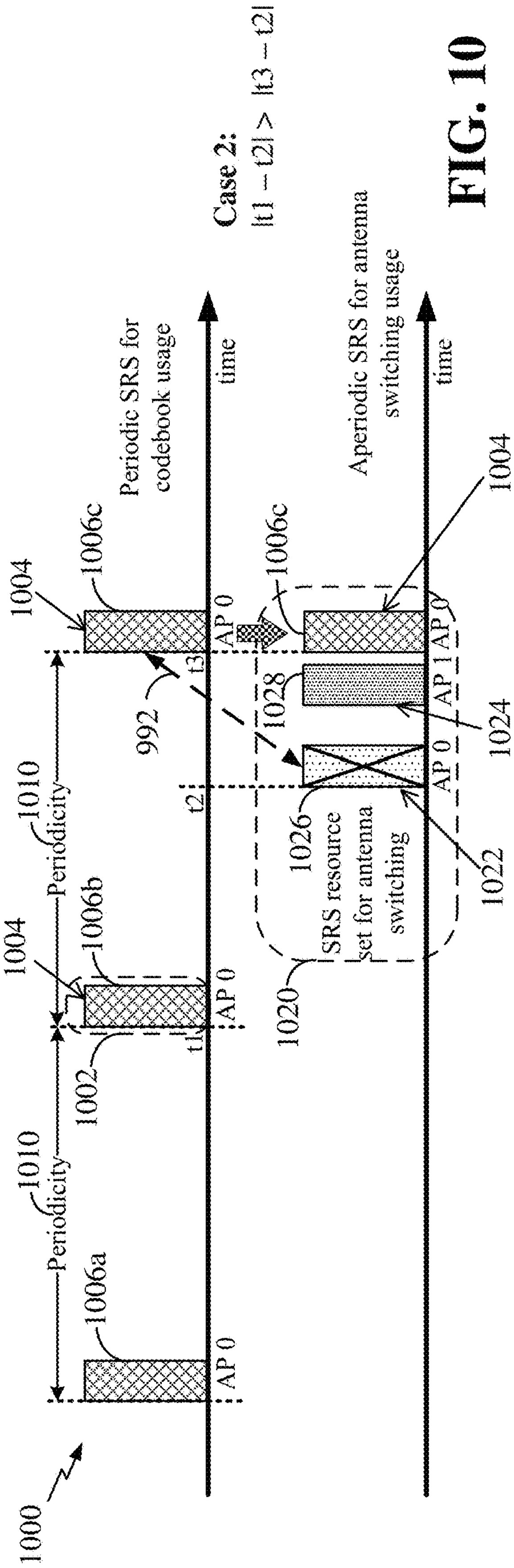
FIG. 10 is an example diagram illustrating a periodic SRS resource for one usage merging with an earlier aperiodic SRS resource for another usage, according to some aspects.

FIGS. 9 and 10 are example diagrams illustrating two different cases where a periodic SRS resource for one usage merges with an aperiodic SRS resource for another usage, according to some aspects. In FIG. 9, the example diagram 900 illustrates a periodic SRS resource for one usage merging with a later aperiodic SRS resource for another usage, according to some aspects. The example diagram 900 of FIG. 9 is similar to the example diagram 800 of FIG. 8. In FIG. 9, a first SRS resource set 902 may include a periodic SRS resource 904, which may be utilized to transmit periodic SRSs, denoted as 906*a*, 906*b*, and 906*c*, for a codebook usage, recurring with a periodicity 910. An AP 0 is associated with the periodic SRS resource 904. Further, in FIG. 9, a second SRS resource set 920 may include aperiodic SRS resources 922 and 924, each utilized in transmitting a respective SRS 926 and 928, which may be triggered by an SRS trigger signal. For example, the antenna switching usage may be in a 1T2R configuration. In FIG. 9, the AP 0 is associated with the aperiodic SRS resource 922 and the AP 1 is associated with the aperiodic SRS resource 924. In an aspect, because the periodic SRS resource and the aperiodic SRS resource 922 are associated with the same AP, the aperiodic SRS resource 922 may be a merge candidate, depending on whether a time gap between the aperiodic SRS resource 922 and a periodic SRS resource is less than the time threshold.

The aperiodic SRS resource 922 occurs at t2, which is between t1 at which the periodic SRS resource 904 for the transmission of the periodic SRS 906*b* is assigned and t3 at which the periodic SRS resource 904 for the transmission of the periodic SRS 906*c* is assigned. In FIG. 9, |t1−t2|<|t3−t2|, and thus the periodic SRS resource 904 for the periodic SRS 906*b* is closer in time to the aperiodic SRS resource 922 than the periodic SRS resource 904 for the periodic SRS 906*c*. Therefore, a merging may occur between the periodic SRS resource 904 for the periodic SRS 906*b* and the aperiodic SRS resource 922 to utilize the periodic SRS resource 904 to transmit a reference signal for both the codebook usage and the antenna switching usage, without utilizing the aperiodic SRS resource 922, if a time gap between t1 and t2 is less than the time threshold. Hence, a linkage 942 between the periodic SRS resource 904 for the periodic SRS 906*b* and the aperiodic SRS resource 922 exists in FIG. 9.

In FIG. 10, the example diagram 1000 illustrates a periodic SRS resource for one usage merging with an earlier aperiodic SRS resource for another usage, according to some aspects. In FIG. 10, a first SRS resource set 1002 may include a periodic SRS resource 1004, which may be utilized to transmit periodic SRSs, denoted as 1006*a*, 1006*b*, and 1006*c*, for a codebook usage, recurring with a periodicity 1060. An AP 0 is associated with the periodic SRS resource 1004. Further, in FIG. 10, a second SRS resource set 1020 may include aperiodic SRS resources 1022 and 1024, each utilized in transmitting a respective SRS 1026 and 1028, which may be triggered by an SRS trigger signal. For example, the antenna switching usage may be in a 1T2R configuration. In FIG. 10, the AP 0 is associated with the aperiodic SRS resource 1022 and the AP 1 is associated with the aperiodic SRS resource 1024. In an aspect, because the periodic SRS resource and the aperiodic SRS resource 1022 are associated with the same AP, the aperiodic SRS resource 1022 may be a merge candidate, depending on whether a time gap between the aperiodic SRS resource 1022 and a periodic SRS resource is less than the time threshold.

The aperiodic SRS resource 1022 occurs at t2, which is between t1 at which the periodic SRS resource 1004 for the transmission of the periodic SRS 1006*b* is assigned and t3 at which the periodic SRS resource 1004 for the transmission of the periodic SRS 1006*c* is assigned. In FIG. 10, |t1−t2|>|t3−t2|, and thus the periodic SRS resource 904 for the periodic SRS 1006*c* is closer in time to the aperiodic SRS resource 1022 than the periodic SRS resource 904 for the periodic SRS 1006*b*. Therefore, a merging may occur between the periodic SRS resource 1004 for the periodic SRS 1006*c* and the aperiodic SRS resource 1022 to utilize the periodic SRS resource 1004 for the periodic SRS 1006*c* to transmit a reference signal for both the codebook usage and the antenna switching usage, without utilizing the aperiodic SRS resource 1022, if a time gap between t2 and t3 is less than the time threshold. Hence, a linkage 1092 between the periodic SRS resource 1004 for the periodic SRS 1006*c* and the aperiodic SRS resource 1022 exists in FIG. 10.

As discussed above, a linkage between the first SRS resource for the first usage and the second SRS resource for the second usage may be indicated in an RRC message, where the one of the first SRS resource or the second SRS resource may be utilized for both the first usage and the second usage when the time gap is less than the time threshold. In an aspect, the linkage may be indicated by an indication of the one of the first SRS resource or the second SRS resource in a merged SRS resource field and an indication of the other one of the first SRS resource or the second SRS resource in a current SRS resource field, where the one of the first SRS resource or the second SRS resource is a merged SRS resource utilized for both the first usage and the second usage when the time gap between the first SRS resource for the first usage and the second SRS resource for the second usage is less than the time threshold. For example, the merged SRS resource field and the current SRS resource field may be introduced in an RRC configuration (e.g., in a higher layer parameter), which may indicate a linkage between the two SRS resources that can be merged, where the two SRS resources may be configured with the same antenna port(s) or the antenna ports associated with the merged SRS resource cover the antenna ports associated with the current SRS resource that is not used after the merge.

Figure 11B:
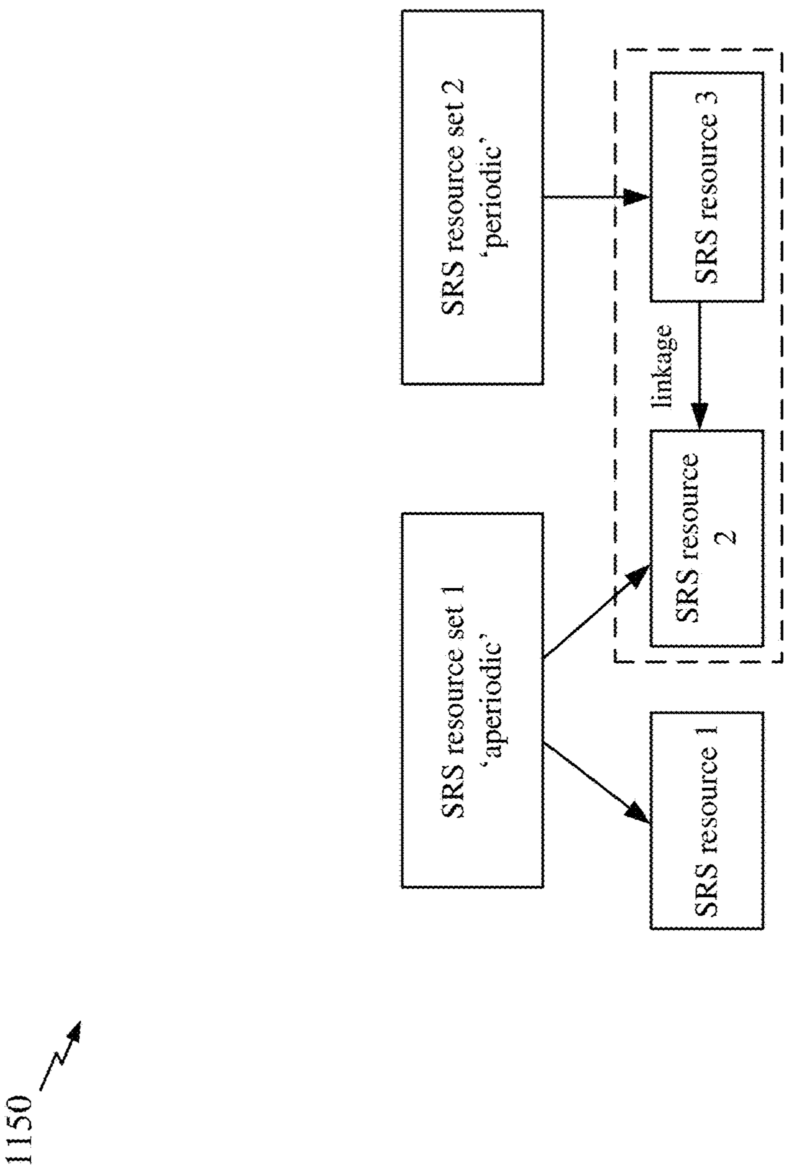

FIGS. 11A and 11B are example diagrams illustrating an approach to indicate a linkage of merged SRS resources, according to some aspects. An SRS resource set field 1100 in FIG. 11A may be included in the RRC configuration. In the SRS resource set field 1100 of FIG. 11, an associated merged SRS resource field 1110 includes a merged SRS resource field 1112 and a current SRS resource field 1114. The merged SRS resource field 1112 may include an SRS-ResourceId field that indicates an SRS resource (e.g., periodic SRS resource) from another resource set for the first usage (e.g., codebook usage). The current SRS resource field 1114 may include an SRS-ResourceId field that indicates an SRS resource (e.g., aperiodic SRS resource) in this resource set for the second usage, which may be substituted by the SRS resource indicated by the merged SRS resource field 1112 if a time gap between these two resources is less than the time threshold. In an example, referring to an example diagram 1150 of FIG. 11B, the merged SRS resource field 1112 may indicate the SRS resource 3 of the periodic SRS resource set while the current SRS resource field 1114 may indicate the SRS resource 2 of the aperiodic SRS resource, thereby indicating the linkage between the SRS resource 3 of the periodic SRS resource set and the SRS resource 2 of the aperiodic SRS resource.

Figure 12A:
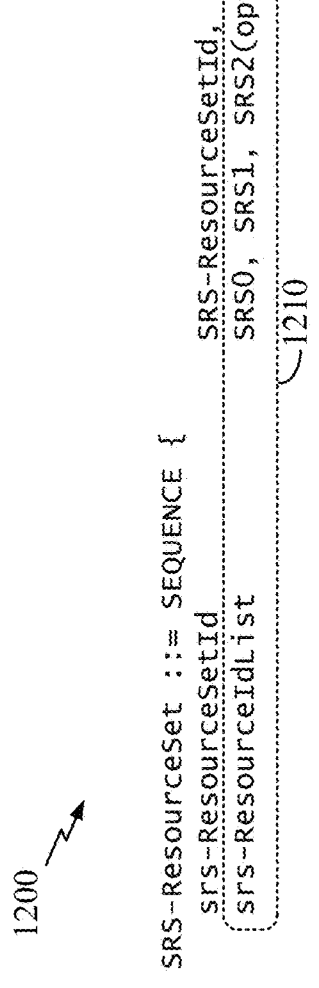
FIGS. 12A and 12B are example diagrams illustrating an approach to indicate a linkage of merged SRS resources, according to some aspects.
Figure 12B:
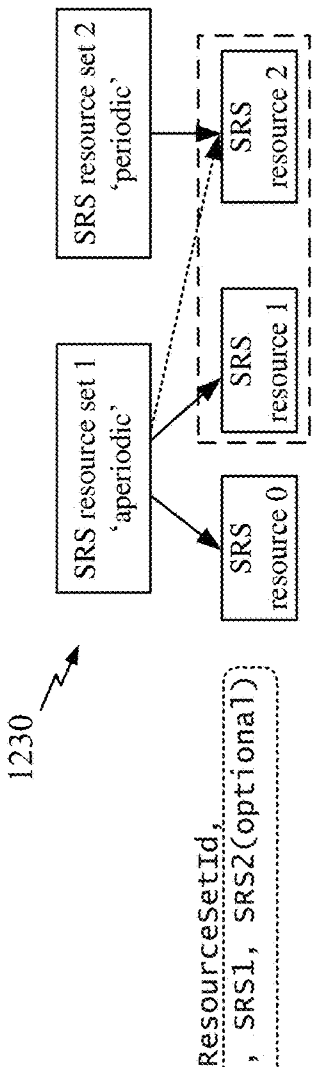

In an aspect, an indication of the first resource in a second SRS resource field of the RRC message, the second SRS resource field indicating one or more second SRS resources including the second SRS resource. FIGS. 12A and 12B are example diagrams illustrating an approach to indicate a linkage of merged SRS resources, according to some aspects. An SRS resource set field 1200 in FIG. 12A may be for second SRS resource(s) for the second usage and may be included in the RRC configuration. The SRS resource set field 1200 of FIG. 12A for second SRS resource(s) may include an SRS resource ID list 1210 that lists the second SRS resources for the second usage and may optionally include a first SRS resource for the first usage. Therefore, the linkage between the first SRS resource and the second SRS resource may be indicated by the SRS resource ID list 1210 for the second SRS resource(s) that may list the second SRS resources as well as the first SRS resource. For example, referring to an example diagram 1230 of FIG. 12B, the SRS resource ID list 1210 may list the SRS resource 0 and the SRS resource 1 of the aperiodic SRS resource set and may optionally list the SRS resource 2 of the periodic SRS resource set next to the SRS resource 1 of the aperiodic SRS resource set, thereby indicating the linkage between the SRS resource 2 of the periodic SRS resource set and the SRS resource 1 of the aperiodic SRS resource. Hence, according to the SRS resource set field 1200 in FIG. 12A, the aperiodic SRS resource set with the SRS resources 0 and 1 may be used as a default and the SRS resources 0 and 2 may be used opportunistically.

Figure 12C:
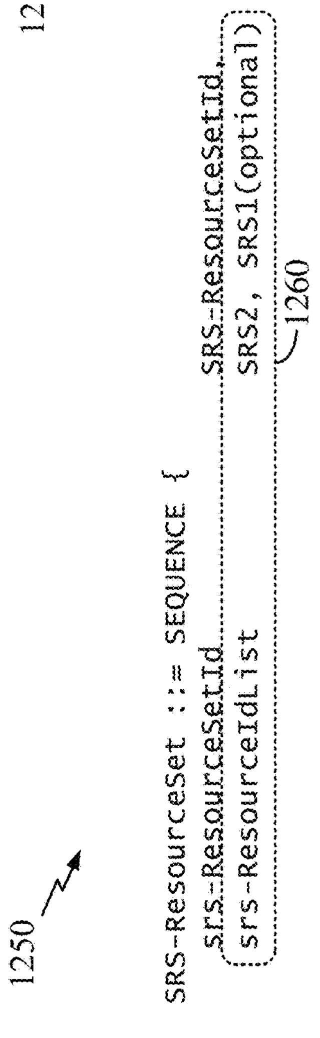
FIGS. 12C and 12D are example diagrams illustrating an approach to indicate a linkage of merged SRS resources, according to some aspects.
Figure 12D:
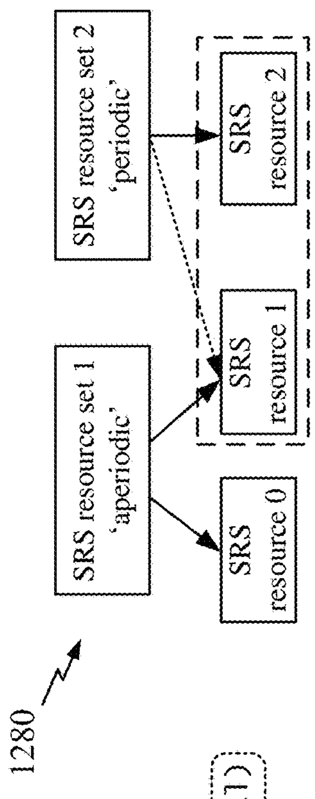

In an aspect, the linkage may be indicated by an indication of the second SRS resource in a first SRS resource field of the RRC message, the first SRS resource field indicating one or more first SRS resources including the first SRS resource. FIGS. 12C and 12D are example diagrams illustrating an approach to indicate a linkage of merged SRS resources, according to some aspects. FIG. 12C is an example diagram illustrating an approach to indicate a linkage of merged SRS resources, according to some aspects. An SRS resource set field 1250 in FIG. 12C may be for first SRS resource(s) for the first usage and may be included in the RRC configuration. The SRS resource set field 1250 of FIG. 12C for first SRS resource(s) may include an SRS resource ID list 1260 that lists the first SRS resource and may optionally include an SRS resource that is a second SRS resource for the second usage. Therefore, the linkage between the first SRS resource and the second SRS resource may be indicated by the SRS resource ID list 1260 for the first SRS resource(s) that may list the first SRS resource as well as the second SRS resource. For example, referring to an example diagram 1280 of FIG. 12D, the SRS resource ID list 1260 may list the SRS resource 2 of the periodic SRS resource set and may optionally list the SRS resource 1 of the aperiodic SRS resource set, thereby indicating the linkage between the SRS resource 2 of the periodic SRS resource set and the SRS resource 1 of the aperiodic SRS resource. Hence, according to the SRS resource set field 1250 in FIG. 12C, the periodic SRS resource set with the SRS resource 2 may be used as a default and the SRS resource 1 may be used opportunistically.

Figure 13:
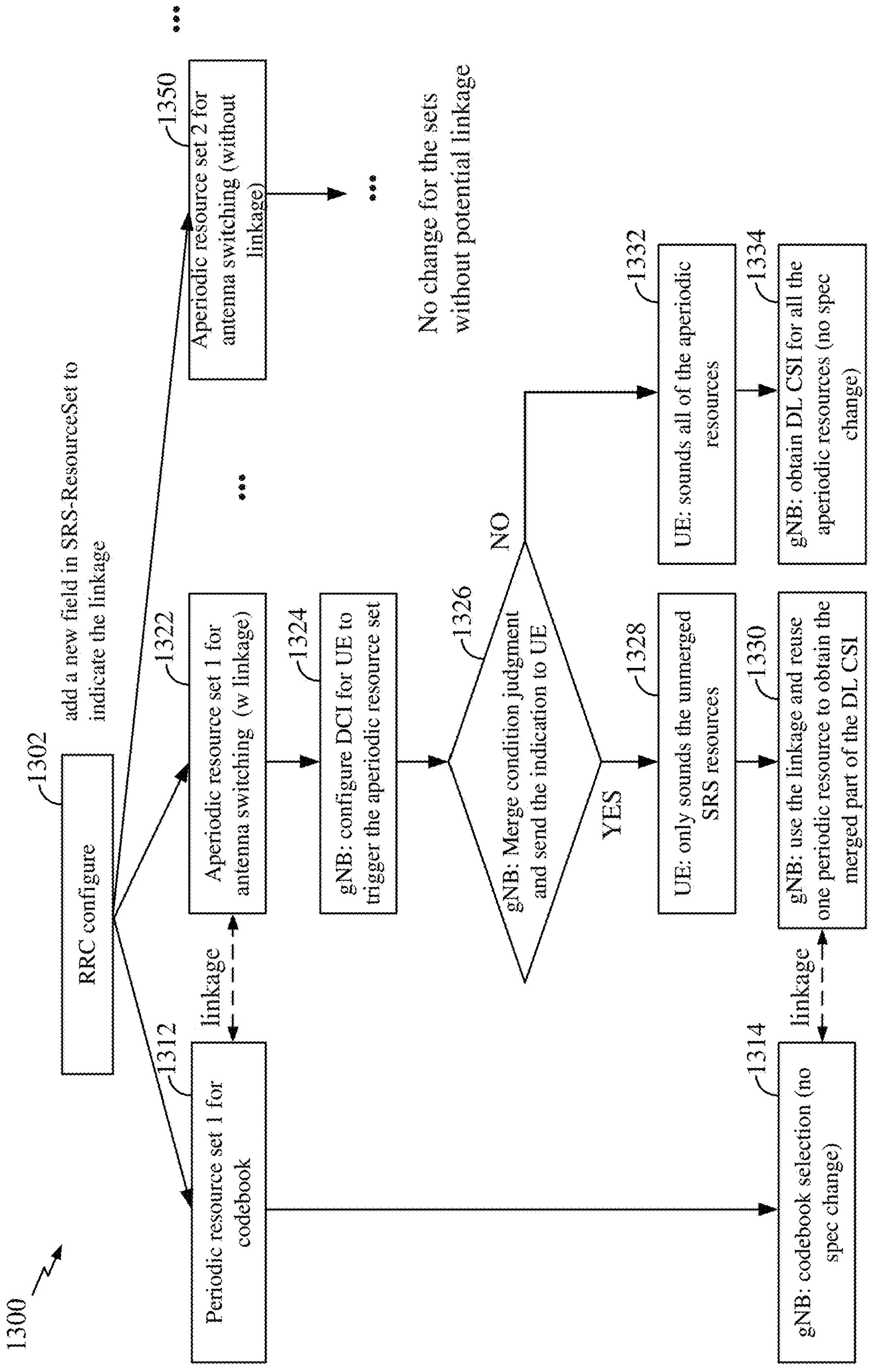
FIG. 13 is an example flow diagram in a case a periodic SRS resource set is used for the codebook usage and an aperiodic SRS resource set is used for the antenna switching usage, according to some aspects.

FIG. 13 is an example flow diagram 1300 in a case a periodic SRS resource set is used for the codebook usage and an aperiodic SRS resource set is used for the antenna switching usage, according to some aspects. Hence, this may be a case where the first SRS resource is included in a periodic SRS resource set for the codebook usage and the second SRS resource is included in an aperiodic SRS resource set for the antenna switching usage. At 1302, a base station generates an RRC message with an RRC configuration. The RRC configuration may include a new field (e.g., in the SRS-ResourceSet field) to indicate the linkage. At 1312, the base station assigns a periodic SRS resource set. At 1314, the base station utilizes the periodic SRS resources in the periodic SRS resource set for the codebook usage to receive an SRS from the UE.

At 1322, the base station assigns a first aperiodic SRS resource set for the antenna switching usage. The RRC configuration may include an indication of the linkage between the periodic SRS resource of the periodic SRS resource set and an aperiodic SRS resource of the first aperiodic SRS resource set. At 1324, the base station configures DCI to transmit to the UE, in order to trigger the first aperiodic SRS resource set. At 1326, the base station determines whether a merge condition is satisfied, and sends an indication of whether the merge condition is satisfied. For example, the merge condition may be satisfied if a time gap between the periodic SRS resource of the periodic SRS resource set and the aperiodic SRS resource of the first aperiodic SRS resource set is less than the time threshold. At 1328, if the merge condition is satisfied, the UE may not utilize the aperiodic SRS resource that is merged (e.g., via the linkage) with the periodic SRS resource, and may only utilize another aperiodic SRS resource of the first aperiodic SRS resource set that is not merged, to transmit an SRS for the antenna switching usage. At 1330, the base station may utilize the linkage and reuse the periodic SRS resource to receive the SRS for the antenna switching usage. The gNB may also obtain DL CSI based on the received SRS.

At 1332, if the merge condition is not satisfied, the UE may utilize all of the aperiodic SRS resources to respectively transmit SRSs. At 1334, the base station may obtain the SRSs for the antenna switching usage on all of the aperiodic SRS resources of the first aperiodic SRS resource set 1.

The second aperiodic SRS resource set does not have any aperiodic SRS resources having a linkage with a periodic SRS resource. Hence, at 1350, no merging occurs between the aperiodic SRS resources of the second aperiodic SRS resource set and the periodic SRS resource of the periodic SRS resource set.

As discussed above, a time domain behavior, which reflect whether an SRS transmission should be periodic, semi-persistent, or a periodic, may be configured at both SRS resource and SRS resource set levels. In one case, when an aperiodic SRS resource with the first usage (e.g., codebook usage) occurs at a time occasion near an aperiodic SRS resource with the second usage (e.g., antenna switching usage), then these two SRS resources may be merged such that the aperiodic SRS resource may represent the second usage as well. In another case, when a first periodic SRS resource with the first usage happens at a time occasion near a second periodic SRS resource with the second usage, then these two SRS resources can be merged such that the first periodic SRS resource may represent the second usage as well. In these cases, the UE may sound extra ports for a resource for the second usage. Approaches to associate/link one SRS resource to another SRS resource that has the same time domain configuration are described below.

Figure 14:
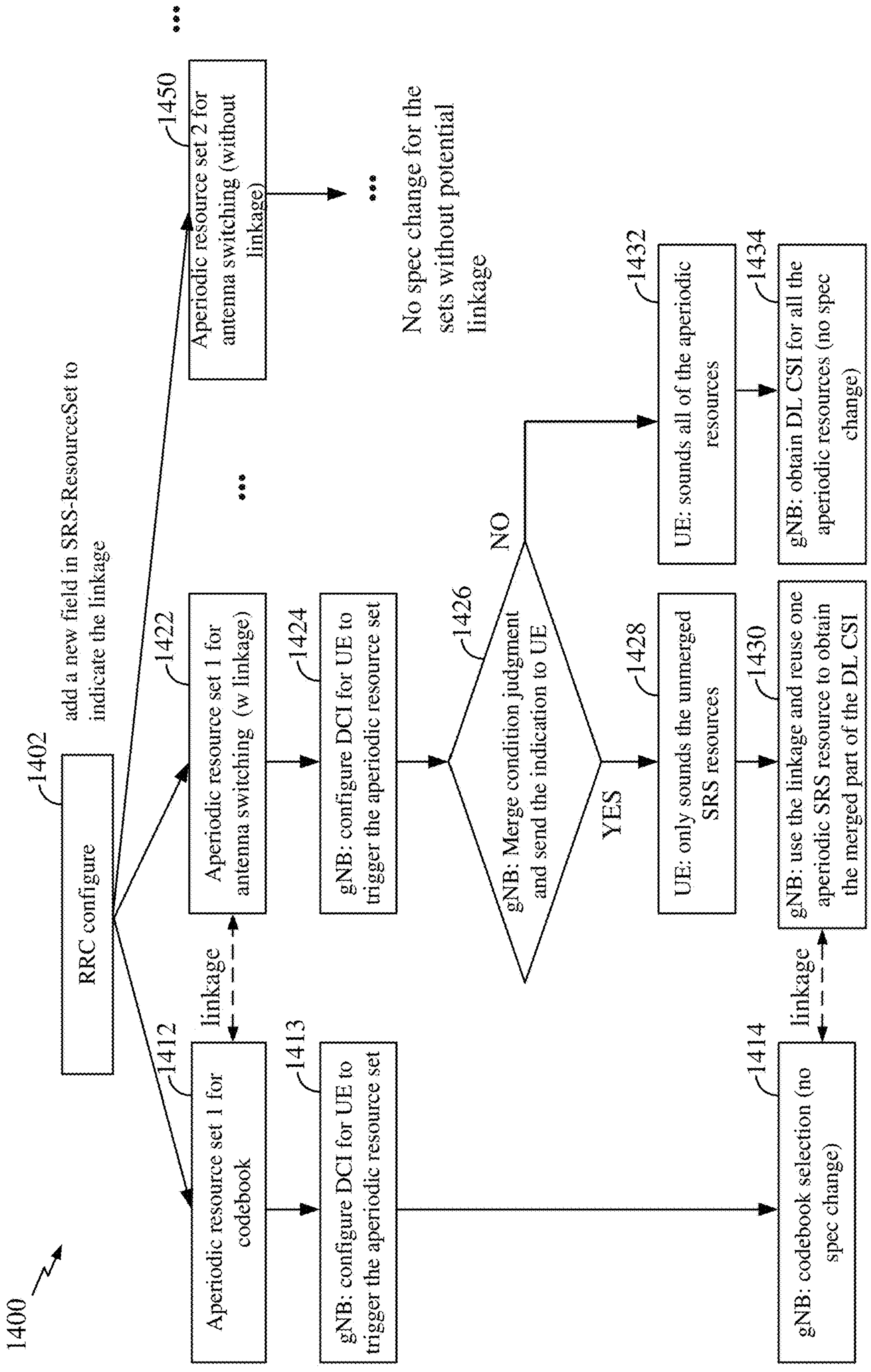
FIG. 14 is an example flow diagram in a case an aperiodic SRS resource set is used for the codebook usage and another aperiodic SRS resource set is used for the antenna switching usage, according to some aspects.

FIG. 14 is an example flow diagram 1400 in a case an aperiodic SRS resource set is used for the codebook usage and another aperiodic SRS resource set is used for the antenna switching usage, according to some aspects. Hence, this may be a case where the first SRS resource is included in an aperiodic SRS resource set for the codebook usage and the second SRS resource is included in another aperiodic SRS resource set for the antenna switching usage. At 1402, a base station generates an RRC message with an RRC configuration. The RRC configuration may include a new field (e.g., in the SRS-ResourceSet field) to indicate the linkage. At 1412, the base station assigns an aperiodic SRS resource set for the codebook usage. At 1413, the base station configures DCI to transmit to the UE, in order to trigger the aperiodic SRS resource set for the codebook usage. At 1414, the base station utilizes the aperiodic SRS resources in the aperiodic SRS resource set for the codebook usage to receive an SRS from the UE.

At 1422, the base station assigns a first aperiodic SRS resource set for the antenna switching usage. The RRC configuration may include an indication of the linkage between the aperiodic SRS resource for the codebook usage and an aperiodic SRS resource of the first aperiodic SRS resource set for the antenna switching usage. At 1424, the base station configures DCI to transmit to the UE, in order to trigger the first aperiodic SRS resource set for the antenna switching. At 1426, the base station determines whether a merge condition is satisfied, and sends an indication of whether the merge condition is satisfied. For example, the merge condition may be satisfied if a time gap between the aperiodic SRS resource for the codebook usage and an aperiodic SRS resource of the first aperiodic SRS resource set for the antenna switching usage is less than the time threshold. At 1428, if the merge condition is satisfied, the UE may not utilize the aperiodic SRS resource for the antenna switching usage that is merged (e.g., via the linkage) with the aperiodic SRS resource for the codebook usage, and may only utilize another aperiodic SRS resource of the first aperiodic SRS resource set for the antenna switching usage that is not merged, to transmit an SRS for the antenna switching usage. At 1430, the base station may utilize the linkage and reuse the aperiodic SRS resource for the codebook usage to obtain the SRS for the antenna switching usage. The gNB may also obtain DL CSI based on the received SRS.

At 1432, if the merge condition is not satisfied, the UE may utilize all of the aperiodic SRS resources to respectively transmit SRSs. At 1434, the base station may obtain the SRSs for the antenna switching usage on all of the aperiodic SRS resources of the first aperiodic SRS resource set 1.

The second aperiodic SRS resource set does not have any aperiodic SRS resources having a linkage with a periodic SRS resource. Hence, at 1450, no merging occurs between the aperiodic SRS resources of the second aperiodic SRS resource set and the periodic SRS resource of the periodic SRS resource set.

When the SRS resources for both the first usage and the second usage are periodic SRS resources, the base station may determine a time location of the SRS resources for merging based on the periodic configuration for each SRS resource set, and may introduce a control signal to indicate to the UE a merge timeline. A linkage between the SRS resources for different usages that are merged may be defined in an upper layer (e.g., RRC layer) by introducing a new field in an RRC message (e.g., in SRS-ResourceSet).

Figure 15:
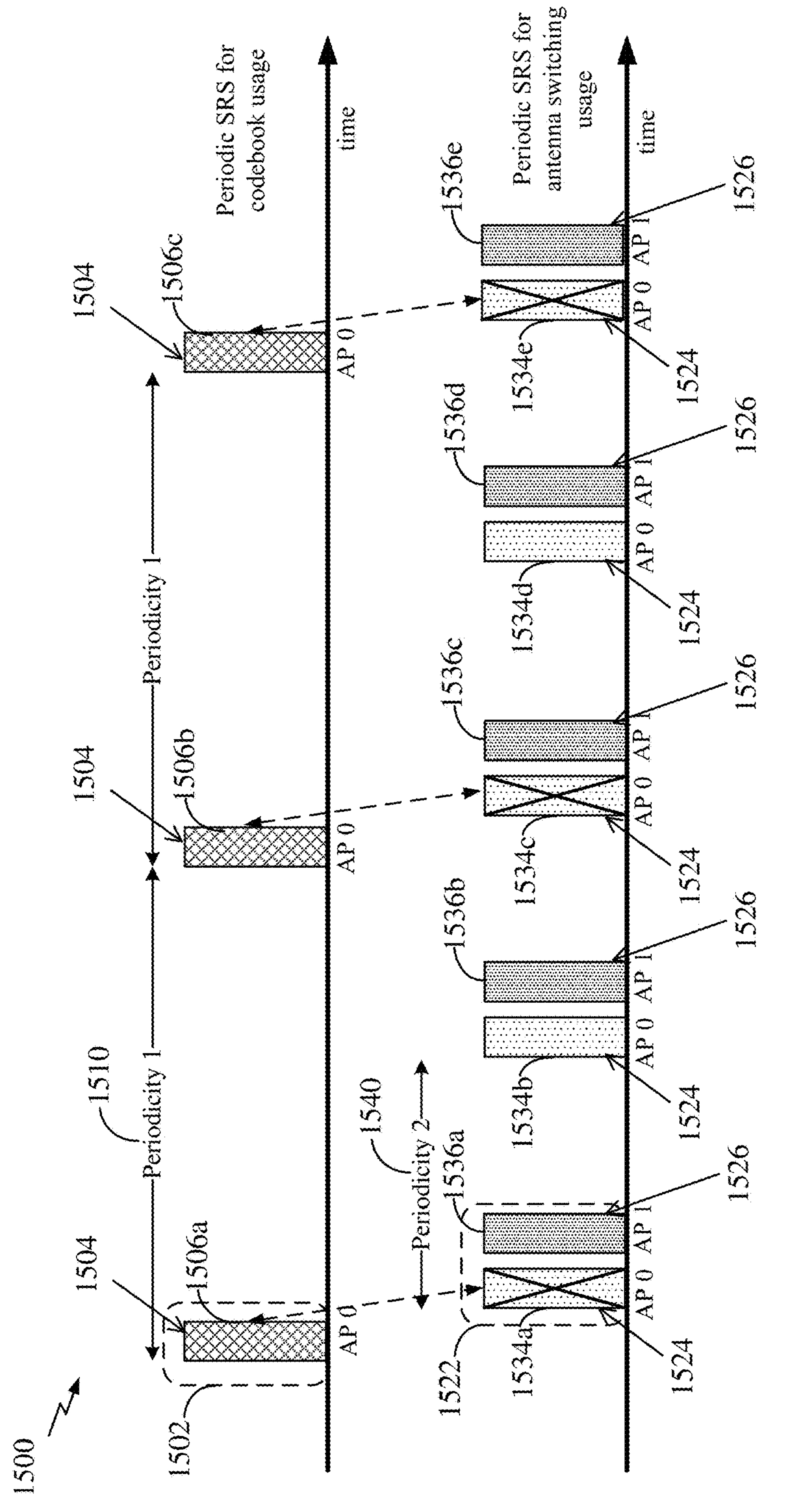
FIG. 15 is an example diagram illustrating periodic SRS resources for one usage merging with periodic SRS resources for another usage, according to some aspects.

FIG. 15 is an example diagram 1500 illustrating periodic SRS resources for one usage merging with periodic SRS resources for another usage, according to some aspects. In FIG. 15, a first SRS resource set 1502 may include a periodic SRS resource 1504, which may be utilized to transmit periodic SRSs, denoted as **1506*a*, 1506*b*, and 1506 at different times, for a codebook usage, recurring with a first periodicity 1510. An AP 0 is associated with the periodic SRS resource 1504. Further, in FIG. 15, a second SRS resource set 1522 may include a pair of periodic SRS resources 1524 and 1526 that may be utilized to transmit pairs of periodic SRSs, denoted as 1532*a* and 1534*a*, 1532*b* and 1534*b*, 1532*c* and 1534*c*, or 1532*d* and 1534*d*, for a codebook usage, recurring with a second periodicity 1540 that is a half as long as the first periodicity 1510. An AP 0** is associated with the first periodic SRS resource 1524 and the AP 1 is associated with the periodic SRS resource 1526.

In FIG. 15, because the periodic SRS resource 1504 is configured with the AP 0, the first periodic SRS resource 1524 configured with the AP 0 may be merged with the periodic SRS resource 1504 if a merge condition is satisfied, while the second periodic SRS resource 1526 configured with the AP 1 may not be merged with the periodic SRS resource 1504. The merge condition may be satisfied when a time gap between the periodic SRS resource 1504 and the first periodic SRS resource 1524 is less than the time threshold. In FIG. 15, the periodic SRS resource 1504 for each of the periodic SRSs 1506*a*, 1506*b*, and 1506*c* may be merged with the first periodic SRS resource 1524 for a respective one of the first periodic SRSs 1534*a*, 1534*c*, and 1534*c*, as they satisfy the merge condition. Hence, in one example, the periodic SRS resource 1504 for each of the periodic SRSs 1506*a*, 1506*b*, and 1506*c* may be used for both the codebook usage and the antenna switching usage. In another example, the first periodic SRS resource 1524 for each of the first periodic SRSs 1534*a*, 1534*c*, and 1534*e* may be used for both the codebook usage and the antenna switching usage. On the other hand, the first periodic SRS resource 1524 for each of the first periodic SRSs 1534*b* and 1534*d* is not near any of the periodic SRS resource 1504 for the periodic SRSs 1506*a*, 1506*b*, and 1506*c* and thus do not satisfy the merge condition. Therefore, none of the first periodic SRS resource 1524 for first periodic SRSs 1534*b* and 1534*d* is merged. In FIG. 15, there is a pattern for merging, where the first periodic SRS resource 1524 is merged in every other period while the periodic SRS resource 1504 is merged in every period.

Figure 16:
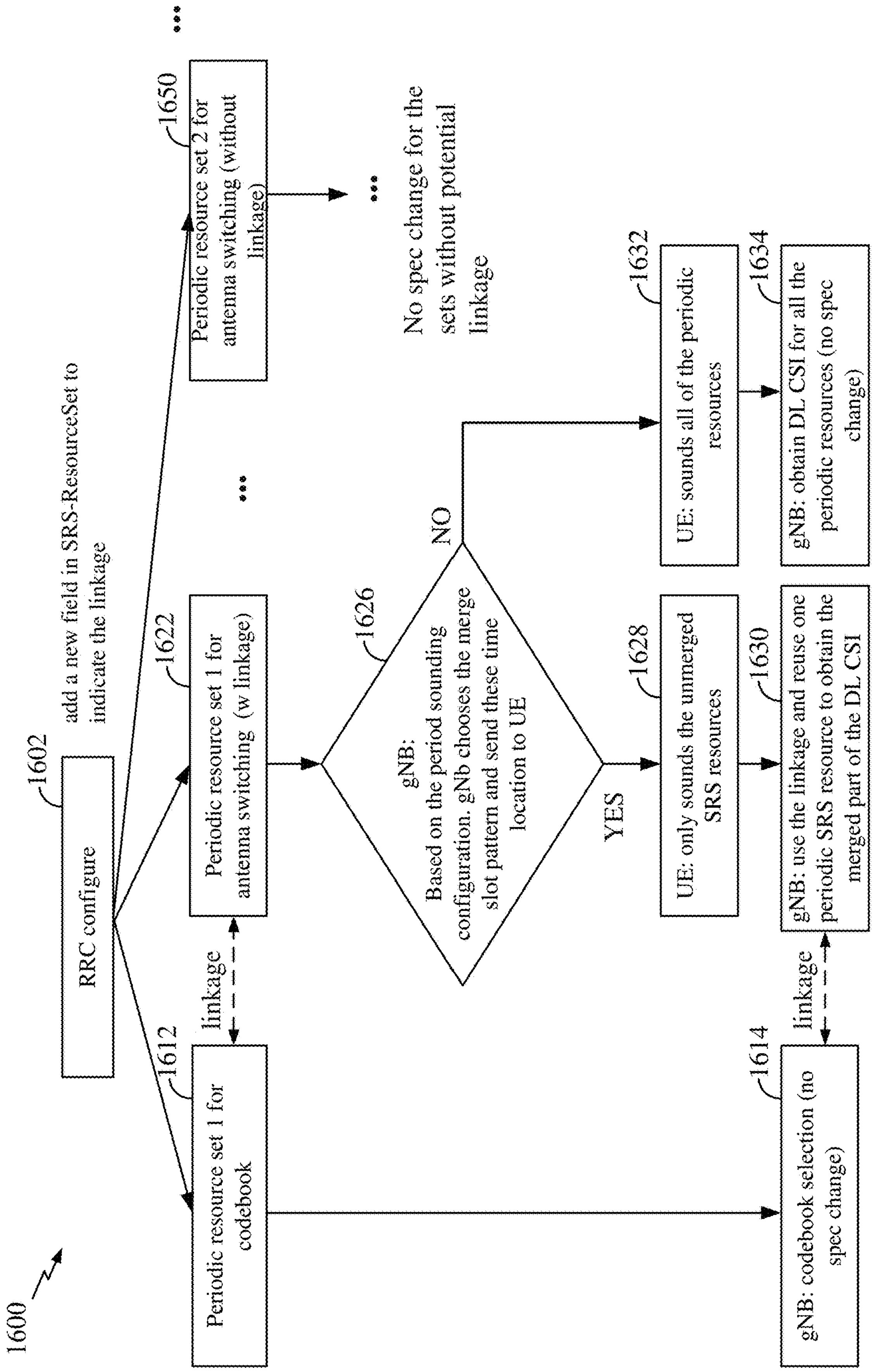
FIG. 16 is an example flow diagram in a case a periodic SRS resource set is used for the codebook usage and another periodic SRS resource set is used for the antenna switching usage, according to some aspects.

FIG. 16 is an example flow diagram 1600 in a case a periodic SRS resource set is used for the codebook usage and another periodic SRS resource set is used for the antenna switching usage, according to some aspects. Hence, this may be a case where the first SRS resource is included in a periodic SRS resource set for the codebook usage and the second SRS resource is included in another periodic SRS resource set for the antenna switching usage. At 1602, a base station generates an RRC message with an RRC configuration. The RRC configuration may include a new field (e.g., in the SRS-ResourceSet field) to indicate the linkage. At 1612, the base station assigns a periodic SRS resource set for the codebook usage. At 1614, the base station utilizes the periodic SRS resources in the periodic SRS resource set for the codebook usage to receive an SRS from the UE.

At 1622, the base station assigns a first periodic SRS resource set for the antenna switching usage. The RRC configuration may include an indication of the linkage between the periodic SRS resource for the codebook usage and a periodic SRS resource of the first periodic SRS resource set for the antenna switching usage. At 1626, the base station determines whether a merge condition is satisfied for each periodic SRS resource in each period and may determine a merge pattern based on time occasions of the periodic SRS resource set for the codebook usage and the first periodic SRS resource set for the antenna switching usage. At 1626, the base station may further send an indication of the merge pattern if the merge condition is satisfied for at least some of the first periodic SRS resources. For example, the merge condition may be satisfied if a time gap between the periodic SRS resource for the codebook usage and a periodic SRS resource of the first periodic SRS resource set for the antenna switching usage is less than the time threshold. At 1628, for the periodic SRS resources where the merge condition is satisfied, the UE may not utilize such periodic SRS resource for the antenna switching usage that is merged (e.g., via the linkage) with the periodic SRS resource for the codebook usage, and may only utilize other periodic SRS resources of the first periodic SRS resource set for the antenna switching usage that are not merged, to transmit an SRS for the antenna switching usage. At 1630, the base station may utilize the linkage and reuse the periodic SRS resources for the codebook usage to obtain the SRS for the antenna switching usage. The gNB may also obtain DL CSI based on the received SRS.

At 1632, if the merge condition is not satisfied for any of the periodic SRS resources, the UE may utilize all of the periodic SRS resources to respectively transmit SRSs. At 1634, the base station may obtain the SRSs for the antenna switching usage on all of the periodic SRS resources of the first periodic SRS resource set 1.

The second periodic SRS resource set does not have any periodic SRS resources having a linkage with a periodic SRS resource. Hence, at 1650, no merging occurs between the periodic SRS resources of the second periodic SRS resource set and the periodic SRS resource of the periodic SRS resource set.

In some cases, a UE may be configured with different numbers of transmission antennas for different usages. For example, a number of antenna ports configured for the first usage (e.g., codebook usage, related to a PUSCH transmission) may be different from a number of antenna ports configured for the second usage (e.g., antenna switching usage). For example, the UE may be configured as xTyR, where each SRS resource set has x SRS resources transmitting at different symbols and is associated with up to y SRS ports, each SRS resource in in the SRS resource set includes x SRS ports, and SRS ports of one SRS resource in the SRS resource set are associated with different UE antenna ports than SRS ports of another SRS resource in the same set. In some aspects of the disclosure, when a number of antenna ports for the codebook usage is larger than that for the antenna switching usage, one SRS resource for the codebook usage may be associated with multiple SRS resources for antenna switching. For example, in the 1T4R configuration for antenna switching, 4 antenna ports may be configured for an SRS resource for the codebook SRS usage, while four SRS resources respectively configured with the 4 antenna ports may be used for the antenna switching usage.

Hence, in some aspects of the disclosure, the first SRS resource for the first usage (e.g., codebook usage) may be configured with two or more antenna ports of the UE, and the second SRS resource for the second usage (e.g., antenna switching usage) may be included in a second SRS resource set that includes multiple second SRS resources for the second usage, where the multiple second SRS resources are configured with the two or more antenna ports. In an aspect, the first SRS resource may be included in a first SRS resource set that includes multiple first SRS resources for the first usage. In an aspect, the number of the two or more antenna ports associated with the first SRS resource is greater than a number of antenna ports associated with the second SRS resource.

Figure 17:
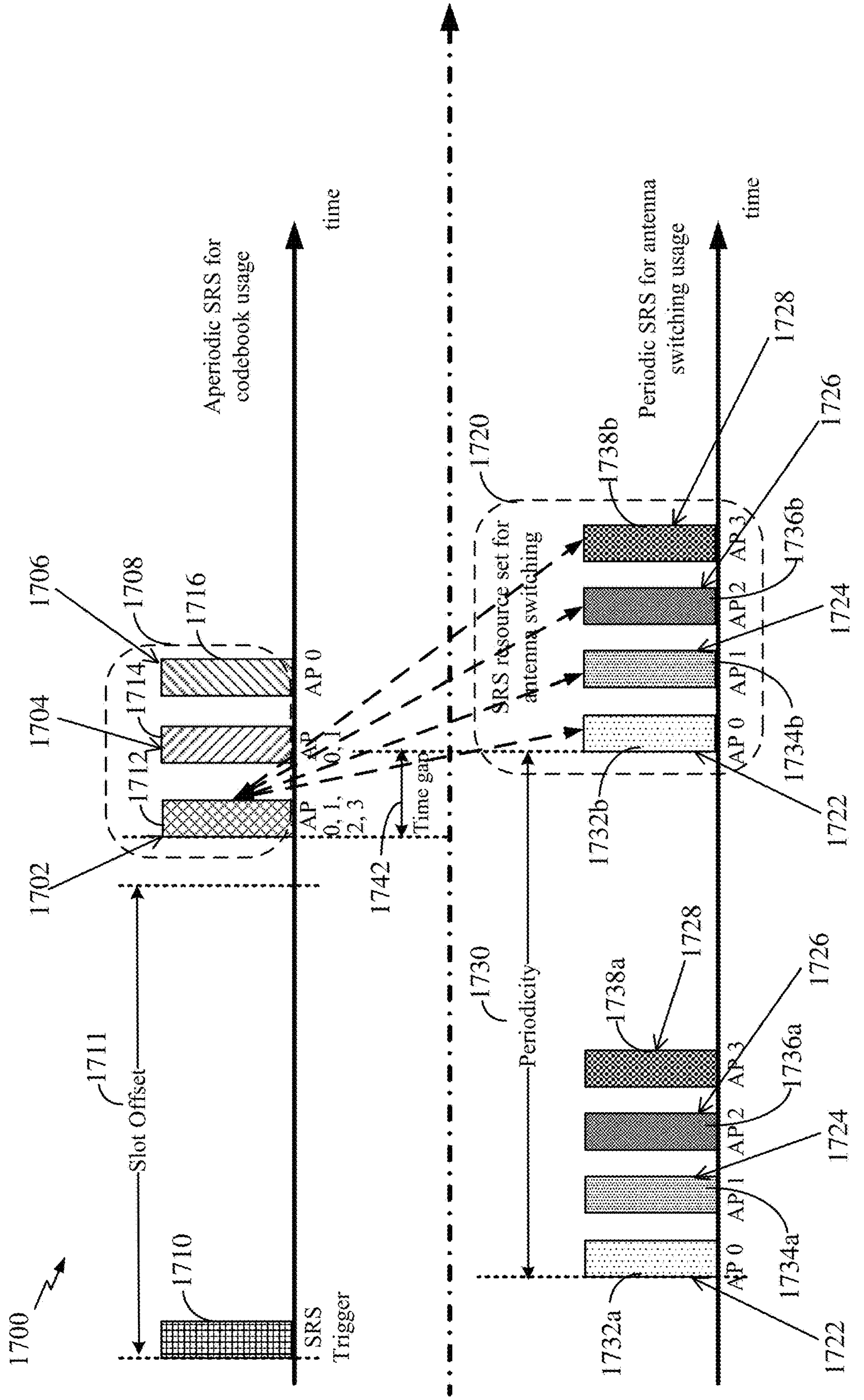
FIG. 17 is an example diagram illustrating an aperiodic SRS resource for one usage merging with a periodic SRS resource for another usage, where the aperiodic SRS is configured with a larger number of antenna ports than the periodic SRS resource, according to some aspects.

FIG. 17 is an example diagram 1700 illustrating an aperiodic SRS resource for one usage merging with a periodic SRS resource for another usage, where the aperiodic SRS is configured with a larger number of antenna ports than the periodic SRS resource, according to some aspects. In FIG. 17, aperiodic SRS resources 1702, 1704, and 1706, which may be included in a first SRS resource set 1708, is triggered by an SRS trigger 1710 and occurs after a slot offset 1711. The SRS trigger 1710 may include, for example, DCI triggering the first SRS resource set including the aperiodic SRS resources 1702, 1704, and 1706. The aperiodic SRS resources 1702, 1704, and 1706 may be assigned to transmit SRSs 1712, 1714, and 1716. The aperiodic SRS resource 1702 is configured with antenna ports (APs) 0, 1, 2, and 3, the aperiodic SRS resource 1704 is configured with APs 0 and 1, and the aperiodic SRS resource 1706 is configured with an AP 0. Hence, for example each aperiodic SRS resource in the first SRS resource is configured with its unique set of antenna ports and antenna virtualization format.

In FIG. 17, a second SRS resource set (e.g., 1720) may include four periodic SRS resources, which recur with a periodicity of 1730. For example, periodic SRS resources 1722, 1724, 1726, and 1728 of the second SRS resource set 1720 may be respectively assigned to transmit SRSs 1732*a*, 1734*a*, 1736*a*, and 1738*a* at one time occasion, and may be respectively assigned to transmit SRSs 1732*b*, 1734*b*, 1736*b*, and 1738*b* at a later time occasion. The periodic SRS resources 1722, 1724, 1726, and 1728 are respectively configured with the APs 0, 1, 2, and 3. For example, the antenna switching usage may be in a 1T4R configuration, where the second SRS resource set has four SRS resources transmitting at different symbols, each SRS resource in in the SRS resource set includes a single SRS port, and an SRS port of one SRS resource in the SRS resource set is associated with a different UE antenna port than an SRS port of the another SRS resource in the same set.

In an aspect, for a potential merge candidate, an aperiodic SRS resource associated with two or more antenna ports that are the same as the antenna ports associated with the periodic SRS resources of the periodic SRS resource set may be considered for merging. In this aspect, because the periodic SRS resources 1722, 1724, 1726, and 1728 of the second SRS resource set 1720 are respectively associated with the APs 0, 1, 2, and 3, the aperiodic SRS resource 1702 associated with the APs 0, 1, 2, and 3 may be considered for merging. The aperiodic SRS resources 1704 and 1706 may not be considered for merging because the aperiodic SRS resources 1704 and 1706 are not associated with all of the APs 0, 1, 2, and 3.

The UE may consider the periodic SRS resources 1722, 1724, 1726, and 1728 assigned respectively to transmit the SRSs 1732*b*, 1734*b*, 1736*b*, and 1738*b* for merging. In particular, the UE may determine whether a time gap 1742 between the aperiodic SRS resource 1702 and the periodic SRS resources 1722 assigned to transmit the SRS 1732*b* is less than the time threshold, where the periodic SRS resources 1722 to transmit the SRS 1732*b* is closest in time to the aperiodic SRS resource 1702 among the periodic SRS resources 1722, 1724, 1726, and 1728 assigned respectively to transmit the SRSs 1732*b*, 1734*b*, 1736*b*, and 1738*b*. If the time gap 1742 is less than the time threshold, then the aperiodic SRS resource 1702 and the periodic SRS resources 1722, 1724, 1726, and 1728 for the SRSs 1732*b*, 1734*b*, 1736*b*, and 1738 may be merged, such that the UE may transmit SRS(s) using the periodic SRS resources 1722, 1724, 1726, and 1728 for both the codebook usage and the antenna switching usage, without using the aperiodic SRS resource 1702. If the time gap 1742 is greater than or equal to the time threshold, the aperiodic SRS resource 1702 and the periodic SRS resources 1722, 1724, 1726, and 1728 for the SRSs 1732*b*, 1734*b*, 1736*b*, and 1738 may not be merged, and thus the aperiodic SRS resource 1702 may be used for the codebook usage and the periodic SRS resources 1722, 1724, 1726, and 1728 may be used for the antenna switching usage.

Figure 18:
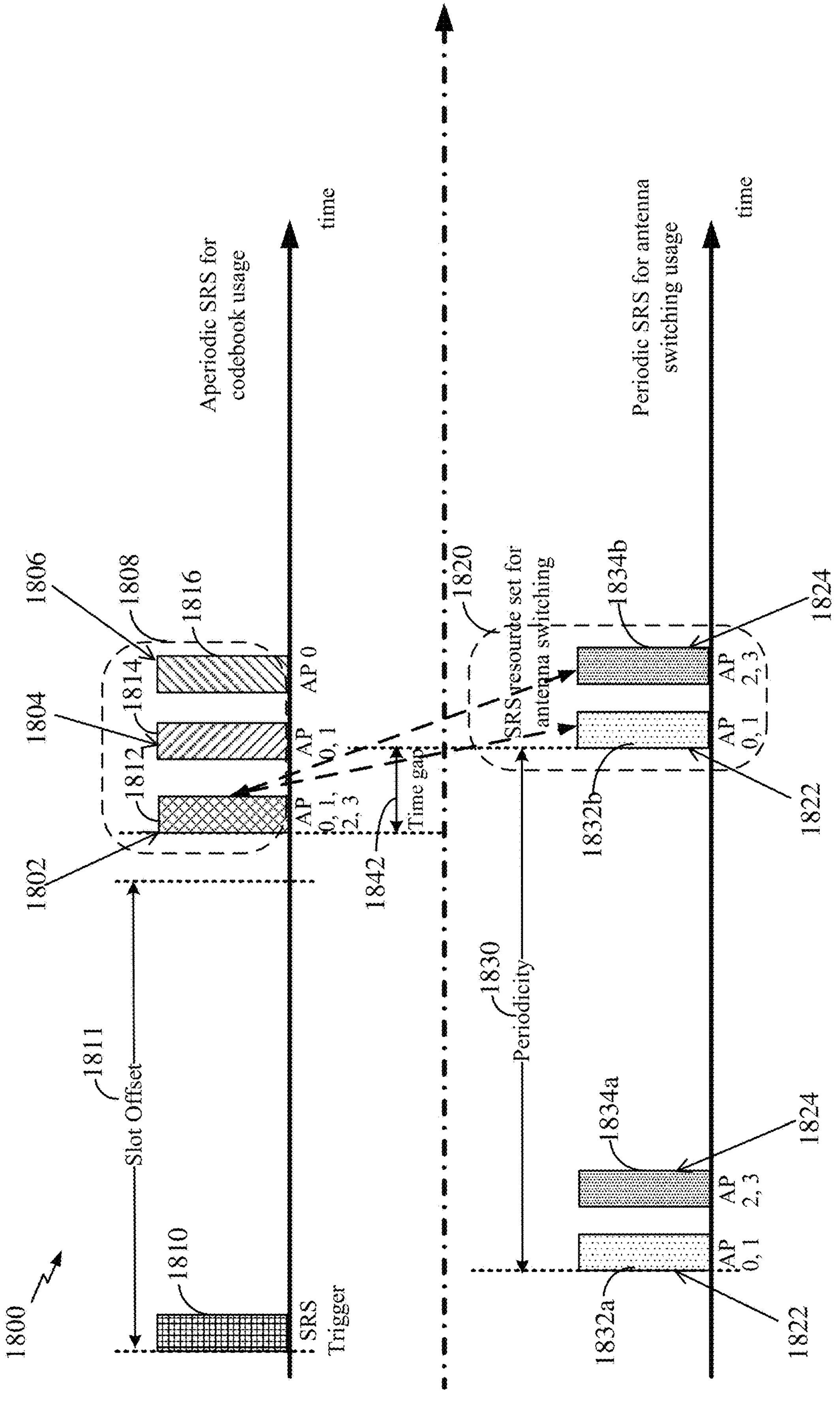
FIG. 18 is an example diagram illustrating an aperiodic SRS resource for one usage merging with a periodic SRS resource for another usage, where the aperiodic SRS is configured with a larger number of antenna ports than the periodic SRS resource, according to some aspects.

FIG. 18 is an example diagram 1800 illustrating an aperiodic SRS resource for one usage merging with a periodic SRS resource for another usage, where the aperiodic SRS is configured with a larger number of antenna ports than the periodic SRS resource, according to some aspects. In FIG. 18, aperiodic SRS resources 1802, 1804, and 1806, which may be included in a first SRS resource set 1808, is triggered by an SRS trigger 1810 and occurs after a slot offset 1811. The SRS trigger 1810 may include, for example, DCI triggering the first SRS resource set including the aperiodic SRS resources 1802, 1804, and 1806. The aperiodic SRS resources 1802, 1804, and 1806 may be assigned to transmit SRSs 1812, 1814, and 1816. The aperiodic SRS resource 1802 is configured with antenna ports (APs) 0, 1, 2, and 3, the aperiodic SRS resource 1804 is configured with APs 0 and 1, and the aperiodic SRS resource 1806 is configured with an AP 0. Hence, for example each aperiodic SRS resource in the first SRS resource is configured with its unique set of antenna ports and antenna virtualization format.

In FIG. 18, a second SRS resource set (e.g., 1820) may include two periodic SRS resources, which recur with a periodicity of 1830. For example, periodic SRS resources 1822 and 1824 of the second SRS resource set 1820 may be respectively assigned to transmit SRSs 1732*a* and 1734*a* at one time occasion, and may be respectively assigned to transmit SRSs 1732*b* and 1734*b* at a later time occasion. The periodic SRS resource 1822 is configured with the APs 0 and 1, and the periodic SRS resource 1824 is configured with the APs 2 and 3. For example, the antenna switching usage may be in a 2T4R configuration, where the second SRS resource set has two SRS resources transmitting at different symbols, each SRS resource in in the SRS resource set includes two SRS ports, and an SRS port pair of one SRS resource in the SRS resource set is associated with different UE antenna ports than an SRS port pair of another SRS resource in the same set.

In an aspect, for a potential merge candidate, an aperiodic SRS resource associated with two or more antenna ports that are the same as the antenna ports associated with the periodic SRS resources of the periodic SRS resource set may be considered for merging. In this aspect, because the periodic SRS resources 1822 and 1824 of the second SRS resource set 1820 are associated with the APs 0, 1, 2, and 3, the aperiodic SRS resource 1802 associated with the APs 0, 1, 2, and 3 may be considered for merging. The aperiodic SRS resources 1804 and 1806 may not be considered for merging because the aperiodic SRS resources 1804 and 1806 are not associated with all of the APs 0, 1, 2, and 3.

The UE may consider the periodic SRS resources 1822 and 1822 of the second SRS resource set 1820 assigned respectively to transmit SRSs 1832*b* and 1834*b* for merging. In particular, the UE may determine whether a time gap 1842 between the aperiodic SRS resource 1802 and the periodic SRS resources 1822 assigned to transmit the SRS 1832*b* is less than the time threshold, where the periodic SRS resources 1822 to transmit the SRS 1832*b* is closest in time to the aperiodic SRS resource 1802 among the periodic SRS resources 1822 and 1824 assigned respectively to transmit the SRSs 1832*b* and 1834*b*. If the time gap 1842 is less than the time threshold, then the aperiodic SRS resource 1802 and the periodic SRS resources 1822 and 1824 assigned respectively to transmit the SRSs 1832*b* and 1834*b* may be merged, such that the UE may transmit an SRS using the periodic SRS resources 1822 and 1824 assigned respectively to transmit the SRSs 1832*b* and 1834*b* for both the codebook usage and the antenna switching usage, without using the aperiodic SRS resource 1802. If the time gap 1842 is greater than or equal to the time threshold, the aperiodic SRS resource 1802 and the periodic SRS resources 1822 and 1824 for the SRSs 1832*b* and 1834*b* may not be merged, and thus the aperiodic SRS resource 1802 may be used for the codebook usage and the periodic SRS resources 1822 and 1824 for the SRSs 1832*b* and 1834*b* may be used for the antenna switching usage.

Figure 19:
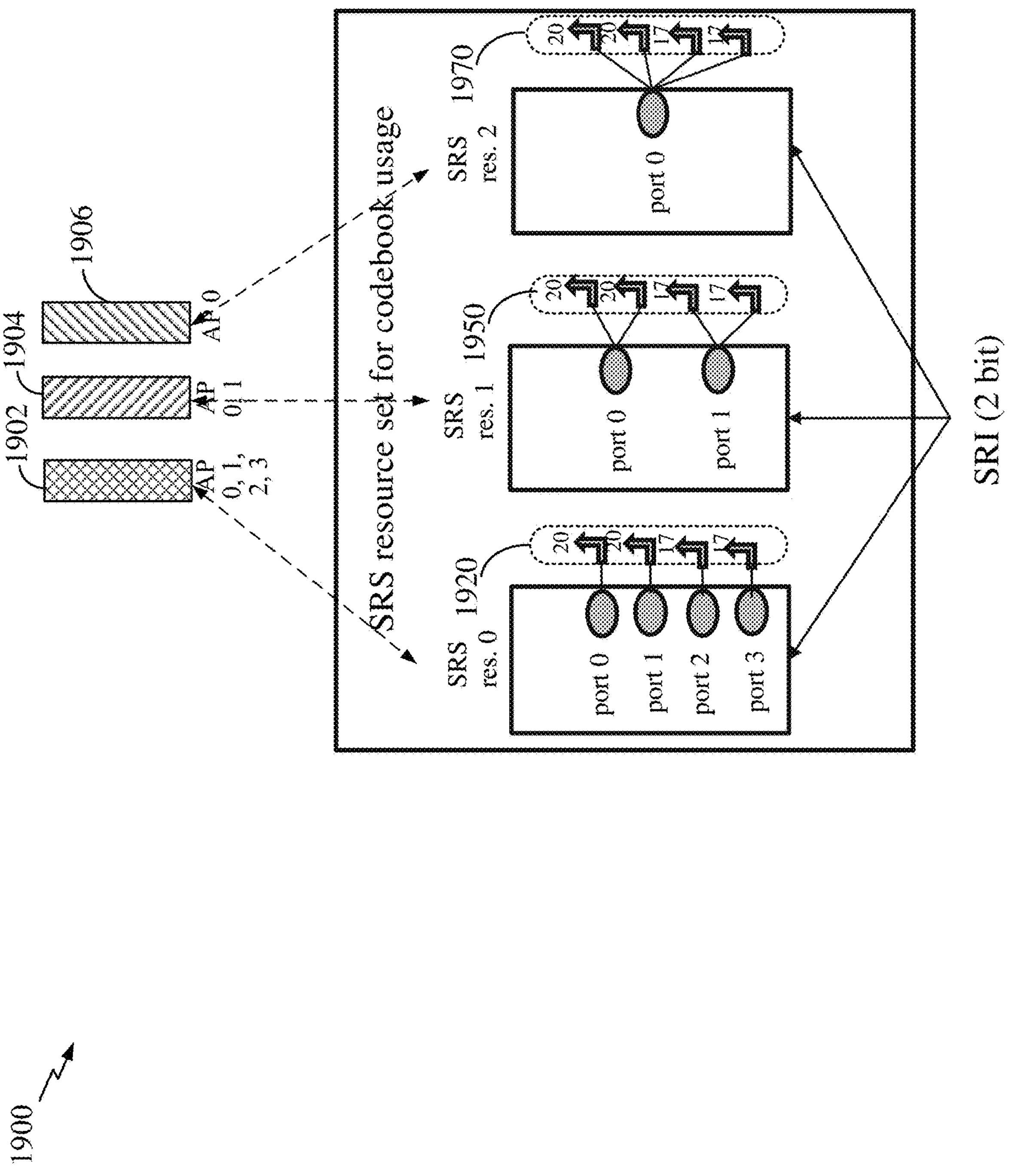
FIG. 19 is an example diagram illustrating antenna virtualization approaches, according to some aspects.

In an aspect, antenna virtualization condition may be monitored, as an additional merge condition besides the time threshold condition may be based on the antenna virtualization condition. For example, to be merge candidates, the same antenna virtualization is used for SRS resources that may be potentially merged. If different antenna formats of antenna virtualizations are used for SRS resources, these SRS resources may not be merged. FIG. 19 is an example diagram 1900 illustrating antenna virtualization approaches, according to some aspects. For example, the example diagram 1900 may be for a codebook-based SRS resource configuration for fullpowerMode2. For a first SRS resource 1902 configured with the APs 0, 1, 2, and 3, a first antenna virtualization to provide the APs 0, 1, 2, and 3 is used, where each of the four antennas 1920 is linked with a respective port is used. For a second SRS resource 1904 configured with the APs 0 and 1, a second antenna virtualization to provide the APs 0 and 1 is used, where two of the four antennas 1950 are linked with one port and the other two of the four antennas 1950 are linked with the other port. For a third SRS resource 1906 configured with the AP 0, a third antenna virtualization to provide the AP 0 is used, where the four antennas 1970 are linked with one port. Hence, the example diagram 1900 show three SRS resources, where each SRS resource is configured with a different number of ports and a different format of antenna virtualization.

Hence, for example, referring back to the example in FIG. 17, the aperiodic SRS resource 1702 and the periodic SRS resources 1722, 1724, 1726, and 1728 for the SRSs 1732*b*, 1734*b*, 1736*b*, and 1738*b* may utilize the same format of antenna virtualization, such as the first antenna virtualization of FIG. 19. Therefore, the aperiodic SRS resource 1702 and the periodic SRS resources 1722, 1724, 1726, and 1728 for the SRSs 1732*b*, 1734*b*, 1736*b*, and 1738*b* may be merge candidates. Further, for example, referring back to the example in FIG. 18, the aperiodic SRS resource 1802 and the periodic SRS resources 1822 and 1824 for the SRSs 1832*b* and 1834*b* may utilize the same format of antenna virtualization, such as the first antenna virtualization of FIG. 19. Therefore, the aperiodic SRS resource 1802 and the periodic SRS resources 1822 and 1824 for the SRSs 1832*b* and 1834*b* may be merge candidates.

Figure 20:
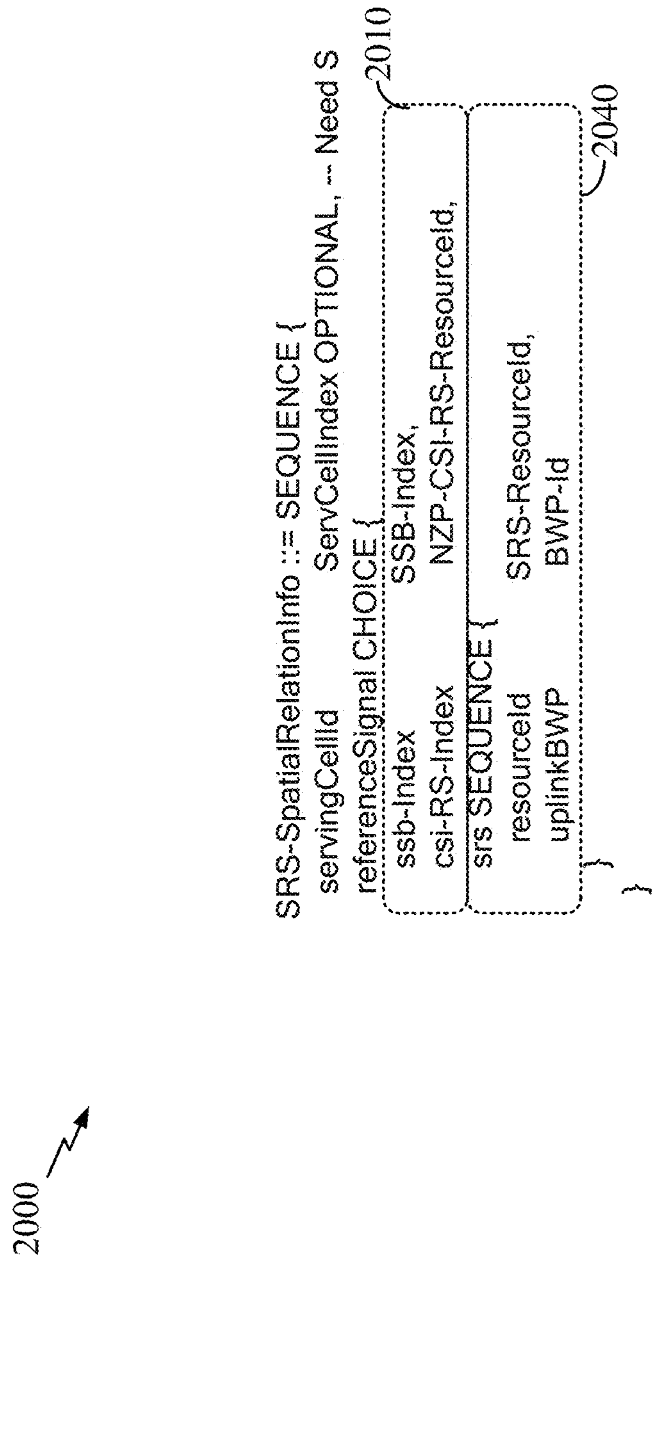
FIG. 20 is an example diagram illustrating a spatial relation information field to indicate spatial relation information, according to some aspects.

In an aspect, spatial relation condition may be monitored, as another additional merge condition may be based on the spatial relation condition. For example, to be merge candidates, the same spatial relation information is associated with SRS resources that may be potentially merged. The spatial relation information may be associated with a beam. FIG. 20 is an example diagram 2000 illustrating a spatial relation information field to indicate spatial relation information, according to some aspects. As shown in FIG. 20, the SSB information and/or the CSI-RS index in a field 2010 may indicate spatial relation information, for an SRS resource indicated in an SRS resource field 2040.

In an aspect, the additional merging conditions described above as well as the merging condition related to the time threshold may be used to determine whether the SRS resources can be merged. Such a determination may be done by the UE or the base station. In an aspect, if the base station determines to merge SRS resources based on satisfying the merging conditions, the configuration of the SRS resources may follow the merging conditions. In an example, the base station may generate and transmit a merge indication to the UE, the merge indication indicating to select one of the first SRS resource and the second SRS resource for both the first usage and the second usage, based on satisfying the merging condition (e.g., in response to determining that the time gap is less than the time threshold). Then, the UE may transmit the SRS using the one of the first SRS resource and the second SRS resource for both the first usage and the second usage, based on the merge indication.

As discussed above, a linkage between SRS resources for the first usage and the second usage may be indicated in an RRC message. In an aspect, the linkage may be indicated by an indication of the merged SRS resources for both the first usage and the second usage in a merged SRS resource field and an indication of the other SRS resource that is dropped after merging with the merged SRS resources in a current SRS resource field. For example, as discussed above the merged SRS resource field and the current SRS resource field may be introduced in an RRC configuration (e.g., in a higher layer parameter SRS-ResourceSet level). For example, referring back to FIG. 11A, The merged SRS resource field 1112 may include an SRS-ResourceId field that indicates SRS resources (e.g., periodic SRS resources such as the periodic SRS resources 1722*b*, 1724*b*, 1726*c*, and 1728*d*) from the second resource set for the second usage (e.g., antenna usage). The current SRS resource field 1114 may include an SRS-ResourceId field that indicates an SRS resource (e.g., aperiodic SRS resource such as the aperiodic SRS resource 1702) in this resource set for the first usage (e.g., codebook usage), which may be substituted by the SRS resources indicated by the merged SRS resource field 1112 if merge conditions are satisfied.

In an aspect, multiple time gaps respectively corresponding to multiple SRS resources may be considered when determining whether a time gap is less than the time threshold. For example, when there are multiple second SRS resources for the second usage that may be potentially merged with a first SRS resource for the first usage, the time gap considered for the merge condition may be a largest time gap among the multiple time gaps respectively between the first SRS resource and the second SRS resources.

Figure 21:
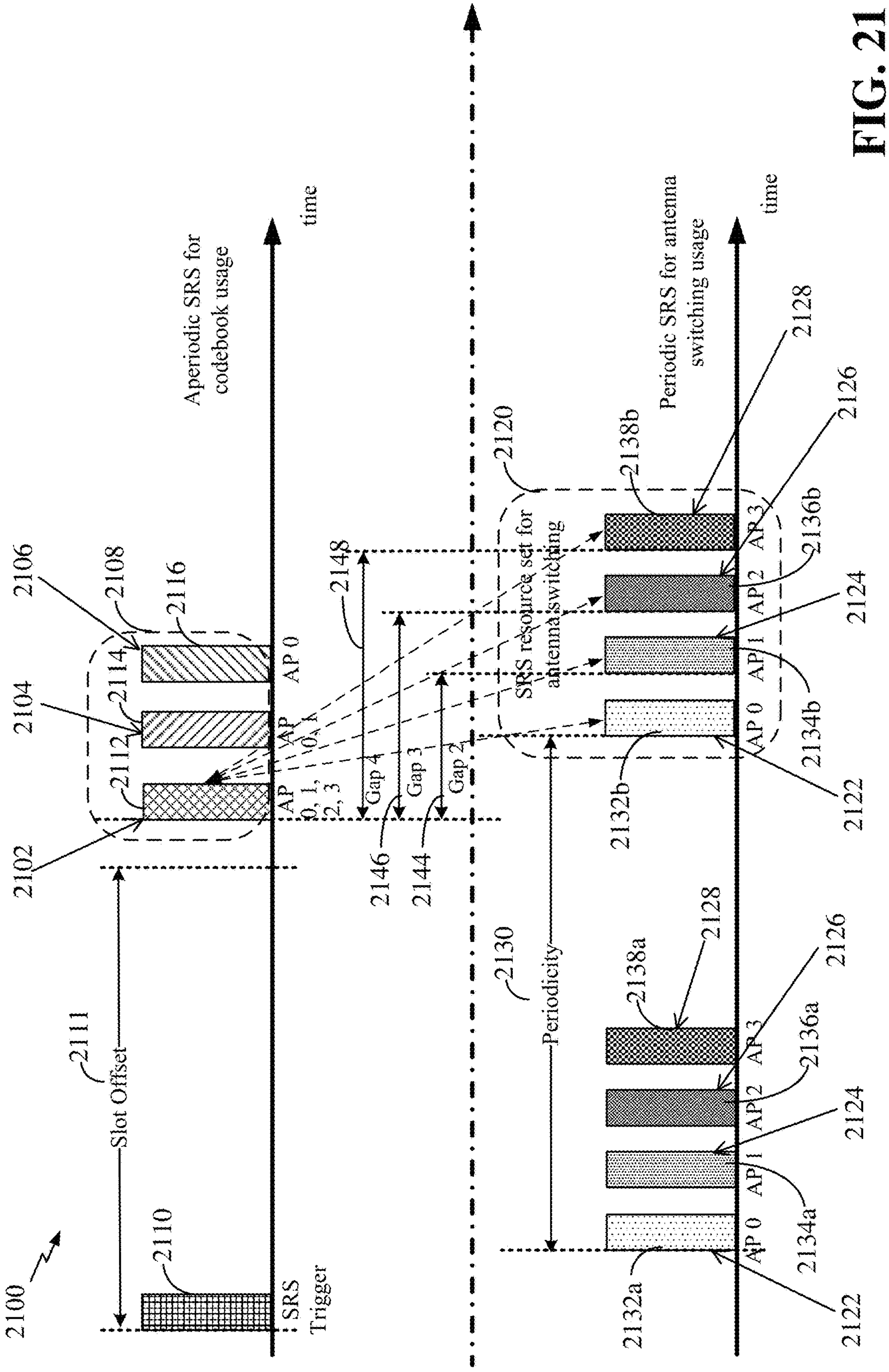
FIG. 21 is an example diagram illustrating an aperiodic SRS resource for one usage merging with a periodic SRS resource for another usage, where the aperiodic SRS is configured with a larger number of antenna ports than the periodic SRS resource, according to some aspects.

FIG. 21 is an example diagram 2100 illustrating an aperiodic SRS resource for one usage merging with a periodic SRS resource for another usage, where the aperiodic SRS is configured with a larger number of antenna ports than the periodic SRS resource, according to some aspects. In FIG. 21, aperiodic SRS resources 2102, 2104, and 2106, which may be included in a first SRS resource set 2108, is triggered by an SRS trigger 2110 and occurs after a slot offset 2111. The SRS trigger 2110 may include, for example, DCI triggering the first SRS resource set including the aperiodic SRS resources 2102, 2104, and 2106. The aperiodic SRS resources 2102, 2104, and 2106 may be assigned to transmit SRSs 2112, 2114, and 2116. The aperiodic SRS resource 2102 is configured with antenna ports (APs) 0, 1, 2, and 3, the aperiodic SRS resource 2104 is configured with APs 0 and 1, and the aperiodic SRS resource 2106 is configured with an AP 0. Hence, for example each aperiodic SRS resource in the first SRS resource is configured with its unique set of antenna ports and antenna virtualization format.

In FIG. 21, a second SRS resource set (e.g., 2120) may include four periodic SRS resources, which recur with a periodicity of 2130. For example, periodic SRS resources

2122*a*, 2124*a*, 2126*a*, and 2128*a* of the second SRS resource set 2120 may be respectively assigned to transmit SRSs 2132*a*, 2134*a*, 2136*a*, and 2138*a* at one time occasion, and may be respectively assigned to transmit SRSs 2132*b*, 2134*b*, 2136*b*, and 2138*b* at a later time occasion. The periodic SRS resources 2122, 2124, 2126, and 2128 are respectively configured with the APs 0, 1, 2, and 3. For example, the antenna switching usage may be in a 1T4R configuration.

The UE may consider the periodic SRS resources 2122, 2124, 2126, and 2128 assigned respectively to transmit the SRSs 2132*b*, 2134*b*, 2136*b*, and 2138*b* for merging with the aperiodic SRS resource 2102. To determine whether a merging condition is satisfied, the UE may determine a first time gap 2142 between the aperiodic SRS resource 2102 and the periodic SRS resources 2122 assigned to transmit the SRS 2132*b*, a second time gap 2144 between the aperiodic SRS resource 2102 and the periodic SRS resources 2124 assigned to transmit the SRS 2134*b*, a third time gap 2146 between the aperiodic SRS resource 2102 and the periodic SRS resources 2126 assigned to transmit the SRS 2136*b*, and a fourth time gap 2148 between the aperiodic SRS resource 2102 and the periodic SRS resources 2128 assigned to transmit the SRS 2138*b*. Subsequently, the UE may determine that the time gap considered for the merging condition is the largest time gap of the first time gap 2142, the second time gap 2144, the third time gap 2146, and the fourth time gap 2148, and may determine whether this time gap is less than the time threshold to determine whether the merging condition is satisfied. For example, this merge condition may be expressed as: time threshold>max {|time gap1|, |time gap2|, |time gap3|, |time gap4|}. In this case, the fourth time gap 2148 is the largest time gap, and thus is compared with the time threshold to determine whether this largest time gap is less than the time threshold. If the largest time gap is less than the time threshold, then the aperiodic SRS resource 2102 and the periodic SRS resources 2122, 2124, 2126, and 2128 for the SRSs 2132*b*, 2134*b*, 2136*b*, and 2138*b* may be merged, such that the UE may transmit an SRS using the periodic SRS resources 2122, 2124, 2126, and 2128 for the SRSs 2132*b*, 2134*b*, 2136*b*, and 2138*b* for both the codebook usage and the antenna switching usage, without using the aperiodic SRS resource 2102. If the largest time gap is greater than or equal to the time threshold, the aperiodic SRS resource 2102 and the periodic SRS resources 2122, 2124, 2126, and 2128 for the SRSs 2132*b*, 2134*b*, 2136*b*, and 2138*b* may not be merged, and thus the aperiodic SRS resource 2102 may be used for the codebook usage and the periodic SRS resources 2122, 2124, 2126, and 2128 for the SRSs 2132*b*, 2134*b*, 2136*b*, and 2138*b* may be used for the antenna switching usage.

In an aspect, the UE may determine precoding information based on a merging condition associated with selecting the one of the first SRS resource and the second SRS resource for both the first usage and the second usages, where the precoding information is used to precode a PUSCH communication. In a case where a first SRS resource for the first usage is configured with multiple antenna ports and multiple second SRS resources of a second SRS resource set for the second usage that is configured with the multiple antenna ports, if no merge occurs between the first SRS resource and the multiple second SRS resources, then all of the multiple antenna ports may be utilized within the first SRS resource for the first usage, which may mean that the antenna ports are coherent. In this case, if a merge occurs between the first SRS resource and the multiple second SRS resources such that the multiple second SRS resources are used for both the first usage and the second usage, not all of the multiple antenna ports are utilized within the same SRS resource for the first usage, which may mean that antenna ports are not coherent. Hence, depending on the coherency of the antenna ports, different coding information may be used to code the PUSCH communication.

In this aspect, if there is no merge, non-merge coding information may be used to code the PUSCH communication. If the first SRS resource configured with the multiple antenna ports is merged with the multiple second SRS resources where each of the multiple second SRS resources is configured with respective two or more antenna ports of the multiple antenna ports, then the antenna ports are partially coherent because two or more antenna ports may be utilized within the same SRS resource. In this case of the partial coherency, the first precoding information may be used to precode the PUSCH communication. For example, referring to FIG. 18 (2T4R), if the aperiodic SRS resource 1802 is merged with the periodic SRS resources 1822 and 1824 for SRSs 1832*b* and 1834*b*, then each of the periodic SRS resources 1822 and 1824 for SRSs 1832*b* and 1834*b* is configured with a respective pair APs of the APs 0, 1, 2, and 3 and thus the first precoding information is used. If the first SRS resource configured with the multiple antenna ports is merged with the multiple second SRS resources where each of the multiple second SRS resources is configured with a respective one of the multiple antenna ports, then the antenna ports are not coherent because only a single antenna port may be utilized within the same SRS resource. In this case of non-coherency, second precoding information different from the first precoding information may be used to precode the PUSCH communication. For example, referring to FIG. 17 (1T4R), if the aperiodic SRS resource 1702 is merged with the periodic SRS resources 1722, 1724, 1726, and 1728 for SRSs 1732*b*, 1734*b*, 1736*b*, and 1738*b*, then each of the periodic SRS resources 1722, 1724, 1726, and 1728 for SRSs 1732*b*, 1734*b*, 1736*b*, and 1738*b* is configured with a respective one of the APs 0, 1, 2, and 3 and thus the second precoding information is used.

In an example, the non-merge coding information, the first coding information, and the second coding information may be included in a transmit precoding matrix index (TPMI) table, and one of the non-merge coding information, the first coding information, and the second coding information may be selected depending on the coherency of the antenna ports. FIG. 22 illustrates an example transmit precoding matrix index (TPMI) table 2200, according to some aspects. The TPMI table 2200 includes the non-merge coding information 2210, the first coding information 2220, and the second coding information 2230. The non-merge coding information 2210 may be indicated by a UE capability field showing "fullyAndPartialAndNonCoherent," the first coding information 2220 may be indicated by a UE capability field showing "partialNonCoherent," and the second coding information 2230 may be indicated by a UE capability field showing "noncoherent."

There may be different approaches to indicate which precoding information to use to precode the PUSCH communication. In an aspect, DCI (e.g., DCI 0_1) may be communicated to the UE and may include a precoding indication field that indicates the precoding information. In an example, the precoding indication field may be a 2 bit field, where 00 may indicate the non-merge precoding information, 01 may indicate the first precoding information, and 10 may indicate the second precoding information. This field may be read by UE first before deriving the TPMI. In another aspect, the UE may determine whether merging occurs and may further determine coherency of the merging. In this aspect, the UE may determine which precoding information to use for precoding the PUSCH communication, and the base station may not communicate the precoding indication field to the UE.

In an aspect, if 4 antenna ports are associated with the first SRS resource for the codebook usage, the first SRS resource may be replaced with two SRS resources for the antenna switching usage of 2T4R, which may be non-coherent or partially coherent. In an aspect, if 4 antenna ports are associated with the first SRS resource for the codebook usage, the first SRS resource may be replaced with four SRS resources for the antenna switching usage of 1T4R, which may be non-coherent. In an aspect, if 2 antenna ports are associated with the first SRS resource for the codebook usage, the first SRS resource may be merged with one SRS resources for the antenna switching usage of 2T4R to represent 4 antenna ports for the codebook usage, which may be non-coherent or partially coherent. In an aspect, if 2 antenna ports are associated with the first SRS resource for the codebook usage, the first SRS resource may be merged with two SRS resources for the antenna switching usage of 1T4R to represent 4 antenna ports for the codebook usage, which may be non-coherent or partially coherent.

Figure 23:
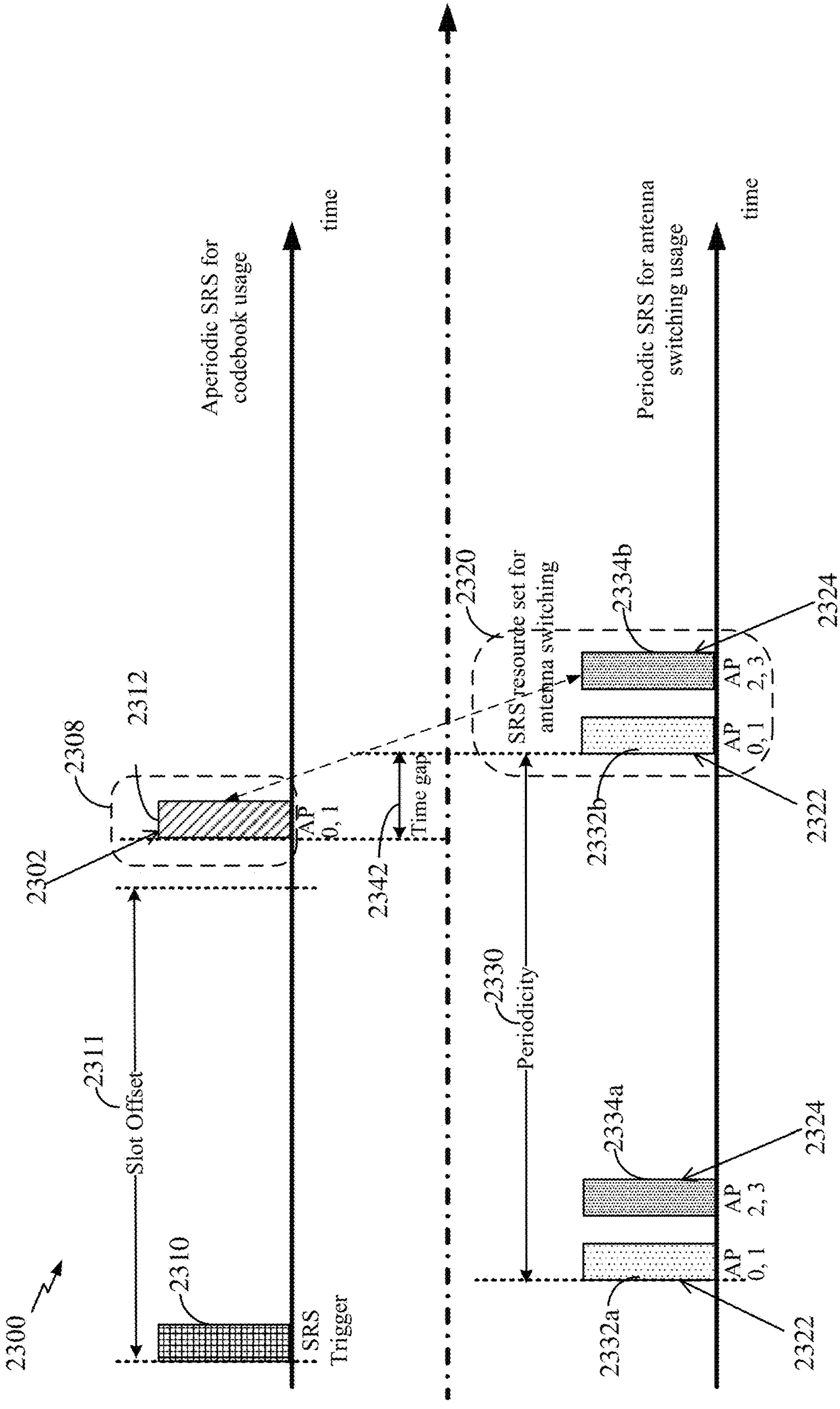
FIG. 23 is an example diagram illustrating an aperiodic SRS resource for one usage merging with a periodic SRS resource for another usage, according to some aspects.

FIG. 23 is an example diagram 2300 illustrating an aperiodic SRS resource for one usage merging with a periodic SRS resource for another usage, according to some aspects. In FIG. 23, an aperiodic SRS resource 2302, which may be included in a first SRS resource set 2308, is triggered by an SRS trigger 2310 and occurs after a slot offset 2311. The SRS trigger 2310 may include, for example, DCI triggering the first SRS resource set including the aperiodic SRS resource 2302. The aperiodic SRS resource 2302 is configured with two antenna ports (APs) 0 and 1.

In FIG. 23, a second SRS resource set (e.g., 2320) may include two periodic SRS resources, which recur with a periodicity of 2330. For example, periodic SRS resources 2322 and 2324 of the second SRS resource set 2320 may be respectively assigned to transmit periodic SRSs 2332*a* and 2334*a* at one time occasion, and may be respectively assigned to transmit periodic SRSs 2332*b* and 2334*b* at a later time occasion. The periodic SRS resource 2322 is configured with the APs 0 and 1, and the periodic SRS resource 2324 is configured with the APs 2 and 3. For example, the antenna switching usage may be in a 2T4R configuration.

In an aspect, because the periodic SRS resource 2322 of the second SRS resource set is associated with the APs 0 and 1, the aperiodic SRS resource 2302 associated with the APs 0 and 1 may be considered for merging. In particular, the UE may determine whether a time gap 2342 between the aperiodic SRS resource 2302 and the periodic SRS resource 2322 for the periodic SRS 2332*b* is less than the time threshold. If the time gap 2342 is less than the time threshold, then the aperiodic SRS resource 2302 and the periodic SRS resource 2322 for the periodic SRS 2332*b* may be merged, such that the UE may transmit an SRS using the periodic SRS resources 2322 and 2324 for the periodic SRSs 2332*b* and 2334*b*, for both the codebook usage and the antenna switching usage, using the four APs 0, 1, 2, and 3 (either non-coherent or partial-coherent), without using the aperiodic SRS resource 2302. If the time gap 2342 is greater than or equal to the time threshold, the aperiodic SRS resource 2302 and the periodic SRS resource 2322 for the periodic SRS 2332*b* may not be merged.

Figure 24:
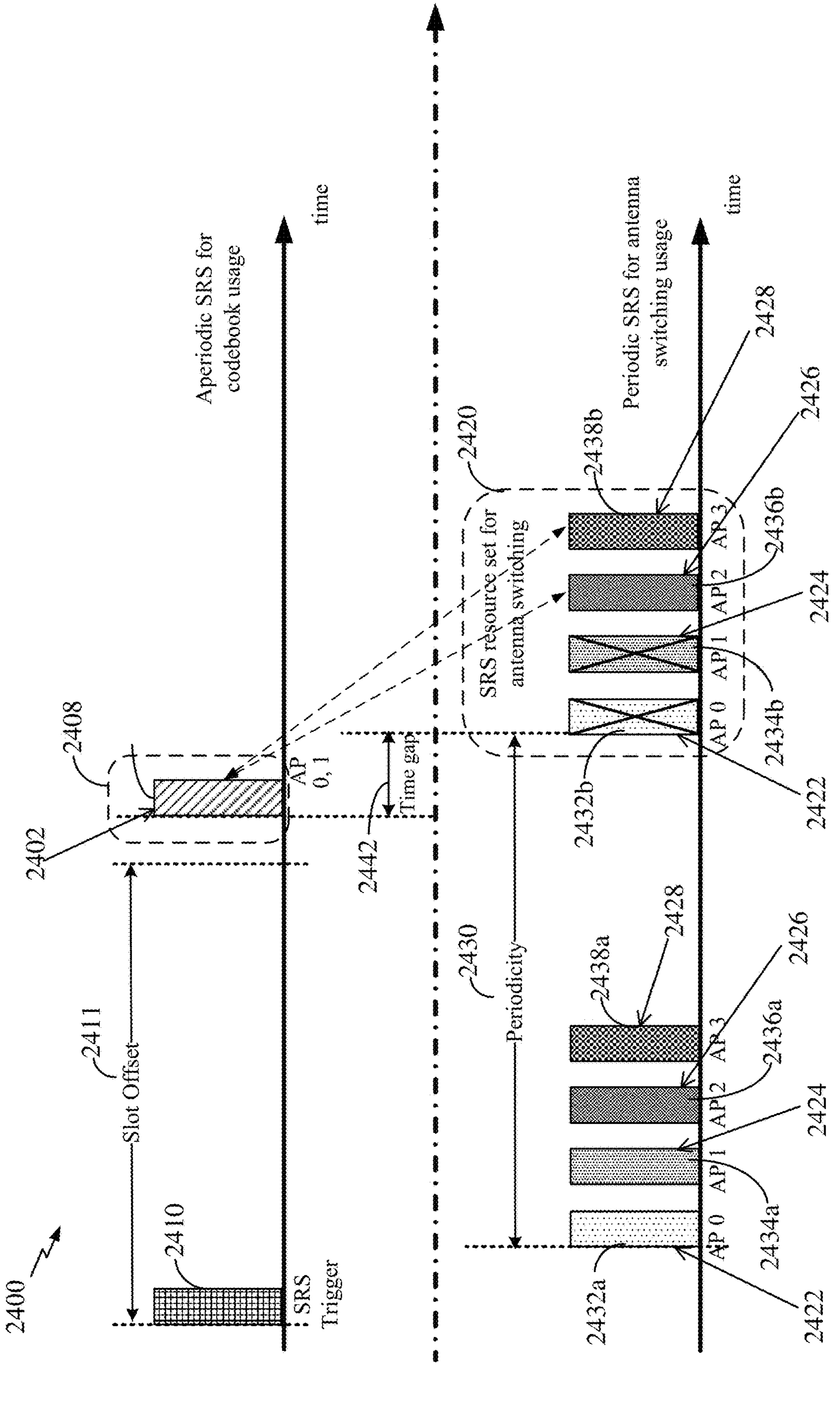
FIG. 24 is an example diagram illustrating an aperiodic SRS resource for one usage merging with a periodic SRS resource for another usage, according to some aspects.

FIG. 24 is an example diagram 2400 illustrating an aperiodic SRS resource for one usage merging with a periodic SRS resource for another usage, according to some aspects. In FIG. 24, an aperiodic SRS resource 2402, which may be included in a first SRS resource set 2408, is triggered by an SRS trigger 2410 and occurs after a slot offset 2411. The SRS trigger 2410 may include, for example, DCI triggering the first SRS resource set including the aperiodic SRS resource 2402. The aperiodic SRS resource 2402 is configured with two antenna ports (APs) 0 and 1.

In FIG. 24, a second SRS resource set (e.g., 2420) may include four periodic SRS resources, which recur with a periodicity of 2430. For example, periodic SRS resources 2422, 2424, 2426, and 2428 of the second SRS resource set may be respectively assigned to transmit periodic SRSs 2432*a*, 2434*a*, 2436*a*, and 2438*a* at one time occasion, and may be respectively assigned to transmit periodic SRSs 2432*b*, 2434*b*, 2436*b*, and 2438*b* at a later time occasion. The periodic SRS resource 2422 is configured with the AP 0, the periodic SRS resource 2424 is configured with the AP 1, the periodic SRS resource 2426 is configured with the AP 2, and the periodic SRS resource 2424 is configured with the AP 2. For example, the antenna switching usage may be in a 1T4R configuration.

In an aspect, because the periodic SRS resources 2422 and 2424 of the second SRS resource set are associated with the APs 0 and 1, the aperiodic SRS resource 2402 associated with the APs 0 and 1 may be considered for merging. In particular, the UE may determine whether a time gap 2442 between the aperiodic SRS resource 2402 and the periodic SRS resources 2422 for the periodic SRS 2432*b* is less than the time threshold, where the periodic SRS resources 2422 for the periodic SRS 2432*b* is closest in time to the aperiodic SRS resource 2402 among the periodic SRS resource 2422 for the periodic SRS 2432*b* and the periodic SRS resource 2424 for the periodic SRS 2434*b*. If the time gap 2442 is less than the time threshold, then the aperiodic SRS resource 2402 and the periodic SRS resources 2422 and 2424 for the periodic SRSs 2432*b* and 2434*b* may be merged, such that the UE may transmit an SRS using the periodic SRS resources 2422, 2424, 2426, 2428 for the periodic SRSs 2432*b*, 2434*b*, 2436*b*, 2438*b*, for both the codebook usage and the antenna switching usage, using the four APs 0, 1, 2, and 3 (non-coherent or partial-coherent), without using the aperiodic SRS resource 2402. If the time gap 2442 is greater than or equal to the time threshold, the aperiodic SRS resource 2402 and the periodic SRS resources 2422 and 2424 for the periodic SRSs 2432*b* and 2434*b* may not be merged.

When the first SRS resource for the first usage (e.g., codebook usage) and the second SRS resource for the second usage (e.g., antenna switching usage) are merged, such that the first SRS resource is used to transmit an SRS for the first usage and the second usage, the base station may receive a part of an SRS for the second usage from the first SRS resource for the first usage and may receive the rest of the SRS from an additional second SRS resource for the second usage. In an aspect, the second SRS resource and the additional second SRS resource may be included in the second SRS resource set for the second usage. In order to obtain a complete SRS, a transmit power of the first SRS resource for the first usage and a transmit power the additional second SRS resource(s) for the second usage may be configured to be the same. Hence, various approaches to configure transmit powers for different SRS resources with different usages may be provided.

Therefore, according to some aspects of the disclosure, the UE determines a first target transmit power associated with the first SRS resource for the first usage and a second target transmit power associated with an additional second SRS resource for the second usage, and then selects one of the first target transmit power and the second target transmit power as a transmit power for the first SRS resource and the additional second SRS resource. For example, the UE's transmit power per antenna port for all of the SRS resources for receiving an SRS should be set to the same level, regardless of whether the SRS resources are for the first usage or the second usage. According to one option, the UE may select the first target transmit power for the first usage (e.g., codebook usage) as the transmit power. Hence, for example, a power control for transmission of an antenna switching SRS may follow a power control for transmission of an codebook SRS. In an aspect, if the target transmit power for the codebook SRS is smaller than target transmit power for antenna switching SRS, the UE may not merge the SRS resources for the codebook usage and the antenna-switching usage. According to another option, the UE may select the second target transmit power for the second usage (e.g., antenna switching usage) as the transmit power. Hence, for example, a power control for transmission of a codebook SRS may follow a power control for transmission of an antenna-switching SRS. According to another option, the UE may select a greater one of the first target transmit power for the first usage and the second target transmit power as the transmit power for the second usage. Hence, the transmit power may be configured as: max {target transmit power for codebook-based SRS, target Tx power for antenna switching SRS}.

In an aspect, the target transmit power may be selected based on the usage type (e.g., codebook usage or antenna switching usage). In an example where the target transmit power is set based on a power control of the SRS for the first usage, the UE may select the first target transmit power as the transmit power based on determining that the first target transmit power is for the first usage. In another example where the target transmit power is set based on a power control of the SRS for the second usage, the UE may select the second target transmit power as the transmit power based on determining that the first target transmit power is for the second usage.

In an aspect, the target transmit power may be selected based on a power control of a periodic SRS resource or based on a power control of an aperiodic SRS resource. In an example where the target transmit power is set based on a power control of a periodic SRS, the UE may select as the target transmit power one of the first target transmit power and the second target transmit power that is a periodic SRS resource. In an example where the target transmit power is set based on a power control of an aperiodic SRS, the UE may select as the target transmit power one of the first target transmit power and the second target transmit power that is an aperiodic SRS resource.

In an aspect, the target transmit power may be selected based on a power control of an SRS resource that is earlier in time. For example, the UE may identify one of the first SRS resource and the additional second SRS resource that is allocated earlier in time, and select a target transmit power associated with the identified one of the first SRS resource and the additional second SRS resource as the transmit power. In one example, referring back to FIG. 9, when the merge occurs, the UE may select a target transmit power of the periodic SRS resource 904 for the periodic SRS 902*b* as the transmit power, which is earlier in time than the aperiodic SRS resource 924. In one example, referring back to FIG. 10, when the merge occurs, the UE may select a target transmit power of the aperiodic SRS resource 1024 as the transmit power, which is earlier in time than the periodic SRS resource 1004 for the periodic SRS 1006*c*.

In some aspects, the base station may schedule a PUSCH and send an updated transmit power control (TPC) command. A PUSCH transmission may occur in between a merged SRS resource and a subsequent SRS resource, and thus the TPC command may be received (e.g., via DCI) prior to the PUSCH transmission. According to an option, the TPC command may be ignored. According to an option, a target power based on the TPC command is utilized for SRS resources occurring after the TPC command is received. In an aspect, the TPC command may be ignored for the current merged SRS resource while the UE may set the transmit power based on the updated TPC command for subsequent SRS resources. According to an option, the UE may set the transmit power for the merged SRS resource based on the TPC command. In an aspect, the UE may transmit the SRS on the SRS resource using a transmit power based on the target power control command and a previous target power control command received prior to the target power control command. In an aspect, the base station may know the difference between the transmit power based on the TPC command and the transmit power based on the previous TPC for merging and may scale the received SRS power to make it align with codebook SRS.

Figure 25:
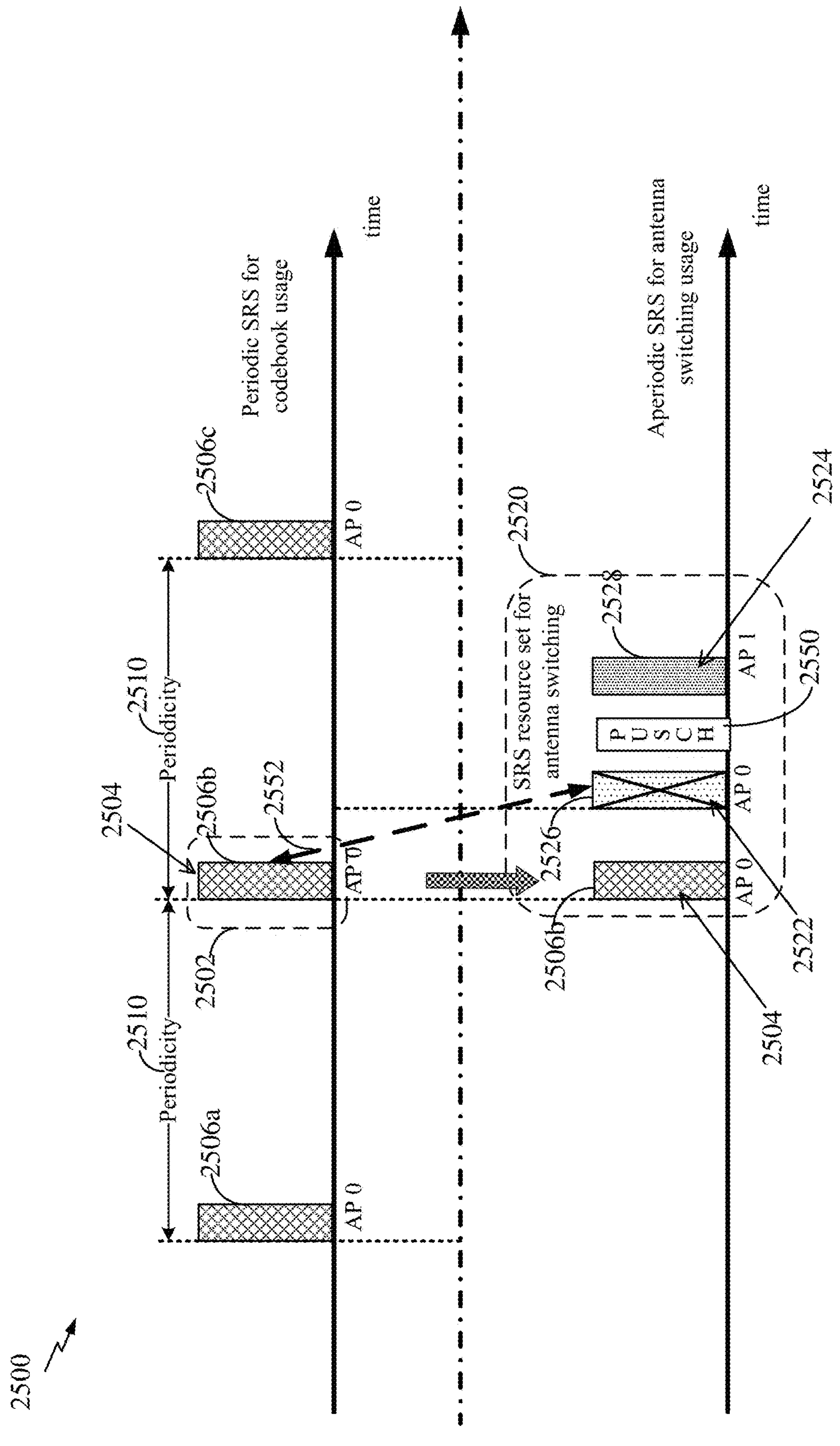
FIG. 25 is an example diagram illustrating a periodic SRS resource for one usage merging with an aperiodic SRS resource for another usage, according to some aspects.

FIG. 25 is an example diagram 2500 illustrating a periodic SRS resource for one usage merging with an aperiodic SRS resource for another usage, according to some aspects. In FIG. 25, a first SRS resource set 802 may include a periodic SRS resource 804, which may be utilized to transmit periodic SRSs, denoted as 806*a*, 806*b*, and 806*c*, for a codebook usage, recurring with a periodicity 2510. An AP 0 is associated with the periodic SRS resource 804. Further, in FIG. 25, a second SRS resource set 2520 may include aperiodic SRS resources 2522 and 2524, which may be triggered by an SRS trigger signal. For example, the antenna switching usage may be in a 1T2R configuration. In FIG. 25, the AP 0 is associated with the aperiodic SRS resource 2522 and the AP 1 is associated with the aperiodic SRS resource 2524.

In FIG. 25, the periodic SRS resource 2504 assigned to transmit the periodic SRS 2506*b* and the aperiodic SRS resource 2522 are merged. As a result, the periodic SRS resource 2504 for the periodic SRS 2506*b* may be used to transmit an SRS for both the codebook usage and the antenna switching usage, using the AP 0. Further, as a result, the aperiodic SRS resource 2522 may not be used for the antenna switching usage. The aperiodic SRS resource 2524 associated with the AP 1 is not merged with the periodic SRS resource 2504 for the periodic SRS 2506*b*, and thus is used to transmit its SRS for the antenna switching usage. Further, in FIG. 25, a PUSCH transmission 2550 between the periodic SRS resource 2504 for the periodic SRS 2506*b* and the aperiodic SRS resource 2524 may occur. A TPC command is received by the UE prior to the PUSCH transmission 2550. As discussed above, according to an option, the TPC command may be ignored. According to an option, the UE may set the transmit power for the aperiodic SRS resource 2524 allocated after the merged SRS resource based on the TPC command. According to an option, the UE may set the transmit power for the periodic SRS resource 2504 for the periodic SRS 2506*b* that has become the merged SRS resource based on the TPC command.

Figure 26:
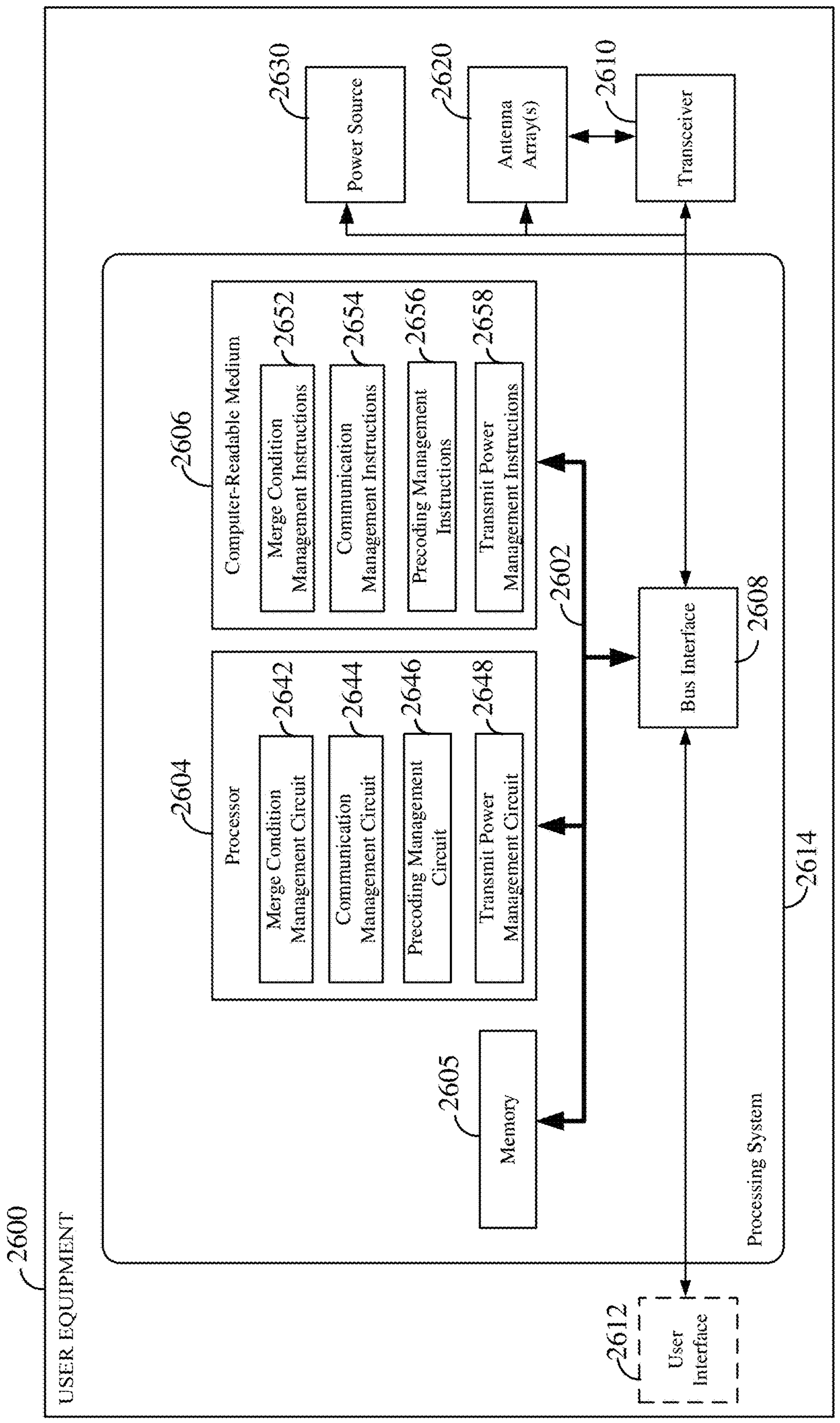
FIG. 26 is a block diagram illustrating an example of a hardware implementation for a user equipment employing a processing system according to some aspects.

FIG. 26 is a conceptual diagram illustrating an example of a hardware implementation for an exemplary UE 2600 employing a processing system 2614. For example, the UE 2600 may be, for example, a UE or other scheduled entity as illustrated in any one or more of FIGS. 1, 2, and 4.

The UE 2600 may be implemented with a processing system 2614 that includes one or more processors 2604. Examples of processors 2604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2600 may be configured to perform any one or more of the functions described herein. That is, the processor 2604, as utilized in a UE 2600, may be used to implement any one or more of the processes described below. The processor 2604 may in some instances be implemented via a baseband or modem chip and in other implementations, the processor 2604 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2614 may be implemented with a bus architecture, represented generally by the bus 2602. The bus 2602 may include any number of interconnecting buses and bridges depending on the specific application of the processing system 2614 and the overall design constraints. The bus 2602 communicatively couples together various circuits including one or more processors (represented generally by the processor 2604), a memory 2605, and computer-readable media (represented generally by the computer-readable storage medium 2606).

The bus 2602 may also link various other circuits such as timing sources, peripherals, voltage regulators, and power management circuits, which are well known in the art, and therefore, will not be described any further. A bus interface 2608 provides an interface between the bus 2602 and a transceiver 2610. The transceiver 2610 provides a means for communicating with various other apparatus over a transmission medium (e.g., air interface) using antenna array(s) 2620 (e.g., each including one or more antenna panels). A user interface 2612 (e.g., keypad, display, touchscreen, speaker, microphone, control knobs, etc.) may also be provided. Of course, such a user interface 2612 is optional, and may be omitted in some examples.

The processor 2604 is responsible for managing the bus 2602 and general processing, including the execution of software stored on the computer-readable storage medium 2606. The software, when executed by the processor 2604, causes the processing system 2614 to perform the various functions described below for any particular apparatus. The computer-readable storage medium 2606 and the memory 2605 may also be used for storing data that is manipulated by the processor 2604 when executing software.

One or more processors 2604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 2606.

The computer-readable storage medium 2606 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 2606 may reside in the processing system 2614, external to the processing system 2614, or distributed across multiple entities including the processing system 2614. The computer-readable storage medium 2606 may be embodied in a computer program product. In some examples, the computer-readable storage medium 2606 may be part of the memory 2605. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 2604 may include circuitry configured for various functions. For example, the processor 2604 may include merge condition management circuitry 2642 configured for various functions, including, for example, determining whether a time gap between a first sounding reference signal (SRS) resource for a first usage and a second SRS resource for a second usage in time is less than a time threshold. For example, the merge condition management circuitry 2642 may be configured to implement one or more of the functions described below in relation to FIGS. 27-28, including, e.g., blocks 2702 and 2806. The merge condition management circuitry 2642 may further be configured to execute merge condition management software/instructions 2652 stored in the computer-readable storage medium 2606 to perform one or more of the functions described below in relation to FIGS. 27-28, including, e.g., blocks 2702 and 2806.

In some aspects of the disclosure, the processor 2604 may include communication management circuitry 2644 configured for various functions, including, for example, transmitting an SRS utilizing one of the first SRS resource or the second SRS resource for both the first usage and the second usage, in response to determining that the time gap is less than the time threshold. For example, the communication management circuitry 2644 may be configured to implement one or more of the functions described below in relation to FIGS. 27-28, including, e.g., blocks 2704 and 2812. The communication management circuitry 2644 may further be configured to execute communication management software/instructions 2654 stored in the computer-readable storage medium 2606 to perform one or more of the functions described below in relation to FIGS. 27-28, including, e.g., blocks 2704 and 2812.

In some aspects of the disclosure, the processor 2604 may include precoding management circuitry 2646 configured for various functions, including, for example, determining precoding information based on a merging condition associated with selecting the one of the first SRS resource and the second SRS resource for both the first usage and the second usages. For example, the precoding management circuitry 2646 may be configured to implement one or more of the functions described below in relation to FIG. 28, including, e.g., block 2852. The precoding management circuitry 2646 may further be configured to execute precoding management software/instructions 2656 stored in the computer-readable storage medium 2606 to perform one or more of the functions described below in relation to FIG. 28, including, e.g., block 2852.

In some aspects of the disclosure, the processor 2604 may include transmit power management circuitry 2648 configured for various functions, including, for example, determining a first target transmit power associated with the first SRS resource and a second target transmit power associated with an additional second SRS resource for the second usage. For example, the transmit power management circuitry 2648 may be configured to implement one or more of the functions described below in relation to FIG. 28, including, e.g., block 2808. The transmit power management circuitry 2648 may further be configured to execute transmit power management software/instructions 2658 stored in the computer-readable storage medium 2606 to perform one or more of the functions described below in relation to FIG. 28, including, e.g., block 2808.

Figure 27:
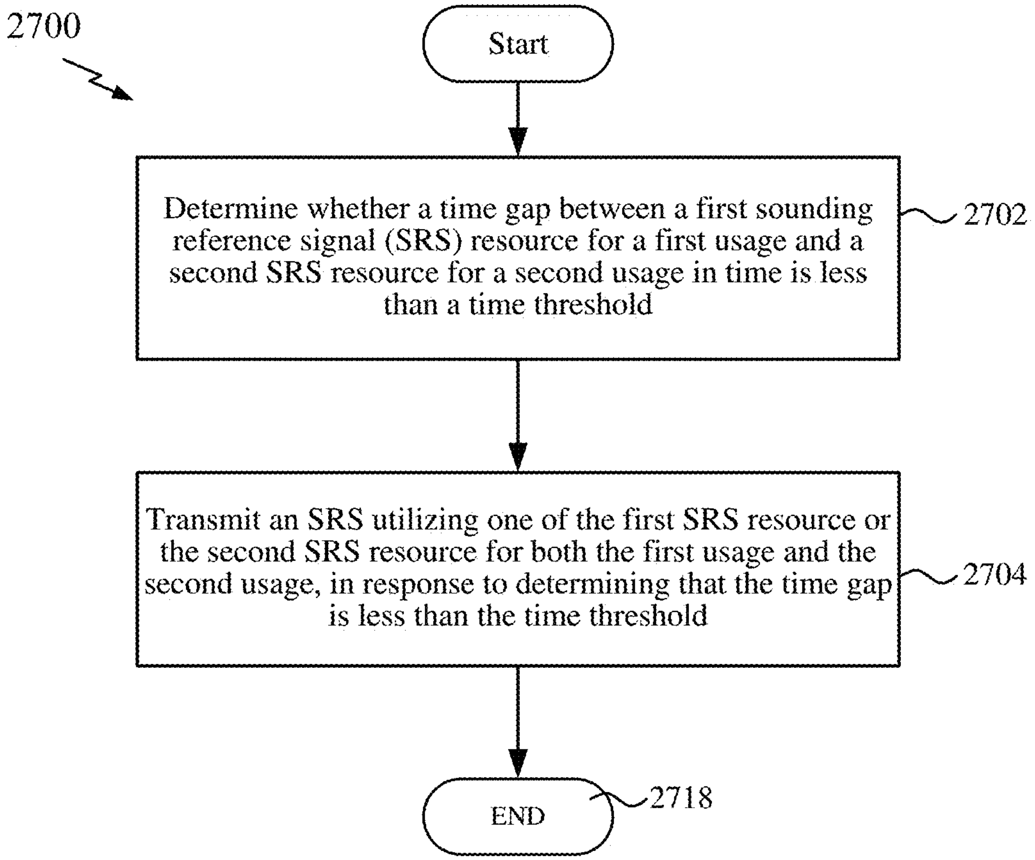
FIG. 27 is a flow chart of an exemplary method for wireless communication by a base station according to some aspects.

FIG. 27 is a flow chart 2700 of a method for wireless communication by a base station according to some aspects. As described below, some or all illustrated features may be omitted in a particular implementation within the scope of the present disclosure, and some illustrated features may not be required for implementation of all embodiments. In some examples, the method may be performed by the UE 2600, as described above and illustrated in FIG. 26, by a processor or processing system, or by any suitable means for carrying out the described functions.

At block 2702, the UE may determine whether a time gap between a first sounding reference signal (SRS) resource for a first usage and a second SRS resource for a second usage in time is less than a time threshold. For example, the merge condition management circuitry 2642 shown and described above in connection with FIG. 26 may include a means for determining whether a time gap between a first sounding reference signal (SRS) resource for a first usage and a second SRS resource for a second usage in time is less than a time threshold.

At block 2704, the UE may transmit an SRS utilizing one of the first SRS resource or the second SRS resource for both the first usage and the second usage, in response to determining that the time gap is less than the time threshold. For example, the communication management circuitry 2644 shown and described above in connection with FIG. 26 may provide means for transmitting the SRS.

In one configuration, a UE 2600, such as a gNB, includes means for performing the various functions and processes described in relation to FIG. 27. In one aspect, the aforementioned means may be the processor 2604 shown in FIG. 26 configured to perform the functions recited by the aforementioned means. In another aspect, the aforementioned means may be a circuit or any apparatus configured to perform the functions recited by the aforementioned means.

Figure 28A:
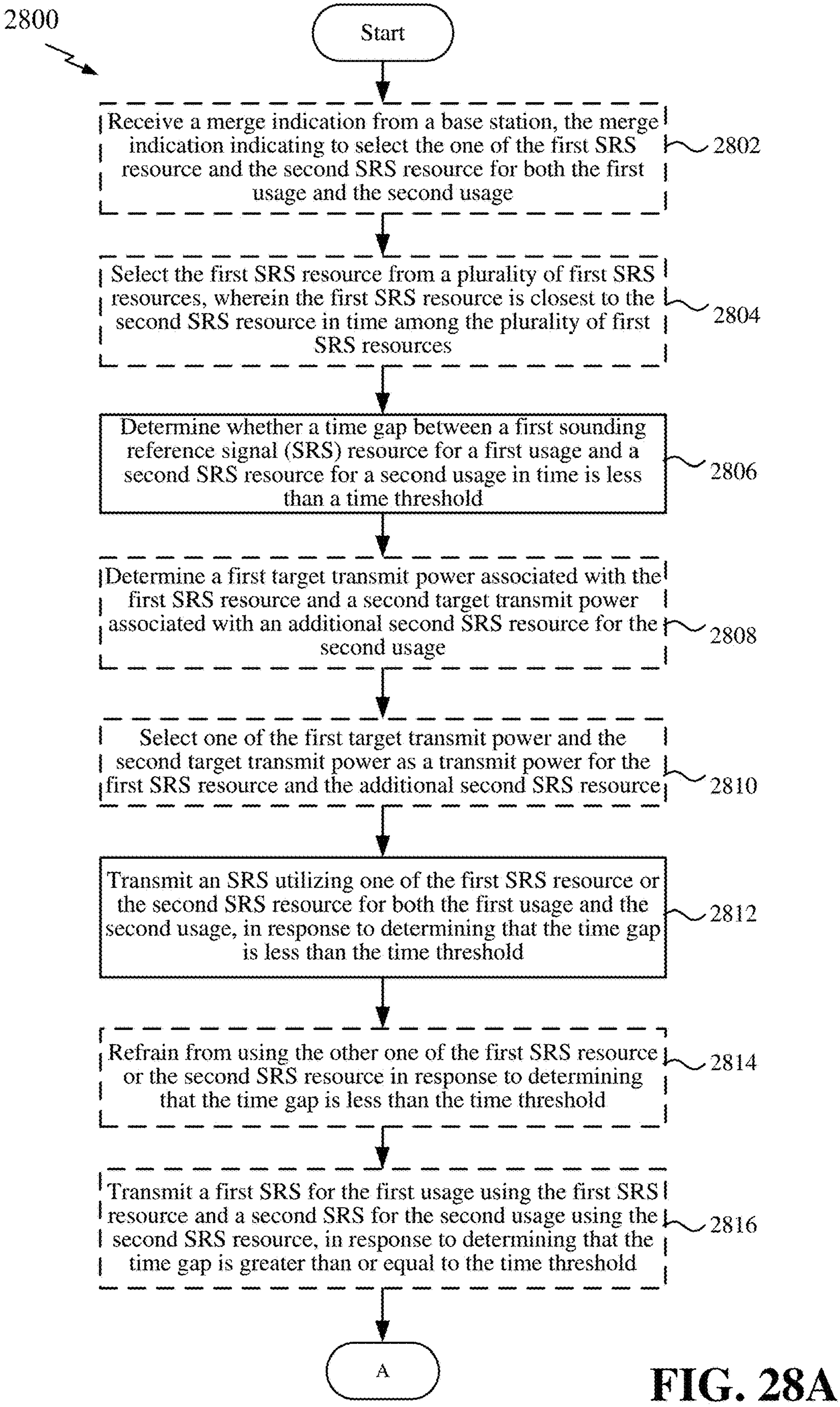
FIG. 28 is a flow chart of an exemplary method for wireless communication by a base station according to some aspects.

FIG. 28A is a flow chart 2800 of a method for wireless communication by a base station according to some aspects. As described below, some or all illustrated features may be omitted in a particular implementation within the scope of the present disclosure, and some illustrated features may not be required for implementation of all embodiments. In some examples, the method may be performed by the UE 2600, as described above and illustrated in FIG. 26, by a processor or processing system, or by any suitable means for carrying out the described functions.

At block 2802, the UE may receive a merge indication from a base station, the merge indication indicating to select the one of the first SRS resource and the second SRS resource for both the first usage and the second usage. For example, the merge condition management circuitry 2642 shown and described above in connection with FIG. 26 may provide means for receiving the merge indication from the base station.

At block 2804, the UE may select the first SRS resource from a plurality of first SRS resources, wherein the first SRS resource is closest to the second SRS resource in time among the plurality of first SRS resources. For example, the communication management circuitry 2644 shown and described above in connection with FIG. 26 may provide means for selecting the first SRS resource.

At block 2806, the UE may determine whether a time gap between a first sounding reference signal (SRS) resource for a first usage and a second SRS resource for a second usage in time is less than a time threshold. For example, the merge condition management circuitry 2642 shown and described above in connection with FIG. 26 may include a means for determining whether a time gap between a first sounding reference signal (SRS) resource for a first usage and a second SRS resource for a second usage in time is less than a time threshold. In an aspect, the determining that the time gap is less than the time threshold is based on the merge indication. In an aspect, the first usage is a codebook usage and the second usage is an antenna switching usage.

At block 2808, the UE may determine a first target transmit power associated with the first SRS resource and a second target transmit power associated with an additional second SRS resource for the second usage. For example, the transmit power management circuitry 2648 shown and described above in connection with FIG. 26 may provide means for determining the first target transmit power.

At block 2810, the UE may select one of the first target transmit power and the second target transmit power as a transmit power for the first SRS resource and the additional second SRS resource. For example, the transmit power management circuitry 2648 shown and described above in connection with FIG. 26 may provide means for selecting one of the first target transmit power and the second target transmit power.

In an aspect, the selected transmit power is one of: the first target transmit power, the second target transmit power, and a greater one of the first target transmit power and the second target transmit power.

In an aspect, the selecting the one of the first target transmit power and the second target transmit power as the transmit power includes: selecting the first target transmit power as the transmit power based on determining that the first target transmit power is for the first usage, or selecting the second target transmit power as the transmit power based on determining that the first target transmit power is for the second usage.

In an aspect, the selecting the one of the first target transmit power and the second target transmit power as the transmit power includes: selecting the one of the first target transmit power and the second target transmit power that is a periodic SRS resource, or selecting the one of the first target transmit power and the second target transmit power that is an aperiodic SRS resource.

In an aspect, the selecting the one of the first target transmit power and the second target transmit power as the transmit power comprises: identifying one of the first SRS resource and the additional second SRS resource that is allocated earlier in time, wherein the selecting the one of the first target transmit power and the second target transmit power comprises selecting a target transmit power associated with the identified one of the first SRS resource and the additional second SRS resource as the transmit power.

At block 2812, the UE may transmit an SRS utilizing one of the first SRS resource or the second SRS resource for both the first usage and the second usage, in response to determining that the time gap is less than the time threshold. For example, the communication management circuitry 2644 shown and described above in connection with FIG. 26 may provide means for transmitting the SRS.

In an aspect, the first SRS resource and the second SRS resource are configured with a same antenna port. In an aspect, the one of the first SRS resource or the second SRS resource is a periodic SRS resource. In an aspect, the first SRS resource is one of periodic SRS resources, and the threshold is based on a periodicity of the periodic SRS resources or a predefined value.

In an aspect, a linkage between the first SRS resource and the second SRS resource is indicated in a radio resource control (RRC) message. In an aspect, the linkage is indicated by at least one of the following: an indication of the one of the first SRS resource or the second SRS resource in a merged SRS resource field and an indication of the other one of the first SRS resource or the second SRS resource in a current SRS resource field in the RRC message, an indication of the second SRS resource in a first SRS resource field of the RRC message, the first SRS resource field indicating one or more first SRS resources including the first SRS resource, or an indication of the first resource in a second SRS resource field of the RRC message, the second SRS resource field indicating one or more second SRS resources including the second SRS resource.

In an aspect, the first SRS resource is associated with a single antenna port of the UE, and the second SRS resource is included in a second SRS resource set that includes a plurality of second SRS resources for the second usage, the plurality of second SRS resources being associated with two or more antenna ports, wherein the second usage comprises an antenna switching usage.

In an aspect, the first SRS resource is associated with two or more antenna ports of the UE, and the second SRS resource is included in a second SRS resource set that includes a plurality of second SRS resources for the second usage, the plurality of second SRS resources being associated with the two or more antenna ports, wherein the second usage comprises an antenna switching usage.

In an aspect, the time gap between the first SRS resource and the second SRS resource is a largest time gap among a plurality of time gaps respectively between the first SRS resource and the plurality of second SRS resources.

In an aspect, the number of the two or more antenna ports associated with the first SRS resource is greater than a number of antenna ports associated with the second SRS resource.

In an aspect, the first SRS resource is included in a first SRS resource set that includes a plurality of first SRS resources for the first usage.

In an aspect, first spatial relation information associated with the first SRS resource is the same as second spatial relation information associated with the second SRS resource. In an aspect, the first SRS resource and the second SRS resource are associated with a same antenna virtualization.

At block 2814, the UE may refrain from using the other one of the first SRS resource or the second SRS resource in response to determining that the time gap is less than the time threshold. For example, the communication management circuitry 2644 shown and described above in connection with FIG. 26 may provide means for refraining from using the other one of the first SRS resource or the second SRS resource.

At block 2816, the UE may transmit a first SRS for the first usage using the first SRS resource and a second SRS for the second usage using the second SRS resource, in response to determining that the time gap is greater than or equal to the time threshold. For example, the communication management circuitry 2644 shown and described above in connection with FIG. 26 may provide means for transmitting the first SRS.

Figure 28B:
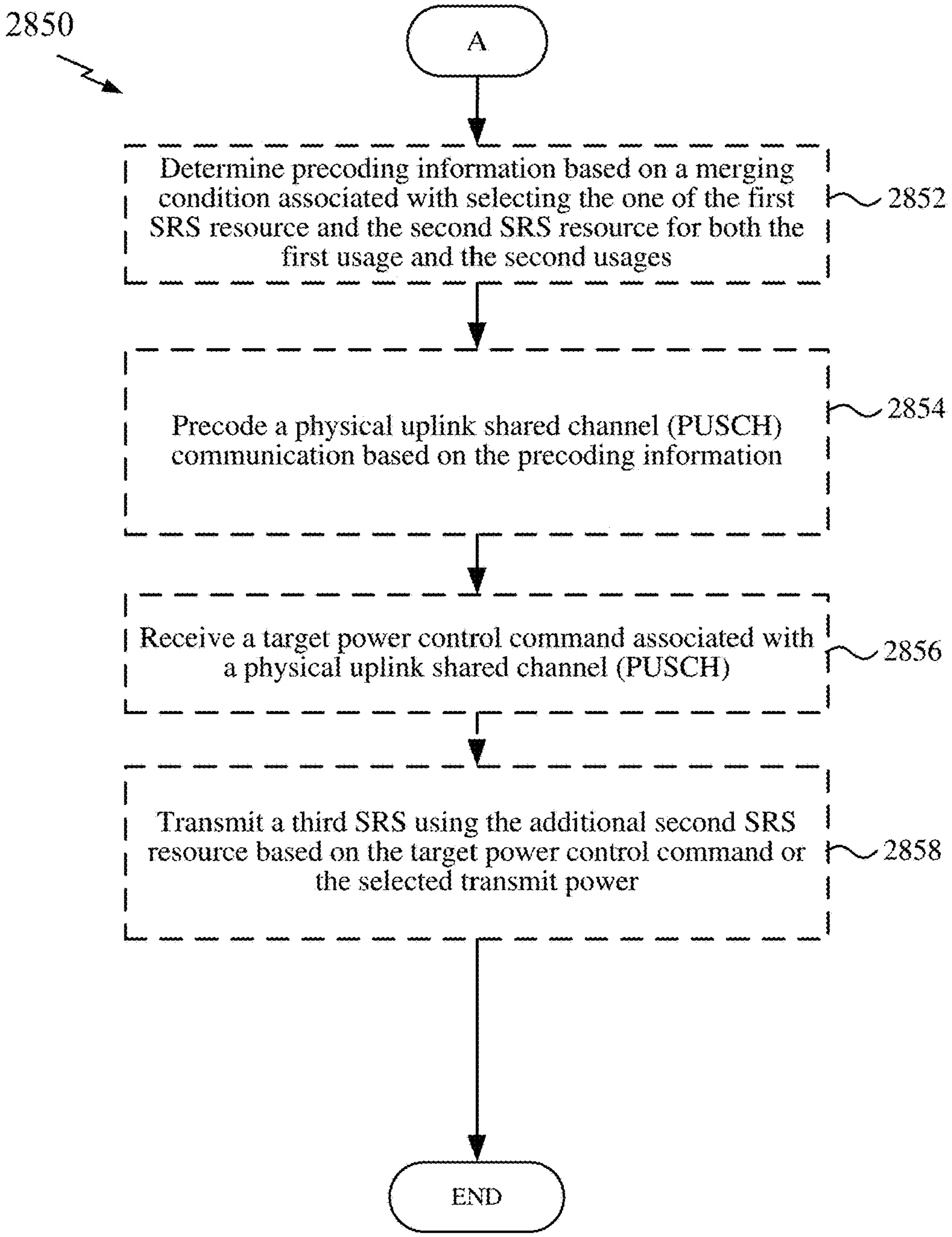

FIG. 28B is a flow chart 2850 of a method for wireless communication by a base station continuing from the flow chart 2800 of FIG. 28A, according to some aspects. As described below, some or all illustrated features may be omitted in a particular implementation within the scope of the present disclosure, and some illustrated features may not be required for implementation of all embodiments. In some examples, the method may be performed by the UE 2600, as described above and illustrated in FIG. 26, by a processor or processing system, or by any suitable means for carrying out the described functions.

At block 2852, the UE may determine precoding information based on a merging condition associated with selecting the one of the first SRS resource and the second SRS resource for both the first usage and the second usages. For example, the precoding management circuitry 2646 shown and described above in connection with FIG. 26 may provide means for determining the precoding information.

At block 2854, the UE may precode a physical uplink shared channel (PUSCH) communication based on the precoding information. For example, the precoding management circuitry 2646 shown and described above in connection with FIG. 26 may provide means for precoding the PUSCH communication.

In an aspect, the two or more antenna ports associated with the first SRS resource are the same as a plurality of antenna ports associated with the plurality of second SRS resources, and wherein the determining the precoding information includes: determining that the precoding information is first precoding information when the second SRS resource is associated with at least two of the two or more antenna ports, and determining that the precoding information is second precoding information different from the first precoding information when the second SRS resource is associated with one of the two or more antenna ports.

In an aspect, the determining the precoding information includes: receiving, from a base station, downlink control information (DCI) including an indication of the precoding information, where the precoding information is determined based on the DCI.

In an aspect, the number of the two or more antenna ports associated with the first SRS resource is less than a number of antenna ports associated with the second SRS resource set, and the first SRS resource and the second SRS resource are associated with same antenna ports.

In an aspect, the number of the two or more antenna ports associated with the first SRS resource is less than a number of antenna ports associated with the second SRS resource set, and antenna ports associated with the first SRS resource are the same as antenna ports associated with the second SRS resource and one or more other second SRS resources of the second SRS resource set.

At block 2856, the UE may receive a target power control command associated with a physical uplink shared channel (PUSCH). For example, the transmit power management circuitry 2648 shown and described above in connection with FIG. 26 may provide means for receiving the target power control command.

At block 2858, the UE may transmit a third SRS using the additional second SRS resource based on the target power control command or the selected transmit power. For example, the communication management circuitry 2644 and the transmit power management circuitry 2648 shown and described above in connection with FIG. 26 may provide means for transmitting the third SRS. In an aspect, the SRS is transmitted based on the target power control command.

In one configuration, a UE 2600, such as a gNB, includes means for performing the various functions and processes described in relation to FIG. 27-28. In one aspect, the aforementioned means may be the processor 2604 shown in FIG. 26 configured to perform the functions recited by the aforementioned means. In another aspect, the aforementioned means may be a circuit or any apparatus configured to perform the functions recited by the aforementioned means.

Of course, in the above examples, the circuitry included in the processor 2604 is merely provided as an example, and other means for carrying out the described functions may be included within various aspects of the present disclosure, including but not limited to the instructions stored in the computer-readable storage medium 2606, or any other suitable apparatus or means described in any one of the FIGS. 1, 2, and/or 4, and utilizing, for example, the processes and/or algorithms described herein in relation to FIGS. 27-28.

Figure 29:
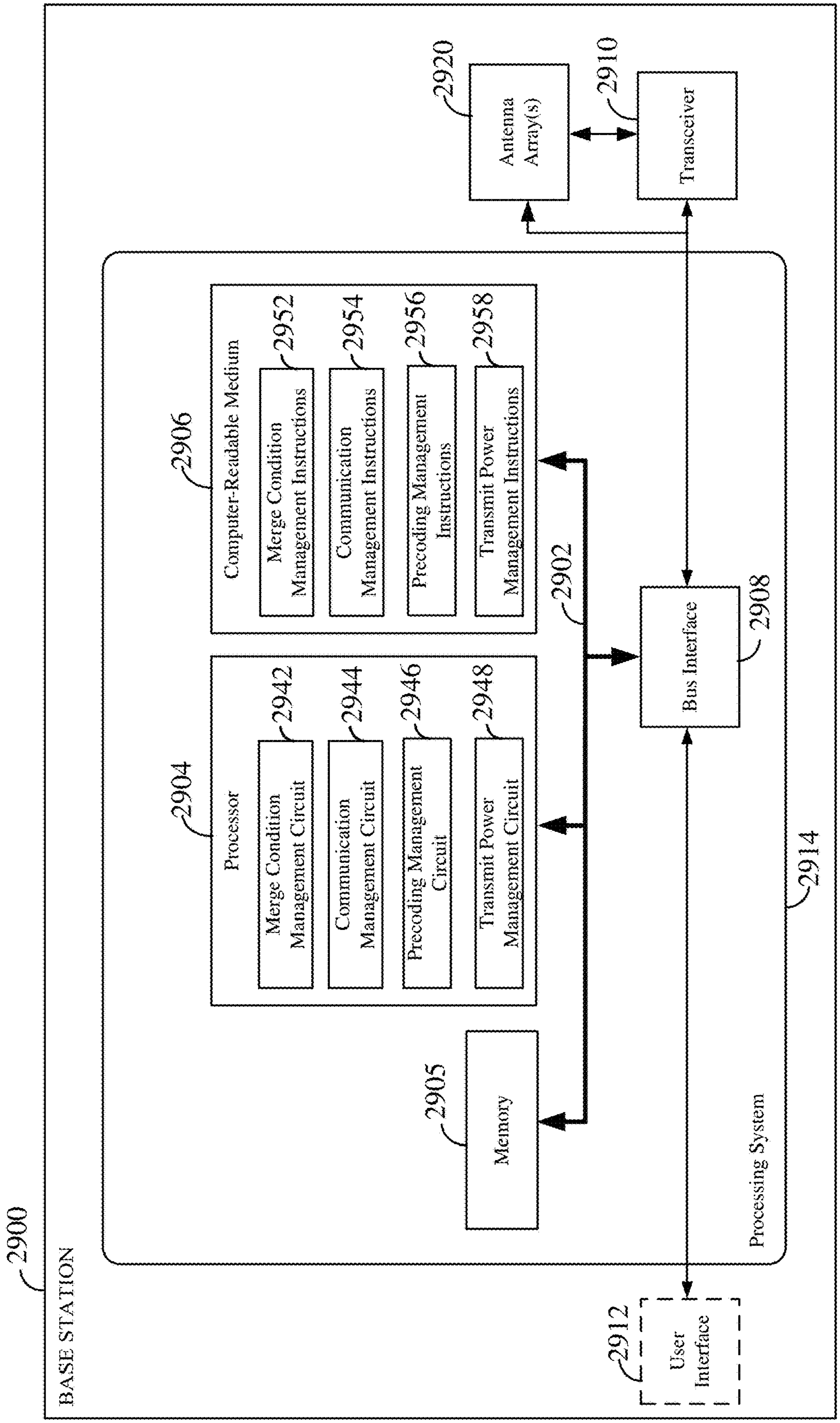
FIG. 29 is a block diagram illustrating an example of a hardware implementation for a base station employing a processing system according to some aspects.

FIG. 29 is a block diagram illustrating an example of a hardware implementation for a base station 2900 employing a processing system 2914. For example, the base station 2900 may correspond to any of the UEs or scheduled entities shown and described above in reference to FIGS. 1, 2, and/or 4.

In accordance with various aspects of the disclosure, an element, or any portion of an element, or any combination of elements may be implemented with a processing system 2914 that includes one or more processors 2904. The processing system 2914 may be substantially the same as the processing system 2614 illustrated in FIG. 26, including a bus interface 2908, a bus 2902, memory 2905, a processor 2904, and a computer-readable storage medium 2906. Furthermore, the base station 2900 may include a user interface 2912 and a transceiver 2910 substantially similar to those described above in FIG. 26. That is, the processor 2904, as utilized in a UE 2900, may be used to implement any one or more of the processes described below.

In some aspects of the disclosure, the processor 2904 may include circuitry configured for various functions. For example, the processor 2904 may include merge condition management circuitry 2942 configured for various functions, including, for example, determining whether a time gap between a first SRS resource of the at least one first SRS resource and a second SRS resource of the at least one second SRS resource is less than a time threshold. For example, the merge condition management circuitry 2942 may be configured to implement one or more of the functions described below in relation to FIGS. 30-31, including, e.g., blocks 3004 and 3106. The merge condition management circuitry 2942 may further be configured to execute merge condition management software/instructions 2952 stored in the computer-readable storage medium 2906 to perform one or more of the functions described below in relation to FIGS. 30-31, including. e.g., blocks 3004 and 3106.

In some aspects of the disclosure, the processor 2904 may include communication management circuitry 2944 configured for various functions, including, for example, assigning at least one first sounding reference signal (SRS) resource for a first usage and at least one second SRS resource for a second usage. For example, the communication management circuitry 2944 may be configured to implement one or more of the functions described below in relation to FIGS. 30-31, including, e.g., blocks 3002 and 3102. The communication management circuitry 2944 may further be configured to execute communication management software/instructions 2954 stored in the computer-readable storage medium 2906 to perform one or more of the functions described below in relation to FIGS. 30-31, including, e.g., blocks 3002 and 3102.

In some aspects, the communication management circuitry 2944 may be configured for various functions, including, for example, transmitting, to a user equipment (UE) a first indication that the time gap is less than the time threshold, in response to determining that the time gap is less than the time threshold. For example, the communication management circuitry 2944 may be configured to implement one or more of the functions described below in relation to FIGS. 30-31, including, e.g., blocks 3006 and 3108. The communication management circuitry 2944 may further be configured to execute communication management software/instructions 2954 stored in the computer-readable storage medium 2906 to perform one or more of the functions described below in relation to FIGS. 30-31, including, e.g., blocks 3006 and 3108.

In some aspects of the disclosure, the processor 2904 may include precoding management circuitry 2946 configured for various functions, including, for example, receiving, from the UE, a physical uplink shared channel (PUSCH) communication determined based on precoding information, the precoding information being based on a merging condition associated with selecting one of the first SRS resource and the second SRS resource for both the first usage and the second usages. For example, the precoding management circuitry 2946 may be configured to implement one or more of the functions described below in relation to FIG. 31, including, e.g., block 3152. The precoding management circuitry 2946 may further be configured to execute precoding management software/instructions 2956 stored in the computer-readable storage medium 2906 to perform one or more of the functions described below in relation to FIG. 31, including, e.g., block 3152.

In some aspects of the disclosure, the processor 2904 may include transmit power management circuitry 2948 configured for various functions, including, for example, transmitting, to the UE, a target power control command associated with a physical uplink shared channel (PUSCH). For example, the transmit power management circuitry 2948 may be configured to implement one or more of the functions described below in relation to FIG. 31, including, e.g., block 3153. The transmit power management circuitry 2948 may further be configured to execute transmit power management software/instructions 2958 stored in the computer-readable storage medium 2906 to perform one or more of the functions described below in relation to FIG. 31, including, e.g., block 3153.

Figure 30:
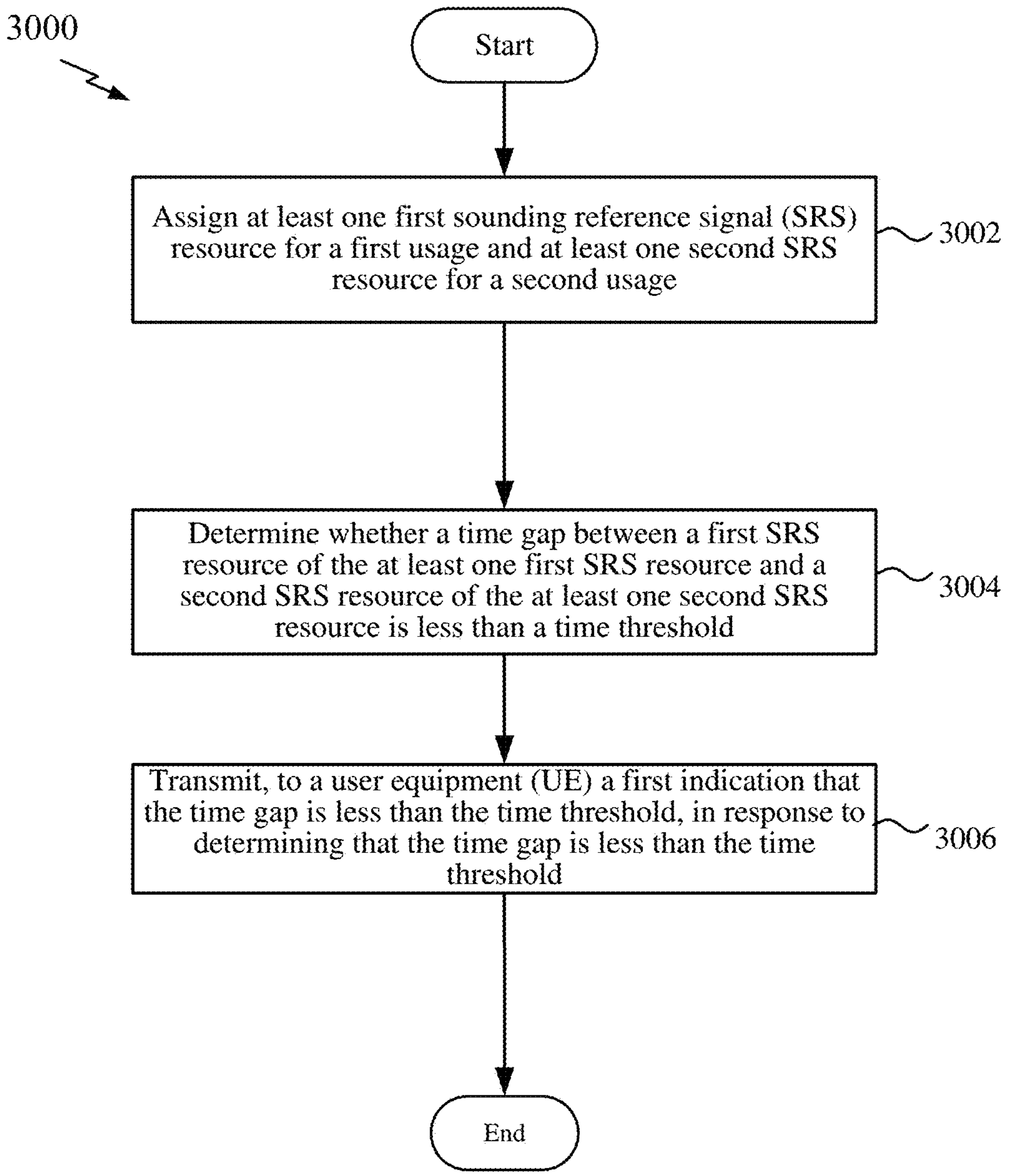
FIG. 30 is a flow chart of an exemplary method for wireless communication by a user equipment according to some aspects.

FIG. 30 is a flow chart 3000 of a method for wireless communication by a UE according to some aspects. As described below, some or all illustrated features may be omitted in a particular implementation within the scope of the present disclosure, and some illustrated features may not be required for implementation of all embodiments. In some examples, the method may be performed by the base station 2900, as described above and illustrated in FIG. 29, by a processor or processing system, or by any suitable means for carrying out the described functions.

At block 3002, the base station may assign at least one first sounding reference signal (SRS) resource for a first usage and at least one second SRS resource for a second usage. For example, the communication management circuitry 2944 shown and described above in connection with FIG. 29 may provide means for assigning the at least one first SRS resource.

At block 3004, the base station may determine whether a time gap between a first SRS resource of the at least one first SRS resource and a second SRS resource of the at least one second SRS resource is less than a time threshold. For example, the merge condition management circuitry 2942 shown and described above in connection with FIG. 29 may provide means for determining whether a time gap between a first SRS resource of the at least one first SRS resource and a second SRS resource of the at least one second SRS resource is less than a time threshold.

At block 3006, the base station may transmit, to a user equipment (UE) a first indication that the time gap is less than the time threshold, in response to determining that the time gap is less than the time threshold. For example, the communication management circuitry 2944 shown and described above in connection with FIG. 29 may provide means for transmitting the first indication.

In one configuration, a UE 2900 includes means for performing the various functions and processes described in relation to FIG. 30. In one aspect, the aforementioned means may be the processor 2904 shown in FIG. 29 configured to perform the functions recited by the aforementioned means. In another aspect, the aforementioned means may be a circuit or any apparatus configured to perform the functions recited by the aforementioned means.

Figure 31A:
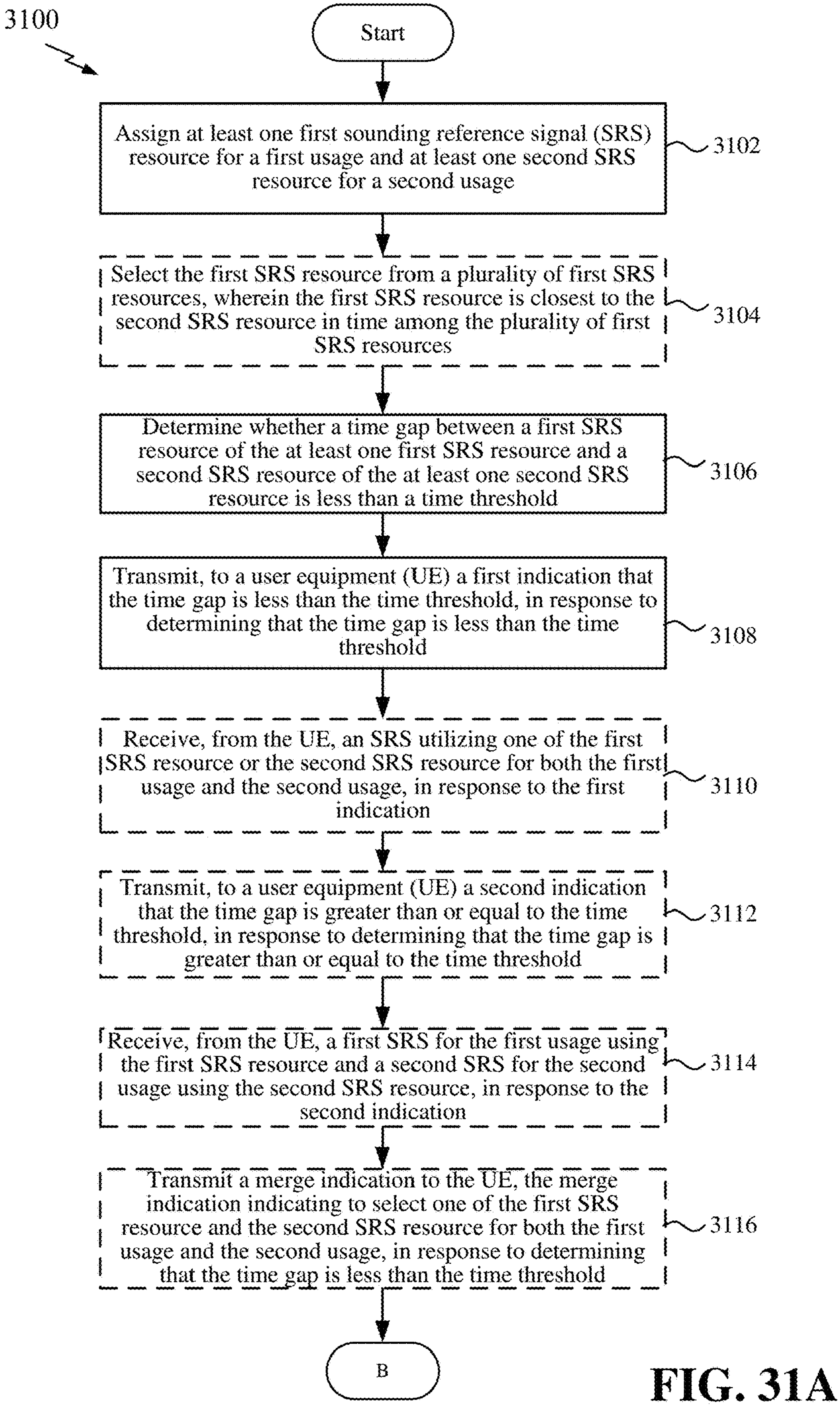
FIG. 31 is a flow chart of an exemplary method for wireless communication by a user equipment according to some aspects.

FIG. 31A is a flow chart 3100 of a method for wireless communication by a UE according to some aspects. As described below, some or all illustrated features may be omitted in a particular implementation within the scope of the present disclosure, and some illustrated features may not be required for implementation of all embodiments. In some examples, the method may be performed by the base station 2900, as described above and illustrated in FIG. 29, by a processor or processing system, or by any suitable means for carrying out the described functions.

At block 3102, the base station may assign at least one first sounding reference signal (SRS) resource for a first usage and at least one second SRS resource for a second usage. For example, the communication management circuitry 2944 shown and described above in connection with FIG. 29 may provide means for assigning the at least one first SRS resource.

At block 3104, the base station may select the first SRS resource from a plurality of first SRS resources, wherein the first SRS resource is closest to the second SRS resource in time among the plurality of first SRS resources. For example, the communication management circuitry 2944 shown and described above in connection with FIG. 29 may provide means for determining whether a time gap between a first SRS resource of the at least one first SRS resource and a second SRS resource of the at least one second SRS resource is less than a time threshold.

At block 3106, the base station may determine whether a time gap between a first SRS resource of the at least one first SRS resource and a second SRS resource of the at least one second SRS resource is less than a time threshold. For example, the merge condition management circuitry 2942 shown and described above in connection with FIG. 29 may provide means for determining whether a time gap between a first SRS resource of the at least one first SRS resource and a second SRS resource of the at least one second SRS resource is less than a time threshold.

At block 3108, the base station may transmit, to a user equipment (UE) a first indication that the time gap is less than the time threshold, in response to determining that the time gap is less than the time threshold. For example, the communication management circuitry 2944 shown and described above in connection with FIG. 29 may provide means for transmitting the first indication. In an aspect, the first usage is a codebook usage and the second usage is an antenna switching usage.

In an aspect, the first SRS resource and the second SRS resource are configured with a same antenna port. In an aspect, the one of the first SRS resource or the second SRS resource is a periodic SRS resource. In an aspect, the first SRS resource is one of periodic SRS resources, and the threshold is based on a periodicity of the periodic SRS resources or a predefined value.

In an aspect, a linkage between the first SRS resource and the second SRS resource is indicated in a radio resource control (RRC) message. In an aspect, the linkage is indicated by at least one of the following: an indication of the one of the first SRS resource or the second SRS resource in a merged SRS resource field and an indication of the other one of the first SRS resource or the second SRS resource in a current SRS resource field in the RRC message, an indication of the second SRS resource in a first SRS resource field of the RRC message, the first SRS resource field indicating one or more first SRS resources including the first SRS resource, or an indication of the first resource in a second SRS resource field of the RRC message, the second SRS resource field indicating one or more second SRS resources including the second SRS resource.

In an aspect, the first SRS resource is associated with a single antenna port of the UE, and the second SRS resource is included in a second SRS resource set that includes a plurality of second SRS resources for the second usage, the plurality of second SRS resources being associated with two or more antenna ports, wherein the second usage comprises an antenna switching usage.

In an aspect, the first SRS resource is associated with two or more antenna ports of the UE, and the second SRS resource is included in a second SRS resource set that includes a plurality of second SRS resources for the second usage, the plurality of second SRS resources being associated with the two or more antenna ports, wherein the second usage comprises an antenna switching usage.

In an aspect, the time gap between the first SRS resource and the second SRS resource is a largest time gap among a plurality of time gaps respectively between the first SRS resource and the plurality of second SRS resources.

In an aspect, the number of the two or more antenna ports associated with the first SRS resource is greater than a number of antenna ports associated with the second SRS resource.

In an aspect, the first SRS resource is included in a first SRS resource set that includes a plurality of first SRS resources for the first usage.

In an aspect, first spatial relation information associated with the first SRS resource is the same as second spatial relation information associated with the second SRS resource. In an aspect, the first SRS resource and the second SRS resource are associated with a same antenna virtualization.

At block 3110, the base station may receive, from the UE, an SRS utilizing one of the first SRS resource or the second SRS resource for both the first usage and the second usage, in response to the first indication. For example, the communication management circuitry 2944 shown and described above in connection with FIG. 29 may provide means for receiving the SRS.

At block 3112, the base station may transmit, to a user equipment (UE) a second indication that the time gap is greater than or equal to the time threshold, in response to determining that the time gap is greater than or equal to the time threshold. For example, the communication management circuitry 2944 shown and described above in connection with FIG. 29 may provide means for transmitting the second indication.

At block 3114, the base station may receive, from the UE, a first SRS for the first usage using the first SRS resource and a second SRS for the second usage using the second SRS resource, in response to the second indication. For example, the communication management circuitry 2944 shown and described above in connection with FIG. 29 may provide means for receiving the first SRS and the second SRS.

At block 3116, the base station may transmit a merge indication to the UE, the merge indication indicating to select one of the first SRS resource and the second SRS resource for both the first usage and the second usage, in response to determining that the time gap is less than the time threshold. For example, the communication management circuitry 2944 shown and described above in connection with FIG. 29 may provide means for transmitting the merge indication.

Figure 31B:
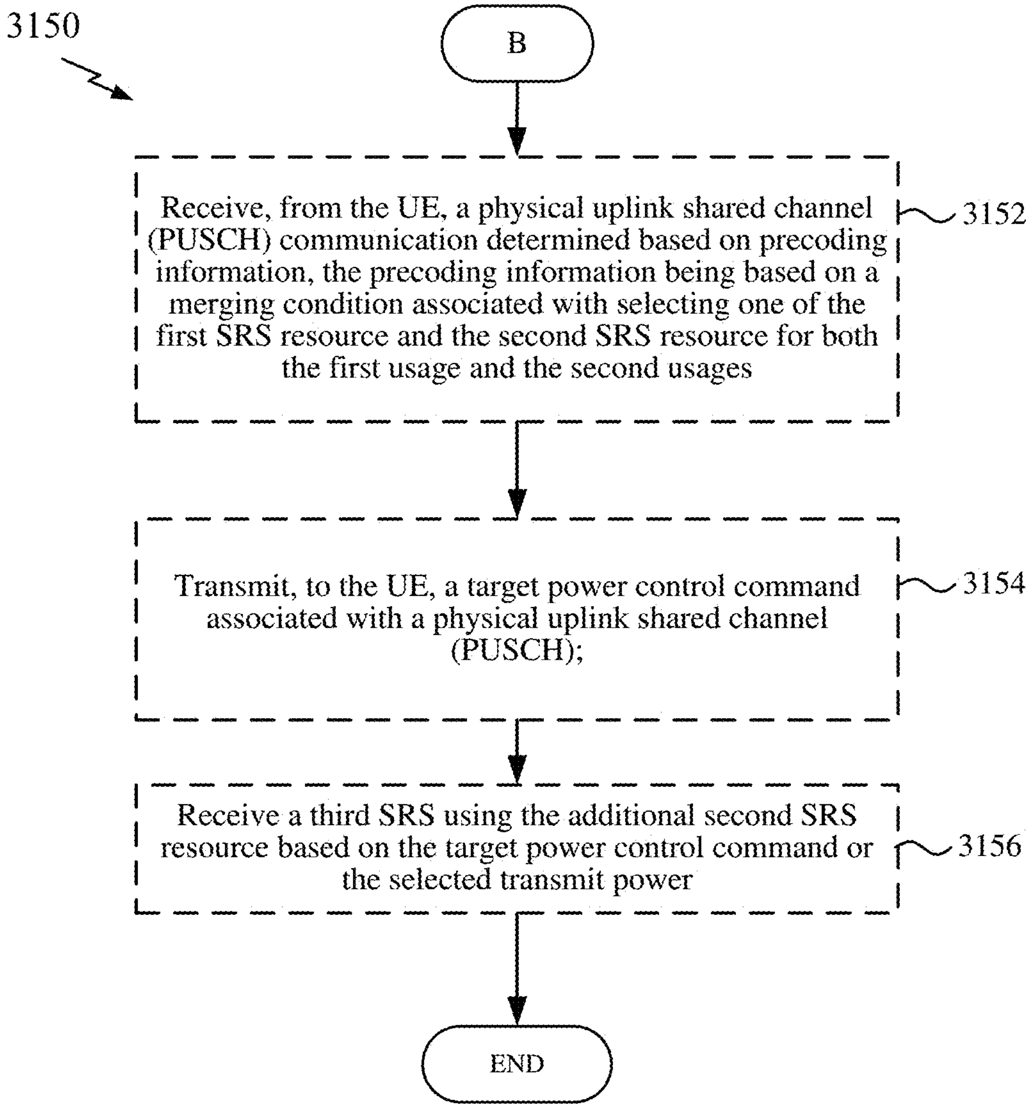

FIG. 31B is a flow chart 3150 of a method for wireless communication by a UE according to some aspects. As described below, some or all illustrated features may be omitted in a particular implementation within the scope of the present disclosure, and some illustrated features may not be required for implementation of all embodiments. In some examples, the method may be performed by the base station 2900, as described above and illustrated in FIG. 29, by a processor or processing system, or by any suitable means for carrying out the described functions.

At block 3152, the base station may receive, from the UE, a physical uplink shared channel (PUSCH) communication determined based on precoding information, the precoding information being based on a merging condition associated with selecting one of the first SRS resource and the second SRS resource for both the first usage and the second usages. For example, the precoding management circuitry 2946 shown and described above in connection with FIG. 29 may provide means for receiving the PUSCH communication.

In an aspect, the two or more antenna ports associated with the first SRS resource are the same as a plurality of antenna ports associated with the plurality of second SRS resources, and the precoding information is first precoding information when the second SRS resource is associated with at least two of the two or more antenna ports, and the precoding information is second precoding information different from the first precoding information when the second SRS resource is associated with one of the two or more antenna ports.

In an aspect, the determining the precoding information comprises: transmitting, to the UE, downlink control information (DCI) including an indication of the precoding information, wherein the precoding information is determined based on the DCI.

In an aspect, the number of the two or more antenna ports associated with the first SRS resource is less than a number of antenna ports associated with the second SRS resource set, and the first SRS resource and the second SRS resource are associated with same antenna ports.

In an aspect, the number of the two or more antenna ports associated with the first SRS resource is less than a number of antenna ports associated with the second SRS resource set, and antenna ports associated with the first SRS resource are the same as antenna ports associated with the second SRS resource and one or more other second SRS resources of the second SRS resource set.

In an aspect, a first target transmit power is associated with the first SRS resource and a second target transmit power is associated with an additional second SRS resource for the second usage, and one of the first target transmit power and the second target transmit power is selected as a transmit power for the first SRS resource and the additional second SRS resource.

In an aspect, the selected transmit power is one of: the first target transmit power, the second target transmit power, and a greater one of the first target transmit power and the second target transmit power.

In an aspect, the one of the first target transmit power and the second target transmit power as the transmit power is selected by: selecting the first target transmit power as the transmit power based on determining that the first target transmit power is for the first usage, or selecting the second target transmit power as the transmit power based on determining that the first target transmit power is for the second usage.

In an aspect, the one of the first target transmit power and the second target transmit power as the transmit power is selected by: selecting the one of the first target transmit power and the second target transmit power that is a periodic SRS resource, or selecting the one of the first target transmit power and the second target transmit power that is an aperiodic SRS resource.

In an aspect, the one of the first target transmit power and the second target transmit power as the transmit power is selected by: identifying one of the first SRS resource and the additional second SRS resource that is allocated earlier in time, wherein the selecting the one of the first target transmit power and the second target transmit power comprises selecting a target transmit power associated with the identified one of the first SRS resource and the additional second SRS resource as the transmit power.

At block 3154, the base station may transmit, to the UE, a target power control command associated with a physical uplink shared channel (PUSCH). For example, the transmit power management circuitry 2948 shown and described above in connection with FIG. 29 may provide means for transmitting the target power control command.

At block 3156, the base station may receive a third SRS using the additional second SRS resource based on the target power control command or the selected transmit power. For example, the communication management circuitry 2944 shown and described above in connection with FIG. 29 may provide means for receiving the third SRS. In an aspect, the SRS is received based on the target power control command.

In one configuration, a UE 2900 includes means for performing the various functions and processes described in relation to FIG. 31. In one aspect, the aforementioned means may be the processor 2904 shown in FIG. 29 configured to perform the functions recited by the aforementioned means. In another aspect, the aforementioned means may be a circuit or any apparatus configured to perform the functions recited by the aforementioned means.

Of course, in the above examples, the circuitry included in the processor 2904 is merely provided as an example, and other means for carrying out the described functions may be included within various aspects of the present disclosure, including but not limited to the instructions stored in the computer-readable storage medium 2906, or any other suitable apparatus or means described in any one of the FIGS. 1, 2, and/or 4 and utilizing, for example, the processes and/or algorithms described herein in relation to FIGS. 30-31.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of several aspects of the present disclosure.

Aspect 1: A method of wireless communication by a user equipment (UE), comprising: determining whether a time gap between a first sounding reference signal (SRS) resource for a first usage and a second SRS resource for a second usage in time is less than a time threshold; and transmitting an SRS utilizing one of the first SRS resource or the second SRS resource for both the first usage and the second usage, in response to determining that the time gap is less than the time threshold.

Aspect 2: The method of aspect 1, wherein the first SRS resource and the second SRS resource are configured with a same antenna port.

Aspect 3: The method of aspect 1 or 2, further comprising: refraining from using the other one of the first SRS resource or the second SRS resource in response to determining that the time gap is less than the time threshold.

Aspect 4: The method of any of aspects 1 through 3, further comprising: transmitting a first SRS for the first usage using the first SRS resource and a second SRS for the second usage using the second SRS resource, in response to determining that the time gap is greater than or equal to the time threshold.

Aspect 5: The method of any of aspects 1 through 4, wherein the one of the first SRS resource or the second SRS resource is a periodic SRS resource.

Aspect 6: The method of any of aspects 1 through 5, wherein the first SRS resource is one of periodic SRS resources, and wherein the threshold is based on a periodicity of the periodic SRS resources or a predefined value.

Aspect 7: The method of any of aspects 1 through 6, further comprising: selecting the first SRS resource from a plurality of first SRS resources, wherein the first SRS resource is closest to the second SRS resource in time among the plurality of first SRS resources.

Aspect 8: The method of any of aspects 1 through 7, wherein a linkage between the first SRS resource and the second SRS resource is indicated in a radio resource control (RRC) message.

Aspect 9: The method of aspect 8, wherein the linkage is indicated by at least one of the following: an indication of the one of the first SRS resource or the second SRS resource in a merged SRS resource field and an indication of the other one of the first SRS resource or the second SRS resource in a current SRS resource field in the RRC message, an indication of the second SRS resource in a first SRS resource field of the RRC message, the first SRS resource field indicating one or more first SRS resources including the first SRS resource, or an indication of the first resource in a second SRS resource field of the RRC message, the second SRS resource field indicating one or more second SRS resources including the second SRS resource.

Aspect 10: The method of any of aspects 1 through 9, wherein the first SRS resource is associated with a single antenna port of the UE, and wherein the second SRS resource is included in a second SRS resource set that includes a plurality of second SRS resources for the second usage, the plurality of second SRS resources being associated with two or more antenna ports, wherein the second usage comprises an antenna switching usage.

Aspect 11: The method of any of aspects 1 through 10, wherein the first SRS resource is associated with two or more antenna ports of the UE, and wherein the second SRS resource is included in a second SRS resource set that includes a plurality of second SRS resources for the second usage, the plurality of second SRS resources being associated with the two or more antenna ports, wherein the second usage comprises an antenna switching usage.

Aspect 12: The method of aspect 11, wherein the time gap between the first SRS resource and the second SRS resource is a largest time gap among a plurality of time gaps respectively between the first SRS resource and the plurality of second SRS resources.

Aspect 13: The method of aspect 11 or 12, wherein the number of the two or more antenna ports associated with the first SRS resource is greater than a number of antenna ports associated with the second SRS resource.

Aspect 14: The method of any of aspects 11 through 13, wherein the first SRS resource is included in a first SRS resource set that includes a plurality of first SRS resources for the first usage.

Aspect 15: The method of any of aspects 11 through 14, wherein first spatial relation information associated with the first SRS resource is the same as second spatial relation information associated with the second SRS resource.

Aspect 16: The method of any of aspects 11 through 15, wherein the first SRS resource and the second SRS resource are associated with a same antenna virtualization.

Aspect 17: The method of any of aspects 11 through 16, further comprising: receiving a merge indication from a base station, the merge indication indicating to select the one of the first SRS resource and the second SRS resource for both the first usage and the second usage, wherein the determining that the time gap is less than the time threshold is based on the merge indication.

Aspect 18: The method of any of aspects 11 through 17, further comprising: determining precoding information based on a merging condition associated with selecting the one of the first SRS resource and the second SRS resource for both the first usage and the second usages; and precoding a physical uplink shared channel (PUSCH) communication based on the precoding information.

Aspect 19: The method of aspect 18, wherein the two or more antenna ports associated with the first SRS resource are the same as a plurality of antenna ports associated with the plurality of second SRS resources, and wherein the determining the precoding information comprises: determining that the precoding information is first precoding information when the second SRS resource is associated with at least two of the two or more antenna ports; and determining that the precoding information is second precoding information different from the first precoding information when the second SRS resource is associated with one of the two or more antenna ports.

Aspect 20: The method of aspect 18 or 19, wherein the determining the precoding information comprises: receiving, from a base station, downlink control information (DCI) including an indication of the precoding information, wherein the precoding information is determined based on the DCI.

Aspect 21: The method of any of aspects 11 through 20, wherein the number of the two or more antenna ports associated with the first SRS resource is less than a number of antenna ports associated with the second SRS resource set, and wherein the first SRS resource and the second SRS resource are associated with same antenna ports.

Aspect 22: The method of any of aspects 11 through 20, wherein the number of the two or more antenna ports associated with the first SRS resource is less than a number of antenna ports associated with the second SRS resource set, and wherein antenna ports associated with the first SRS resource are the same as antenna ports associated with the second SRS resource and one or more other second SRS resources of the second SRS resource set.

Aspect 23: The method of any of aspects 11 through 22, further comprising: determining a first target transmit power associated with the first SRS resource and a second target transmit power associated with an additional second SRS resource for the second usage; and selecting one of the first target transmit power and the second target transmit power as a transmit power for the first SRS resource and the additional second SRS resource.

Aspect 24: The method of aspect 23, wherein the selected transmit power is one of: the first target transmit power, the second target transmit power, and a greater one of the first target transmit power and the second target transmit power.

Aspect 25: The method of aspect 23 or 24, wherein the selecting the one of the first target transmit power and the second target transmit power as the transmit power comprises: selecting the first target transmit power as the transmit power based on determining that the first target transmit power is for the first usage, or selecting the second target transmit power as the transmit power based on determining that the first target transmit power is for the second usage.

Aspect 26: The method of any of aspects 23 through 25, wherein the selecting the one of the first target transmit power and the second target transmit power as the transmit power comprises: selecting the one of the first target transmit power and the second target transmit power that is a periodic SRS resource, or selecting the one of the first target transmit power and the second target transmit power that is an aperiodic SRS resource.

Aspect 27: The method of aspect 23 or 24, wherein the selecting the one of the first target transmit power and the second target transmit power as the transmit power comprises: identifying one of the first SRS resource and the additional second SRS resource that is allocated earlier in time, wherein the selecting the one of the first target transmit power and the second target transmit power comprises selecting a target transmit power associated with the identified one of the first SRS resource and the additional second SRS resource as the transmit power.

Aspect 28: The method of any of aspects 23 through 27, further comprising: receiving a target power control command associated with a physical uplink shared channel (PUSCH); and transmitting a third SRS using the additional second SRS resource based on the target power control command or the selected transmit power.

Aspect 29: The method of aspect 28, further comprising: transmitting the reference signal on the first SRS resource using a transmit power based on the target power control command and a previous target power control command received prior to the target power control command.

Aspect 30: The method of aspect 28 or 29, wherein the SRS is transmitted based on the target power control command.

Aspect 31: The method of any of aspects 1 through 30, wherein the first usage is a codebook usage and the second usage is an antenna switching usage.

Aspect 32: A user equipment (UE) comprising: a transceiver configured to communicate with a radio access network, a memory, and a processor communicatively coupled to the transceiver and the memory, wherein the processor and the memory are configured to perform any one of aspects 1 through 31.

Aspect 33: A user equipment (UE) configured for wireless communication comprising at least one means for performing any one of aspects 1 through 31.

Aspect 34: A non-transitory computer-readable medium storing computer-executable code for a user equipment (UE), comprising code for causing an apparatus to perform any one of aspects 1 through 31.

Aspect 35: A method of wireless communication by a base station, comprising: assigning at least one first sounding reference signal (SRS) resource for a first usage and at least one second SRS resource for a second usage; determining whether a time gap between a first SRS resource of the at least one first SRS resource and a second SRS resource of the at least one second SRS resource is less than a time threshold; and transmitting, to a user equipment (UE) a first indication that the time gap is less than the time threshold, in response to determining that the time gap is less than the time threshold.

Aspect 36: The method of aspect 35, further comprising: receiving, from the UE, an SRS utilizing one of the first SRS resource or the second SRS resource for both the first usage and the second usage, in response to the first indication.

Aspect 37: The method of aspect 35 or 36, wherein the first SRS resource and the second SRS resource are configured with a same antenna port.

Aspect 38: The method of any of aspects 35 through 37, further comprising: transmitting, to a user equipment (UE) a second indication that the time gap is greater than or equal to the time threshold, in response to determining that the time gap is greater than or equal to the time threshold; and receiving, from the UE, a first SRS for the first usage using the first SRS resource and a second SRS for the second usage using the second SRS resource, in response to the second indication.

Aspect 39: The method of any of aspects 35 through 38, wherein the one of the first SRS resource or the second SRS resource is a periodic SRS resource.

Aspect 40: The method of any of aspects 35 through 39, wherein the first SRS resource is one of periodic SRS resources, and wherein the threshold is based on a periodicity of the periodic SRS resources or a predefined value.

Aspect 41: The method of any of aspects 35 through 40, further comprising: selecting the first SRS resource from a plurality of first SRS resources, wherein the first SRS resource is closest to the second SRS resource in time among the plurality of first SRS resources.

Aspect 42: The method of any of aspects 35 through 41, wherein a linkage between the first SRS resource and the second SRS resource is indicated in a radio resource control (RRC) message.

Aspect 43: The method of aspect 42, wherein the linkage is indicated by at least one of the following: an indication of the one of the first SRS resource or the second SRS resource in a merged SRS resource field and an indication of the other one of the first SRS resource or the second SRS resource in a current SRS resource field in the RRC message, an indication of the second SRS resource in a first SRS resource field of the RRC message, the first SRS resource field indicating one or more first SRS resources including the first SRS resource, or an indication of the first resource in a second SRS resource field of the RRC message, the second SRS resource field indicating one or more second SRS resources including the second SRS resource.

Aspect 44: The method of any of aspects 35 through 43, wherein the first SRS resource is associated with a single antenna port of the UE, and wherein the second SRS resource is included in a second SRS resource set that includes a plurality of second SRS resources for the second usage, the plurality of second SRS resources being associated with two or more antenna ports, wherein the second usage comprises an antenna switching usage.

Aspect 45: The method of any of aspects 35 through 44, wherein the first SRS resource is associated with two or more antenna ports of the UE, and wherein the second SRS resource is included in a second SRS resource set that includes a plurality of second SRS resources for the second usage, the plurality of second SRS resources being associated with the two or more antenna ports, wherein the second usage comprises an antenna switching usage.

Aspect 46: The method of aspect 45, wherein the time gap between the first SRS resource and the second SRS resource is a largest time gap among a plurality of time gaps respectively between the first SRS resource and the plurality of second SRS resources.

Aspect 47: The method of aspect 45 or 46, wherein the number of the two or more antenna ports associated with the first SRS resource is greater than a number of antenna ports associated with the second SRS resource.

Aspect 48: The method of any of aspects 45 through 47, wherein the first SRS resource is included in a first SRS resource set that includes a plurality of first SRS resources for the first usage.

Aspect 49: The method of any of aspects 45 through 48, wherein first spatial relation information associated with the first SRS resource is the same as second spatial relation information associated with the second SRS resource.

Aspect 50: The method of any of aspects 45 through 49, wherein the first SRS resource and the second SRS resource are associated with a same antenna virtualization.

Aspect 51: The method of any of aspects 45 through 50, further comprising: transmitting a merge indication to the UE, the merge indication indicating to select one of the first SRS resource and the second SRS resource for both the first usage and the second usage, in response to determining that the time gap is less than the time threshold.

Aspect 52: The method of any of aspects 45 through 51, further comprising: receiving, from the UE, a physical uplink shared channel (PUSCH) communication determined based on precoding information, the precoding information being based on a merging condition associated with selecting one of the first SRS resource and the second SRS resource for both the first usage and the second usages.

Aspect 53: The method of aspect 52, wherein the two or more antenna ports associated with the first SRS resource are the same as a plurality of antenna ports associated with the plurality of second SRS resources, and wherein the precoding information is first precoding information when the second SRS resource is associated with at least two of the two or more antenna ports, and wherein the precoding information is second precoding information different from the first precoding information when the second SRS resource is associated with one of the two or more antenna ports.

Aspect 54: The method of aspect 52 or 53, wherein the determining the precoding information comprises: transmitting, to the UE, downlink control information (DCI) including an indication of the precoding information, wherein the precoding information is determined based on the DCI.

Aspect 55: The method of any of aspects 45 through 54, wherein the number of the two or more antenna ports associated with the first SRS resource is less than a number of antenna ports associated with the second SRS resource set, and wherein the first SRS resource and the second SRS resource are associated with same antenna ports.

Aspect 56: The method of any of aspects 45 through 54, wherein the number of the two or more antenna ports associated with the first SRS resource is less than a number of antenna ports associated with the second SRS resource set, and wherein antenna ports associated with the first SRS resource are the same as antenna ports associated with the second SRS resource and one or more other second SRS resources of the second SRS resource set.

Aspect 57: The method of any of aspects 45 through 56, wherein a first target transmit power is associated with the first SRS resource and a second target transmit power is associated with an additional second SRS resource for the second usage, and wherein one of the first target transmit power and the second target transmit power is selected as a transmit power for the first SRS resource and the additional second SRS resource.

Aspect 58: The method of aspect 57, wherein the selected transmit power is one of: the first target transmit power, the second target transmit power, and a greater one of the first target transmit power and the second target transmit power.

Aspect 59: The method of aspect 57 or 58, wherein the one of the first target transmit power and the second target transmit power as the transmit power is selected by: selecting the first target transmit power as the transmit power based on determining that the first target transmit power is for the first usage, or selecting the second target transmit power as the transmit power based on determining that the first target transmit power is for the second usage.

Aspect 60: The method of any of aspects 57 through 59, wherein the one of the first target transmit power and the second target transmit power as the transmit power is selected by: selecting the one of the first target transmit power and the second target transmit power that is a periodic SRS resource, or selecting the one of the first target transmit power and the second target transmit power that is an aperiodic SRS resource.

Aspect 61: The method of aspect 57 or 58, wherein the one of the first target transmit power and the second target transmit power as the transmit power is selected by: identifying one of the first SRS resource and the additional second SRS resource that is allocated earlier in time, wherein the selecting the one of the first target transmit power and the second target transmit power comprises selecting a target transmit power associated with the identified one of the first SRS resource and the additional second SRS resource as the transmit power.

Aspect 62: The method of any of aspects 57 through 61, further comprising: transmitting, to the UE, a target power control command associated with a physical uplink shared channel (PUSCH); and receiving a third SRS using the additional second SRS resource based on the target power control command or the selected transmit power.

Aspect 63: The method of aspect 62, further comprising: receiving the reference signal on the first SRS resource using a transmit power based on the target power control command and a previous target power control command received prior to the target power control command.

Aspect 64: The method of aspect 62 or 63, wherein the SRS is received based on the target power control command.

Aspect 65: The method of any of aspects 35 through 64, wherein the first usage is a codebook usage and the second usage is an antenna switching usage.

Aspect 66: A base station comprising: a transceiver configured to communicate with a radio access network, a memory, and a processor communicatively coupled to the transceiver and the memory, wherein the processor and the memory are configured to perform any one of aspects 35 through 65.

Aspect 67: A base station configured for wireless communication comprising at least one means for performing any one of aspects 35 through 65.

Aspect 68: A non-transitory computer-readable medium storing computer-executable code for a base station, comprising code for causing an apparatus to perform any one of aspects 35 through 65.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-31 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 26, and 29 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment (UE), comprising:

determining whether a time gap between a first sounding reference signal (SRS) resource for a first usage and a second SRS resource for a second usage in time is less than a time threshold;

transmitting an SRS utilizing one of the first SRS resource or the second SRS resource for both the first usage and the second usage, in response to determining that the time gap is less than the time threshold;

determining a first target transmit power associated with the first SRS resource and a second target transmit power associated with an additional second SRS resource for the second usage; and selecting one of the first target transmit power and the second target transmit power as a transmit power for the first SRS resource and the additional second SRS resource.

2. The method of claim 1, wherein the first SRS resource and the second SRS resource are configured with a same antenna port.

3. The method of claim 1, further comprising:

transmitting a first SRS for the first usage using the first SRS resource and a second SRS for the second usage using the second SRS resource, in response to determining that the time gap is greater than or equal to the time threshold.

4. The method of claim 1, wherein the one of the first SRS resource or the second SRS resource is a periodic SRS resource.

5. The method of claim 1, wherein the first SRS resource is one of periodic SRS resources, and wherein the threshold is based on a periodicity of the periodic SRS resources or a predefined value.

6. The method of claim 1, wherein a linkage between the first SRS resource and the second SRS resource is indicated in a radio resource control (RRC) message.

7. The method of claim 6, wherein the linkage is indicated by at least one of the following:

an indication of the one of the first SRS resource or the second SRS resource in a merged SRS resource field and an indication of the other one of the first SRS resource or the second SRS resource in a current SRS resource field in the RRC message, an indication of the second SRS resource in a first SRS resource field of the RRC message, the first SRS resource field indicating one or more first SRS resources including the first SRS resource, or an indication of the first resource in a second SRS resource field of the RRC message, the second SRS resource field indicating one or more second SRS resources including the second SRS resource.

8. The method of claim 1, wherein the first SRS resource is associated with two or more antenna ports of the UE, and wherein the second SRS resource is included in a second SRS resource set that includes a plurality of second SRS resources for the second usage, the plurality of second SRS resources being associated with the two or more antenna ports, wherein the second usage comprises an antenna switching usage.

9. The method of claim 8, further comprising:

receiving a merge indication from a base station, the merge indication indicating to select the one of the first SRS resource and the second SRS resource for both the first usage and the second usage, wherein the determining that the time gap is less than the time threshold is based on the merge indication.

10. The method of claim 8, further comprising:

determining precoding information based on a merging condition associated with selecting the one of the first SRS resource and the second SRS resource for both the first usage and the second usages; and precoding a physical uplink shared channel (PUSCH) communication based on the precoding information.

11. The method of claim 10, wherein the two or more antenna ports associated with the first SRS resource are the same as a plurality of antenna ports associated with the plurality of second SRS resources, and wherein the determining the precoding information comprises:

determining that the precoding information is first precoding information when the second SRS resource is associated with at least two of the two or more antenna ports; and determining that the precoding information is second precoding information different from the first precoding information when the second SRS resource is associated with one of the two or more antenna ports.

12. The method of claim 1, wherein the selecting the one of the first target transmit power and the second target transmit power as the transmit power comprises:

selecting the first target transmit power as the transmit power based on determining that the first target transmit power is for the first usage, or selecting the second target transmit power as the transmit power based on determining that the first target transmit power is for the second usage.

13. The method of claim 1, wherein the selecting the one of the first target transmit power and the second target transmit power as the transmit power comprises:

selecting the one of the first target transmit power and the second target transmit power that is a periodic SRS resource, or selecting the one of the first target transmit power and the second target transmit power that is an aperiodic SRS resource.

14. The method of claim 1, wherein the selecting the one of the first target transmit power and the second target transmit power as the transmit power comprises:

identifying one of the first SRS resource and the additional second SRS resource that is allocated earlier in time, wherein the selecting the one of the first target transmit power and the second target transmit power comprises selecting a target transmit power associated with the identified one of the first SRS resource and the additional second SRS resource as the transmit power.

15. The method of claim 1, further comprising:

receiving a target power control command associated with a physical uplink shared channel (PUSCH); and transmitting a third SRS using the additional second SRS resource based on the target power control command or the selected transmit power.

16. The method of claim 15, wherein the transmitting the SRS comprises:

transmitting the SRS on the first SRS resource using a transmit power based on the target power control command and a previous target power control command received prior to the target power control command.

17. The method of claim 1, wherein the first usage is a codebook usage and the second usage is an antenna switching usage.

18. A user equipment (UE) for wireless communication, comprising:

at least one processor;

a transceiver communicatively coupled to the at least one processor; and a memory communicatively coupled to the at least one processor, wherein the at least one processor is configured to:

determine whether a time gap between a first sounding reference signal (SRS) resource for a first usage and a second SRS resource for a second usage in time is less than a time threshold;

transmit an SRS utilizing one of the first SRS resource or the second SRS resource for both the first usage and the second usage, in response to determining that the time gap is less than the time threshold;

determine a first target transmit power associated with the first SRS resource and a second target transmit power associated with an additional second SRS resource for the second usage; and select one of the first target transmit power and the second target transmit power as a transmit power for the first SRS resource and the additional second SRS resource.

19. The UE of claim 18, wherein the first SRS resource and the second SRS resource are configured with a same antenna port.

20. The UE of claim 18, wherein the at least one processor is further configured to:

transmit a first SRS for the first usage using the first SRS resource and a second SRS for the second usage using the second SRS resource, in response to determining that the time gap is greater than or equal to the time threshold.

21. A method of wireless communication by a base station, comprising:

assigning at least one first sounding reference signal (SRS) resource for a first usage and at least one second SRS resource for a second usage;

determining whether a time gap between a first SRS resource of the at least one first SRS resource and a second SRS resource of the at least one second SRS resource is less than a time threshold; and transmitting, to a user equipment (UE) a first indication that the time gap is less than the time threshold, in response to determining that the time gap is less than the time threshold.

22. The method of claim 21, further comprising:

receiving, from the UE, an SRS utilizing one of the first SRS resource or the second SRS resource for both the first usage and the second usage, in response to the first indication.

23. The method of claim 21, wherein the first SRS resource and the second SRS resource are configured with a same antenna port.

24. The method of claim 21, further comprising:

transmitting, to a user equipment (UE) a second indication that the time gap is greater than or equal to the time threshold, in response to determining that the time gap is greater than or equal to the time threshold; and receiving, from the UE, a first SRS for the first usage using the first SRS resource and a second SRS for the second usage using the second SRS resource, in response to the second indication.

25. The method of claim 21, wherein the first SRS resource is one of periodic SRS resources, and wherein the threshold is based on a periodicity of the periodic SRS resources or a predefined value.

26. The method of claim 21, wherein a linkage between the first SRS resource and the second SRS resource is indicated in a radio resource control (RRC) message.

27. The method of claim 21, wherein the first SRS resource is associated with two or more antenna ports of the UE, and wherein the second SRS resource is included in a second SRS resource set that includes a plurality of second SRS resources for the second usage, the plurality of second SRS resources being associated with the two or more antenna ports, wherein the second usage comprises an antenna switching usage.

28. A base station for wireless communication, comprising:

at least one processor;

a transceiver communicatively coupled to the at least one processor; and a memory communicatively coupled to the at least one processor, wherein the at least one processor is configured to:

assign at least one first sounding reference signal (SRS) resource for a first usage and at least one second SRS resource for a second usage;

determine whether a time gap between a first SRS resource of the at least one first SRS resource and a second SRS resource of the at least one second SRS resource is less than a time threshold; and transmit, to a user equipment (UE) a first indication that the time gap is less than the time threshold, in response to determining that the time gap is less than the time threshold.

29. The base station of claim 28, wherein the at least one processor is further configured to:

receive, from the UE, an SRS utilizing one of the first SRS resource or the second SRS resource for both the first usage and the second usage, in response to the first indication.

* * * * *